(12) United States Patent
Bechstein et al.

(10) Patent No.: US 12,210,696 B2
(45) Date of Patent: Jan. 28, 2025

(54) ELECTROSTATIC DISCHARGE PROTECTION OF A POWER EFFICIENT STYLUS FOR AN ELECTRONIC DEVICE

(71) Applicant: Shapirten Laboratories LLC, Wilmington, DE (US)

(72) Inventors: Daniel J. Bechstein, Mountain View, CA (US); Blake R. Marshall, San Jose, CA (US); John S. Smith, San Jose, CA (US); Vipin Ayanoor-Vitikkate, Pleasanton, CA (US); MohammadAli Khorrami, San Jose, CA (US)

(73) Assignee: Shapirten Laboratories LLC, Wilmington, DE (US)

(*) Notice: Subject to any disclaimer, the term of this patent is extended or adjusted under 35 U.S.C. 154(b) by 0 days.

(21) Appl. No.: 17/906,971

(22) PCT Filed: Mar. 30, 2021

(86) PCT No.: PCT/US2021/025003
§ 371 (c)(1),
(2) Date: Sep. 21, 2022

(87) PCT Pub. No.: WO2021/202612
PCT Pub. Date: Oct. 7, 2021

(65) Prior Publication Data
US 2023/0152911 A1   May 18, 2023

Related U.S. Application Data

(60) Provisional application No. 63/071,122, filed on Aug. 27, 2020, provisional application No. 63/039,675, (Continued)

(51) Int. Cl.
*G06F 3/038* (2013.01)
*G06F 3/0354* (2013.01)

(52) U.S. Cl.
CPC ........ *G06F 3/0383* (2013.01); *G06F 3/03545* (2013.01)

(58) Field of Classification Search
CPC .... G06F 3/03545; G06F 3/038; G06F 3/0442; G06F 3/045; G06F 21/82; G06F 3/0383
See application file for complete search history.

(56) References Cited

U.S. PATENT DOCUMENTS 5,414,227 A   5/1995   Schubert et al.
5,483,261 A   1/1996   Yasutake
(Continued)

FOREIGN PATENT DOCUMENTS

CN   207410026   * 10/2017   ............... H02H 9/04
CN   107368203 A   11/2017
(Continued)

OTHER PUBLICATIONS

International Search Report received for PCT Patent Application No. PCT/US2019/043249, mailed on Dec. 6, 2019, 7 Pages.
(Continued)

*Primary Examiner* — Nelson M Rosario
*Assistant Examiner* — Scott D Au
(74) *Attorney, Agent, or Firm* — Kubota & Basol LLP

(57) ABSTRACT

Systems, methods, and computer-readable media for enabling a power efficient stylus for an electronic device are provided. Various components may be provided for providing electrostatic discharge protection of such a stylus.

20 Claims, 31 Drawing Sheets

Related U.S. Application Data filed on Jun. 16, 2020, provisional application No. 63/003,252, filed on Mar. 31, 2020.

(56) References Cited

U.S. PATENT DOCUMENTS

| | | |
|---|---|---|
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,667,740 B2 | 12/2003 | Ely et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,567,414 B2 | 7/2009 | Bertin et al. |
| 7,663,607 B2 | 2/2010 | Hotelling et al. |
| 8,199,132 B1 | 6/2012 | Oda et al. |
| 8,479,122 B2 | 7/2013 | Hotelling et al. |
| 8,493,359 B2 | 7/2013 | Wright et al. |
| 8,547,114 B2 | 10/2013 | Kremin |
| 8,587,535 B2 | 11/2013 | Oda et al. |
| 8,657,814 B2 | 2/2014 | Werneth et al. |
| 8,773,405 B1 | 7/2014 | Ryshtun et al. |
| 8,816,985 B1 | 8/2014 | Tate et al. |
| 8,854,147 B2 | 10/2014 | Lin |
| 8,947,397 B2 | 2/2015 | Fujii |
| 8,952,930 B2 | 2/2015 | Perski et al. |
| 9,018,547 B2 | 4/2015 | Rimon et al. |
| 9,046,940 B2 | 6/2015 | Oyama |
| 9,117,677 B2 | 8/2015 | Ma et al. |
| 9,189,088 B2 | 11/2015 | Tsao et al. |
| 9,201,547 B2 | 12/2015 | Elias et al. |
| 9,201,556 B2 | 12/2015 | Free et al. |
| 9,310,943 B1 | 4/2016 | Omelchuk et al. |
| 9,383,835 B2 | 7/2016 | Lo et al. |
| 9,465,456 B2 | 10/2016 | Pant et al. |
| 9,594,440 B2 | 3/2017 | Park et al. |
| 9,606,680 B1 | 3/2017 | Sundara-rajan |
| 9,612,671 B1 | 4/2017 | Blaszczak et al. |
| 9,665,184 B2 | 5/2017 | Hara |
| 10,455,115 B2 | 10/2019 | Zyskind et al. |
| 10,558,293 B2 | 2/2020 | Wigdor et al. |
| 11,079,862 B2 | 8/2021 | Brunet et al. |
| 11,079,888 B1 | 8/2021 | Gray et al. |
| 11,287,926 B1 | 3/2022 | Shahsavari et al. |
| 11,435,851 B2 | 9/2022 | Rosenberg et al. |
| 11,526,240 B1 | 12/2022 | Bechstein et al. |
| 2002/0158923 A1 | 10/2002 | Panagrossi et al. |
| 2005/0264528 A1 | 12/2005 | Burry |
| 2006/0197753 A1 | 9/2006 | Hotelling |
| 2007/0195068 A1 | 8/2007 | Kable et al. |
| 2008/0156546 A1 | 7/2008 | Hauck |
| 2008/0266267 A1 | 10/2008 | Chang |
| 2009/0008162 A1 | 1/2009 | Yang et al. |
| 2009/0273579 A1 | 11/2009 | Zachut et al. |
| 2009/0289922 A1 | 11/2009 | Henry |
| 2010/0117661 A1 | 5/2010 | Bruwer et al. |
| 2010/0315384 A1 | 12/2010 | Hargreaves et al. |
| 2011/0063154 A1 | 3/2011 | Hotelling et al. |
| 2011/0297458 A1 | 12/2011 | Mao et al. |
| 2012/0007608 A1 | 1/2012 | Hadwen et al. |
| 2012/0068957 A1 | 3/2012 | Puskarich et al. |
| 2012/0146960 A1 | 6/2012 | Shih et al. |
| 2012/0154340 A1 | 6/2012 | Vuppu et al. |
| 2012/0268428 A1 | 10/2012 | Nakata et al. |
| 2012/0278031 A1 | 11/2012 | Oda et al. |
| 2012/0327042 A1 | 12/2012 | Harley et al. |
| 2012/0331546 A1 | 12/2012 | Falkenburg et al. |
| 2013/0088465 A1 | 4/2013 | Geller et al. |
| 2013/0106718 A1 | 5/2013 | Sundara-rajan |
| 2013/0141397 A1 | 6/2013 | Dunagan |
| 2013/0194225 A1 | 8/2013 | Shen et al. |
| 2013/0285900 A1 | 10/2013 | Liu |
| 2013/0321355 A1 | 12/2013 | Teiblum |
| 2014/0146009 A1 | 5/2014 | Huang |
| 2015/0091856 A1 | 4/2015 | Park et al. |
| 2015/0123923 A1 | 5/2015 | Stern |
| 2015/0123932 A1 | 5/2015 | Collins |
| 2015/0138164 A1 | 5/2015 | Hinson |
| 2015/0160744 A1 | 6/2015 | Mohindra et al. |
| 2015/0193024 A1 | 7/2015 | Kai et al. |
| 2015/0277618 A1 | 10/2015 | Bulea |
| 2015/0309598 A1 | 10/2015 | Zeliff et al. |
| 2015/0355732 A1 | 12/2015 | Mann |
| 2016/0048224 A1 | 2/2016 | Brunet et al. |
| 2016/0162045 A1 | 6/2016 | Vincent |
| 2016/0179271 A1 | 6/2016 | Vandermeijden |
| 2016/0266663 A1 | 9/2016 | Holsen |
| 2016/0313825 A1 | 10/2016 | Hotelling et al. |
| 2016/0320913 A1 | 11/2016 | Gao et al. |
| 2017/0010697 A1 | 1/2017 | Jiang et al. |
| 2017/0068344 A1 | 3/2017 | Bhandari et al. |
| 2017/0075441 A1 | 3/2017 | Leigh et al. |
| 2017/0075446 A1 | 3/2017 | Vandermeijden |
| 2017/0212635 A1 | 7/2017 | Cordeiro et al. |
| 2017/0262076 A1 | 9/2017 | Hara |
| 2017/0262100 A1 | 9/2017 | Leigh et al. |
| 2017/0285772 A1 | 10/2017 | Yamamoto |
| 2017/0308189 A1 | 10/2017 | Peretz et al. |
| 2017/0344174 A1 | 11/2017 | Pant et al. |
| 2018/0081477 A1 | 3/2018 | Picciotto et al. |
| 2018/0181245 A1 | 6/2018 | Beck et al. |
| 2018/0246585 A1 | 8/2018 | Hara |
| 2018/0284909 A1 | 10/2018 | Laslo et al. |
| 2018/0309190 A1 | 10/2018 | Niakan |
| 2018/0338065 A1 | 11/2018 | Zyskind et al. |
| 2019/0155408 A1 | 5/2019 | Hou et al. |
| 2019/0155411 A1 | 5/2019 | Kinrot et al. |
| 2019/0220187 A1 | 7/2019 | Budd |
| 2019/0324561 A1 | 10/2019 | Anderson et al. |
| 2019/0324564 A1 | 10/2019 | Brunet et al. |
| 2019/0339356 A1 | 11/2019 | Schildknecht et al. |
| 2019/0371787 A1 | 12/2019 | Mandal |
| 2020/0019257 A1 | 1/2020 | Chang et al. |
| 2020/0110482 A1 | 4/2020 | Vu et al. |
| 2020/0159386 A1 | 5/2020 | Saito et al. |
| 2020/0192521 A1 | 6/2020 | Case et al. |
| 2020/0201505 A1 | 6/2020 | Jung et al. |
| 2020/0218322 A1 | 7/2020 | Gray et al. |
| 2021/0026464 A1 | 1/2021 | Yamada et al. |
| 2021/0232240 A1 | 7/2021 | Smith |
| 2021/0240325 A1 | 8/2021 | Smith |
| 2021/0255735 A1 | 8/2021 | Gray et al. |
| 2021/0286493 A1 | 9/2021 | Wang et al. |
| 2021/0303151 A1 | 9/2021 | Morrison et al. |
| 2021/0303152 A1 | 9/2021 | Hosur et al. |
| 2021/0325444 A1 | 10/2021 | Chong |
| 2022/0091685 A1 | 3/2022 | Bechstein et al. |
| 2022/0095443 A1 | 3/2022 | Bechstein et al. |
| 2022/0100310 A1 | 3/2022 | Shahsavari et al. |
| 2022/0100341 A1 | 3/2022 | Seyed Mousavi et al. |
| 2022/0334658 A1 | 10/2022 | Dekel et al. |
| 2023/0273687 A1 | 8/2023 | Bechstein et al. |

FOREIGN PATENT DOCUMENTS

| | | |
|---|---|---|
| EP | 2466431 A1 | 6/2012 |
| EP | 2624104 A2 | 8/2013 |
| EP | 2672494 A1 | 12/2013 |
| EP | 2813918 A1 | 12/2014 |
| EP | 2624104 A3 | 3/2016 |
| EP | 3326050 A1 | 5/2018 |
| JP | 2000-163031 A | 6/2000 |
| JP | 2002-342033 A | 11/2002 |
| WO | 2017/044428 A1 | 3/2017 |
| WO | 2019/036857 A1 | 2/2019 |
| WO | 2020/023640 A1 | 1/2020 |
| WO | 2020/027818 A1 | 2/2020 |

(56) References Cited

FOREIGN PATENT DOCUMENTS

WO      2021/202612 A2    10/2021
WO      2022/046956 A1    3/2022

OTHER PUBLICATIONS

International Search Report received for PCT Patent Application No. PCT/US2021/025003, mailed on Oct. 18, 2021, 8 pages.
International Search Report received for PCT Patent Application No. PCT/US2021/047628, mailed on Feb. 14, 2022, 8 pages.
Non-Final Office Action received for U.S. Appl. No. 17/169,316, mailed on Mar. 3, 2022, 16 pages.
Notice of Allowance received for U.S. Appl. No. 17/262,741, mailed on Feb. 15, 2022, 8 pages.
Notice of Allowance received for U.S. Appl. No. 17/262,741, mailed on May 24, 2022, 8 Pages.
Notice of Allowance received for U.S. Appl. No. 17/262,741, mailed on Nov. 24, 2021, 13 pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Final Office Action received for U.S. Appl. No. 17/169,316, mailed on Aug. 24, 2023, 21 pages.
Final Office Action received for U.S. Appl. No. 17/169,316, mailed on Oct. 6, 2022, 17 pages.
Non-Final Office Action received for U.S. Appl. No. 17/169,316, mailed on Mar. 3, 2023, 21 pages.
Non-Final Office Action received for U.S. Appl. No. 18/043,312, mailed on Sep. 13, 2023, 11 pages.
Final Office Action received for U.S. Appl. No. 18/043,312, mailed on Mar. 6, 2024, 12 pages.
Non-Final Office Action received for U.S. Appl. No. 17/169,316, mailed on Feb. 1, 2024, 20 pages.

* cited by examiner

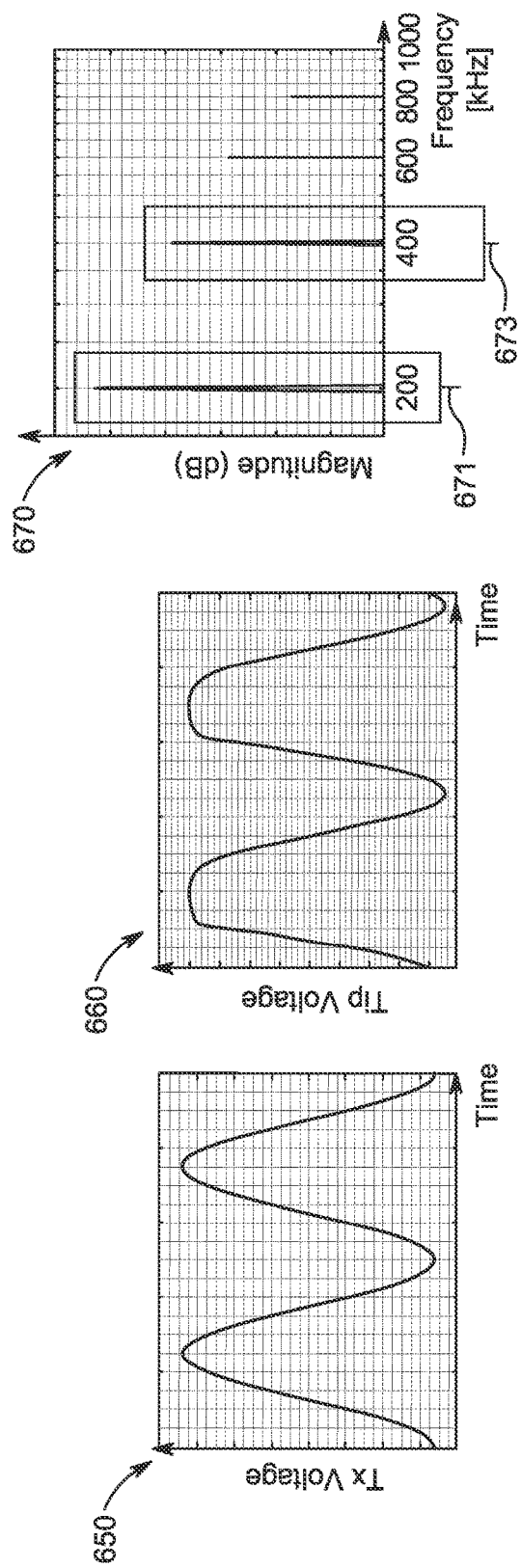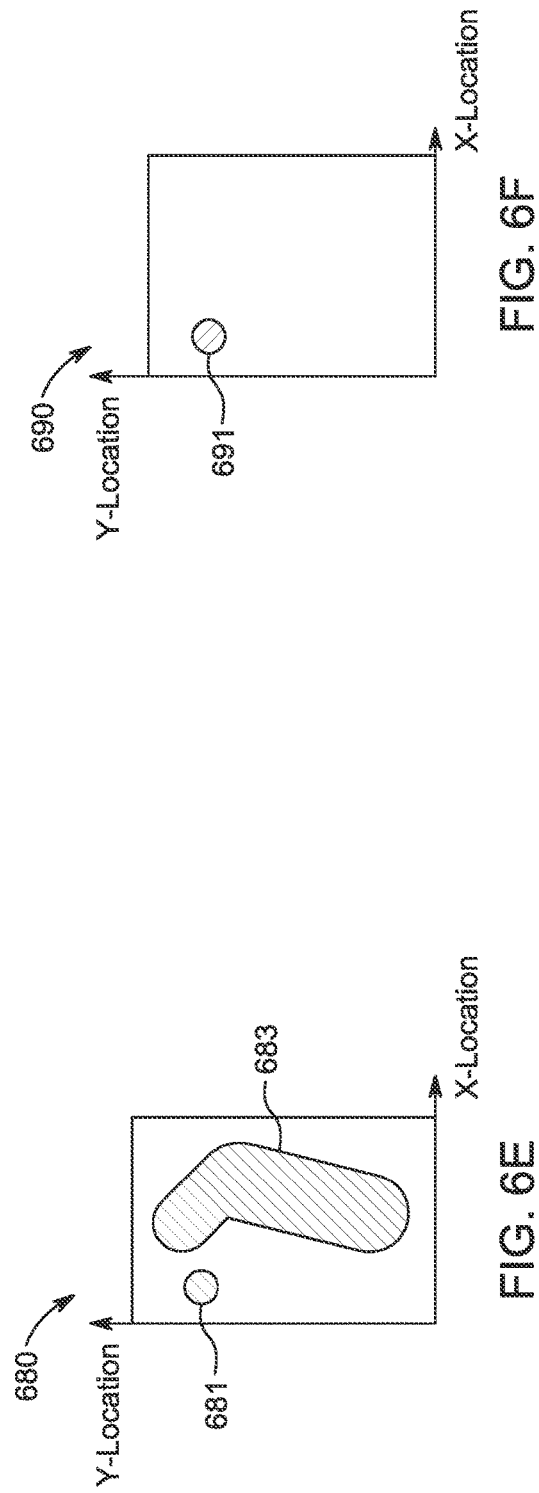

ELECTROSTATIC DISCHARGE PROTECTION OF A POWER EFFICIENT STYLUS FOR AN ELECTRONIC DEVICE

CROSS-REFERENCE TO RELATED APPLICATIONS

This application is a National Phase application under 35 U.S.C. § 371 of International Application No. PCT/US2021/025003, filed Mar. 30, 2021, which claims the priority benefit of U.S. Provisional Application No. 63/071,122, filed Aug. 27, 2020, U.S. Provisional Application No. 63/039,675, filed Jun. 16, 2020, and U.S. Provisional Application No. 63/003,252, filed Mar. 31, 2020 the contents of which are hereby incorporated by reference in their entireties for all intended purposes.

FIELD

This generally relates to a stylus and, more particularly, to a power efficient stylus for an electronic device, and, more particularly, to such a stylus with electrostatic discharge protection, as well as to systems, methods, and computer-readable media for use thereof.

BACKGROUND

Some systems may include an electronic device with a sensor assembly to facilitate a user's interaction with the device, as well as a stylus for providing a user with a more precise instrument than the user's fingers for interacting with the sensor assembly, such as for generating a graphical object on a display of the electronic device. However, existing systems often require an active stylus that uses power intensive electronics or a passive stylus that is difficult to distinguish from a user's finger.

SUMMARY

Systems, methods, and computer-readable media for enabling a power efficient stylus with electrostatic discharge protection for an electronic device are provided.

As an example, a stylus for use with an electronic device that includes an input component with an input surface may be provided, the stylus including a housing and stylus circuitry at least partially positioned within the housing, wherein the stylus circuitry includes body circuitry, a front tip interface component, and front tip stylus circuitry positioned between and electrically coupled to each one of the body circuitry and the front tip interface component, the front tip stylus circuitry includes non-linear circuitry that is operative to provide a non-linear load between the body circuitry and the front tip interface component when the stylus circuitry is stimulated by an external stimulation, and the non-linear load is operative to provide a stylus electric field that is detectable by the electronic device when the front tip interface component of the stylus is positioned adjacent the input surface of the input component of the electronic device.

As another example, a stylus for use with an electronic device that includes an input component with an input surface may be provided, the stylus including a tip interface component and tip stylus circuitry electrically coupled to the tip interface component, wherein the stylus is operative to drive a current back and forth through the tip stylus circuitry when the tip stylus circuitry is stimulated by an electrical signal provided by the input component of the electronic device, and the driven current is operative to provide a modulated version of the electrical signal that is detectable by the electronic device when the tip interface component of the stylus is positioned adjacent the input surface of the input component of the electronic device.

As yet another example, a method for using a stylus including non-linear circuitry at an input component of an electronic device may be provided, the method including transmitting an electrical signal from transmitter circuitry of the input component of the electronic device, stimulating the non-linear circuitry of the stylus with the transmitted electrical signal, providing a non-linear load at the stylus based on the stimulating, and creating a harmonic of the transmitted electrical signal at the input component of the electronic device based on the provided non-linear load.

As yet another example, a stylus for use with an electronic device that includes an input component with an input surface may be provided, the stylus including a housing and stylus circuitry at least partially positioned within the housing, wherein the stylus circuitry includes body circuitry, a tip interface component, and tip stylus circuitry, the tip stylus circuitry includes switch circuitry that is operative to alternate according to a pattern between a first state in which the body circuitry and the tip interface component are electrically coupled and a second state in which the body circuitry and the tip interface component are not electrically coupled, and the alternation of the switch circuitry is operative to provide a modulated capacitance at the tip interface component that is detectable by the electronic device when the tip interface component of the stylus is positioned adjacent the input surface of the input component of the electronic device.

As yet another example, a stylus for use with an electronic device that includes an input component with an input surface may be provided, the stylus including a tip interface component and tip stylus circuitry electrically coupled to the tip interface component, wherein the tip stylus circuitry is operative to change a load of the stylus according to a pattern when the tip stylus circuitry is exposed to an electrical signal provided by the input component of the electronic device, and the changed load is operative to provide a modulated version of the electrical signal that is detectable by the electronic device when the tip interface component of the stylus is positioned adjacent the input surface of the input component of the electronic device.

As yet another example, a method for using a stylus including switching circuitry at an input component of an electronic device may be provided, the method including transmitting an electrical signal from transmitter circuitry of the input component of the electronic device, concurrently with the transmitting, switching the switching circuitry according to a pattern, and, based on the switching, modulating the transmitted electrical signal according to the pattern.

As yet another example, a method for detecting an accessory on an input surface of an input component of an electronic device that includes a matrix of a plurality of transmit electrodes and a plurality of receive electrodes, may be provided, the method including transmitting a transmit signal on each transmit electrode of at least a subset of the plurality of transmit electrodes, sensing a receive signal on each receive electrode of at least a subset of the plurality of receive electrodes, extracting, from each sensed receive signal, data indicative of a non-linear aspect of the transmit signal, and estimating a position of the accessory on the input surface based on the extracted data.

As yet another example, an electronic device may be provided that includes an input component including an input surface and a matrix underneath the input surface including a plurality of transmit electrodes and a plurality of receive electrodes, and processing circuitry configured to transmit a transmit signal on each transmit electrode of at least a subset of the plurality of transmit electrodes, sense a receive signal on each receive electrode of at least a subset of the plurality of receive electrodes, extract, from each sensed receive signal, data indicative of a non-linear aspect of the transmit signal, and estimate a position of an accessory on the input surface based on the extracted data.

As yet another example, an electronic device input component may be provided that includes an input surface, a plurality of electrodes, and processing circuitry configured to provide a transmit waveform on each electrode of at least a subset of the plurality of electrodes, detect a receive waveform on each electrode of at least another subset of the plurality of electrodes, extract, from each detected receive waveform, data indicative of asymmetric distortion of the transmit waveform, and determine a location of an accessory on the input surface based on the extracted data.

As yet another example, an electronic device may be provided that includes an input component including an input surface and a matrix underneath the input surface including a plurality of transmit electrodes and a plurality of receive electrodes, and processing circuitry configured to transmit signals on transmit electrodes of at least a subset of the plurality of transmit electrodes, sense a receive signal on each receive electrode of at least a subset of the plurality of receive electrodes, extract, from the sensed receive signals, data indicative of a non-linear response to the transmit signals, and estimate a position of an accessory on the input surface based on the extracted data.

As yet another example, an electronic device input component may be provided that includes an input surface, a plurality of electrodes, and processing circuitry configured to provide transmit waveforms on electrodes of at least a subset of the plurality of electrodes, detect a receive waveform on each electrode of at least another subset of the plurality of electrodes, extract, from the detected receive waveforms, data indicative of a non-linear response to the transmit waveforms, and determine a location of an accessory on the input surface based on the extracted data.

As yet another example, a stylus for use with an electronic device that includes an input component with an input surface may be provided, the stylus including a housing and stylus circuitry at least partially positioned within the housing, wherein the stylus circuitry includes body circuitry, a tip interface component, and tip circuitry positioned between and electrically coupled to each one of the body circuitry and the tip interface component, and the tip circuitry includes non-linear circuitry that is operative to provide a non-linear load between the body circuitry and the tip interface component when the stylus is stimulated by an external stimulation and electrostatic discharge ("ESD") circuitry that is operative to provide ESD protection to the non-linear circuitry, the ESD circuitry including ESD path circuitry electrically coupled in parallel to the non-linear circuitry and ESD resistance circuitry electrically coupled in series with the non-linear circuitry and in parallel to the ESD path circuitry.

As yet another example, a stylus for use with an electronic device that includes an input component with an input surface may be provided, the stylus including a housing and stylus circuitry at least partially positioned within the housing, wherein the stylus circuitry includes body circuitry including a body point portion, a tip interface component, tip circuitry operative to provide a load between the body circuitry and the tip interface component when the stylus is stimulated by an external stimulation, and a conductive pad electrically coupled to the tip circuitry, the housing includes a first housing, a second housing that is removably coupled to the first housing, and a cover provided over an opening of the first housing, the tip circuitry is at least partially positioned within a first housing space defined by the first housing, the conductive pad is at least partially positioned within the first housing space, the body circuitry is at least partially positioned within a second housing space defined by the second housing, and, when the second housing is coupled to the first housing, the body point portion of the body circuitry is operative to pass through the cover and press into the conductive pad.

As yet another example, a stylus for use with an electronic device that includes an input component with an input surface may be provided, the stylus including a housing and stylus circuitry at least partially positioned within the housing, wherein the stylus circuitry includes body circuitry, a tip interface component, and tip circuitry operative to provide a load between the body circuitry and the tip interface component when the stylus is stimulated by an external stimulation, the load is operative to provide a stylus electric field that is detectable by the electronic device when the tip interface component of the stylus is positioned adjacent the input surface of the input component of the electronic device, the tip interface component is shaped as a spherical cap with a hollow space, and at least a portion of the tip circuitry is positioned within the hollow space.

As yet another example, an accessory for use with an electronic device that includes an input component with an input surface may be provided, the accessory including an enclosure and accessory circuitry at least partially positioned within the enclosure, wherein the accessory circuitry includes body circuitry, a tip interface component, and tip circuitry positioned between and electrically coupled to each one of the body circuitry and the tip interface component, wherein the tip circuitry includes first circuitry that is operative to provide an asymmetric load between the body circuitry and the tip interface component when the accessory is stimulated by an external stimulation, and second circuitry that is operative to provide electrostatic discharge ("ESD") protection to the first circuitry, and wherein the second circuitry includes ESD path circuitry electrically coupled in parallel to the first circuitry or ESD resistance circuitry electrically coupled in series with the first circuitry.

As yet another example, a replaceable tip of an accessory assembly that further includes body circuitry at least partially positioned within a body housing space defined by a body housing may be provided, the replaceable tip including a tip housing that is removably couplable to the body housing, tip circuitry that is at least partially positioned within a tip housing space defined by the tip housing, a tip interface component, and a cover provided over an opening of the first housing, wherein, prior to the tip housing ever being coupled to the body housing, the cover is operative to prevent an electrostatic discharge ("ESD") event within the tip housing space, and, when the tip housing is coupled to the body housing, a portion of the body circuitry passes through the cover and into the tip housing space and the tip circuitry is operative to provide a load between the body circuitry and the tip interface component when the accessory is stimulated by an external stimulation.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIG. 6B is a plot over time of an exemplary voltage applied to a transmit electrode of the system of FIGS. 1-1D, 6, and 6A;

FIG. 6C is a plot over time of an exemplary voltage provided by a tip of the stylus of the system of FIGS. 1-1D, 6, and 6A;

FIG. 6D is a plot of an exemplary magnitude with respect to frequency of an applied voltage as sensed by a receive electrode of the system of FIGS. 1-1D, 6, and 6A;

FIG. 6E is a first depiction of sensed external element(s) on a surface of the electronic device of the system of FIGS. 1-1D, 6, and 6A;

FIG. 6F is a second depiction of sensed external element (s) on a surface of the electronic device of the system of FIGS. 1-1D, 6, and 6A;

FIGS. 11 and 11A are circuit diagrams of another accessory;

DETAILED DESCRIPTION

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art will readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming, but would nevertheless be a routine engineering undertaking for those of ordinary skill in the art having the benefit of this disclosure.

The present disclosure relates to one or more power efficient styli for interacting with a sensor assembly of an electronic device, such as for generating a graphical object on a display of the electronic device.

Systems, methods, and computer-readable media for enabling a power efficient stylus with electrostatic discharge protection for an electronic device are provided and described with reference to FIGS. 1-19A.

Figure 1:
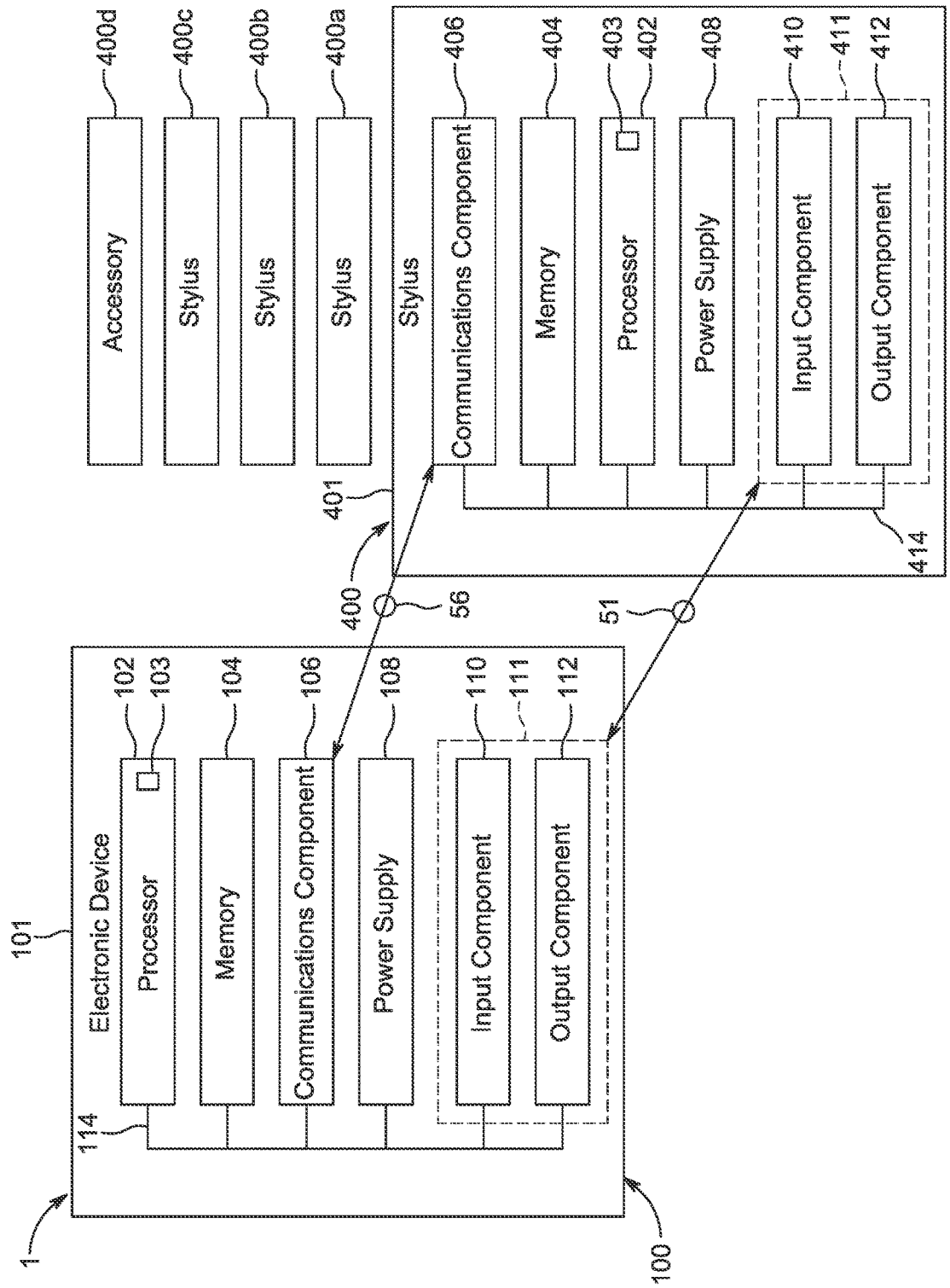
FIG. 1 is a schematic view of an illustrative user input system including an electronic device and a power efficient stylus.

FIG. 1 is a schematic view of an illustrative system 1 with an electronic device 100 and a stylus 400. Stylus 400 (e.g., a marking tool, smart pen, smart brush, wand, chisel, user-manipulated electronic input device, hand-held input device, and the like, or any other suitable accessory, such as a glove) may be configured to provide input to electronic device 100 (e.g., a tablet computer, laptop computer, desktop computer, and the like). A system user may manipulate the orientation and position of stylus 400 relative to an input surface of electronic device 100 to convey information to electronic device 100, such as, but not limited to, writing, sketching, scrolling, gaming, selecting user interface elements, moving user interface elements, and so on. In many embodiments, the input surface of electronic device 100 may be a multi-touch display screen. However, in other embodiments, the input surface of electronic device 100 may be a non-display input surface, such as, but not limited to, a trackpad or drawing tablet. The input surface may be a foldable or flexible surface or display. System 1 may be used to capture free-form user input from stylus 400. For example, the user can slide, move, draw, or drag a tip of stylus 400 across the input surface of electronic device 100, which, in response, may render a graphical object (e.g., a line) using a display positioned below the input surface. In such an example, the rendered graphical object may follow or otherwise correspond to the path of stylus 400 across the input surface of electronic device 100. The thickness and/or shape and/or intensity and/or any other suitable rendered characteristic of the rendered graphical object may vary based, at least in part, on one, some, or each of various characteristics, including, but not limited to, a force or speed with which the user moves stylus 400 across the input surface, an angle of stylus 400 relative to the input surface (e.g., the inclination of stylus 400 relative to a plane of the input surface, a writing angle of stylus 400 relative to a horizontal writing line traversing the input surface, etc.), a variable setting of a variable input component of stylus 400, which one of multiple tips of stylus 400 is interacting with the input surface, a variable setting of an application running on electronic device 100 (e.g., a virtual drawing space application), and/or a combination thereof. Collectively, stylus 400 and electronic device 100 may be referred to herein as a "user input" system 1.

Broadly and generally, system 1 may be operative to determine and/or estimate one or more outputs of stylus 400 (and/or changes therein over time as a scalar or vector quantity), to interpret the user's manipulation thereof as input to electronic device 100. For example, system 1 may be operative to estimate: the magnitude of force applied by a user's grip to stylus 400 (e.g., non-binary estimate of magnitude as a scalar or vector quantity); a magnitude (e.g., non-binary estimate of magnitude as a scalar or vector quantity) of force applied (e.g., force applied $F_a$) by stylus 400 to the input surface of electronic device 100; the location at which or the area over which stylus 400 may touch or nearly touch the input surface of electronic device 100; a polar angle of stylus 400 relative to a plane of the input surface (e.g., inclination of stylus 400 (e.g., a polar angle 118 (θ) (e.g., as may be defined between a vector normal to the plane of input surface 110a and a longitudinal axis 120 of stylus 400, such as a zenith))); an azimuthal angle of stylus 400 relative to an axis of the input surface (e.g., an azimuthal angle 122 (Φ) (e.g., as may be defined between the polar angle 118 (θ) and a reference vector within the plane of input surface 110a, such as an axis)); a vector or scalar representation of the angular position of stylus 400 relative to a plane of the input surface; three-dimensional coordinates (e.g., spherical, Cartesian, and so on) of one or more points along the length of stylus 400 relative to the input surface; and so on. In many embodiments, system 1 may be operative to monitor such variables over time to estimate rates of change therein as either scalar or vector quantities (e.g., velocity, acceleration, and so on). The operation of estimating or determining two-dimensional position coordinates of stylus 400 as a point (or area) within or parallel to a plane of the input surface, whether such operation is performed by electronic device 100, performed by stylus 400, and/or performed, at least in part, as a result of cooperation therebetween (or with one or more other electronic devices), is generally referred to herein as "locating" the stylus.

Electronic device 100 and/or stylus 400 can be configured to estimate and/or monitor the location of stylus 400 over time and compute differential or integral quantities such as, but not limited to, acceleration, velocity, total force applied, path length, and so on. For example, the operation of estimating the velocity and/or acceleration of stylus 400 relative to the input surface as stylus 400 is moved across that surface, whether such operation is performed by electronic device 100, performed by stylus 400, and/or performed, at least in part, as a result of cooperation therebetween (or with one or more other electronic devices), is generally referred to herein as estimating the "planar motion" of the stylus. The operation of estimating the angular velocity and/or acceleration of stylus 400 relative to a plane of the input surface as it is moved thereacross, whether performed by electronic device 100, performed by stylus 400, and/or performed, at least in part, as a result of cooperation therebetween (or with one or more other electronic devices), is generally referred to herein as estimating the "angular motion" of the stylus. Additionally or alternatively, electronic device 100 and/or stylus 400 can be configured to estimate the distance (e.g., Z-height) of a portion of stylus 400 (e.g., the tip of the stylus) from the input surface of device 100, and such an estimated distance may be used to determine a "make or break" event between the stylus and device, such as for making a determination when a drawn graphical line should start or stop or a stylus lift off event should occur.

Electronic device 100 may be any portable, mobile, or hand-held electronic device configured to interact with stylus 400 for changing any suitable characteristic(s) of device 100 (e.g., any suitable graphical object input tool characteristics that may be utilized to render a graphical object) in response to manipulation of stylus 400 across an input surface of electronic device 100. Alternatively, electronic device 100 may not be portable at all, but may instead be generally stationary. Electronic device 100 can include, but is not limited to, a media player, video player, still image player, game player, other media player, music recorder, movie or video camera or recorder, still camera, other media recorder, radio, medical equipment, domestic appliance, transportation vehicle instrument, musical instrument, calculator, cellular telephone, other wireless communication device, personal digital assistant, remote control, pager, computer (e.g., a desktop, laptop, tablet, server, etc.), merchant accessory (e.g., signature pad (e.g., as may be used in a check-out line of a merchant store during payment processing)), monitor, television, stereo equipment, set up box, set-top box, wearable device (e.g., watch, clothing, etc.), boom box, modem, router, printer, and combinations thereof. Electronic device 100 may include any suitable control circuitry or processor 102, memory 104, communications component 106, power supply 108, input component 110, and output component 112. Electronic device 100 may also include a bus 114 that may provide one or more wired or wireless communication links or paths for transferring data and/or power to, from, or between various other components of device 100. Device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing). In some embodiments, one or more components of electronic device 100 may be combined or omitted. Moreover, electronic device 100 may include other components not combined or included in FIG. 1. For example, device 100 may include any other suitable components or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., applications for implementing functions on device 100 (e.g., virtual drawing space applications, stylus detection applications, etc.)), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers or subsystems (e.g., stylus 400) using any suitable communications protocol(s). For example, communications component 106 may support Wi-Fi (e.g., an 802.11 protocol), Ethernet, Bluetooth™, near field communication ("NFC"), radio-frequency identification ("RFID"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications component 106 may also include circuitry that can enable device 100 to be electrically coupled to another device or server or subsystem (e.g., stylus 400 or another user electronic device or server) and communicate with that other device, either wirelessly or via a wired connection.

Power supply 108 may provide power to one or more of the components of device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a cellular telephone). As another example, power supply 108 can be configured to generate power from a natural source (e.g., solar power using solar cells).

One or more input components 110 may be provided to permit a user to interact or interface with device 100 and/or to sense certain information about the ambient environment. For example, input component 110 can take a variety of forms, including, but not limited to, a touch pad, trackpad, dial, click wheel, scroll wheel, touch screen, ultrasonic line sensor, ultrasonic imaging array, one or more buttons (e.g., a keyboard), mouse, joy stick, track ball, switch, photocell, force-sensing resistor ("FSR"), encoder (e.g., rotary encoder and/or shaft encoder that may convert an angular position or motion of a shaft or axle to an analog or digital code), microphone, camera, scanner (e.g., a barcode scanner or any other suitable scanner that may obtain product identifying information from a code, such as a linear barcode, a matrix barcode (e.g., a quick response ("QR") code), or the like), proximity sensor (e.g., capacitive proximity sensor), biometric sensor (e.g., a fingerprint reader or other feature recognition sensor, which may operate in conjunction with a feature-processing application that may be accessible to electronic device 100 for authenticating or otherwise identifying or detecting a user), line-in connector for data and/or power, force sensor (e.g., any suitable capacitive sensors, pressure sensors, strain gauges, sensing plates (e.g., capacitive and/or strain sensing plates), etc.), temperature sensor (e.g., thermistor, thermocouple, thermometer, silicon bandgap temperature sensor, bimetal sensor, etc.) for detecting the temperature of a portion of electronic device 100 or an ambient environment thereof, a performance analyzer for detecting an application characteristic related to the current operation of one or more components of electronic device 100 (e.g., processor 102), motion sensor (e.g., single axis or multi axis accelerometers, angular rate or inertial sensors (e.g., optical gyroscopes, vibrating gyroscopes, gas rate gyroscopes, or ring gyroscopes), linear velocity sensors, and/or the like), magnetometer (e.g., scalar or vector magnetometer), pressure sensor, light sensor (e.g., ambient light sensor ("ALS"), infrared ("IR") sensor, etc.), thermal sensor, acoustic sensor, sonic or sonar sensor, radar sensor, image sensor, video sensor, global positioning system ("GPS") detector, radio frequency ("RF") detector, RF or acoustic Doppler detector, RF triangulation detector, electrical charge sensor, peripheral device detector, event counter, and any combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. An output component of electronic device 100 may take various forms, including, but not limited to, audio speakers, headphones, data and/or power line-outs, visual displays (e.g., for transmitting data via visible light and/or via invisible light), antennas, infrared ports, flashes (e.g., light sources for providing artificial light for illuminating an environment of the device), tactile/haptic outputs (e.g., rumblers, vibrators, etc.), taptic components (e.g., components that are operative to provide tactile sensations in the form of vibrations), and any combinations thereof.

For example, electronic device 100 may include a display as output component 112. Display 112 may include any suitable type of display or interface for presenting visual data to a user. In some embodiments, display 112 may include a display embedded in device 100 or coupled to device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, an organic electroluminescence display, electronic ink, or another type of display technology or combination of display technology types. Alternatively, display 112 can include a movable display or a projecting system for providing a display of content on a surface remote from electronic device 100, such as, for example, a video projector, a head-up display, or a three-dimensional (e.g., holographic) display. As another example, display 112 may include a digital or mechanical viewfinder, such as a viewfinder of the type found in compact digital cameras, reflex cameras, or any other suitable still or video camera. In some embodiments, display 112 may include display driver circuitry, circuitry for driving display drivers, or both. Display 112 can be operative to display content (e.g., media playback information, application screens for applications implemented on electronic device 100, information regarding ongoing communications operations, information regarding incoming communications requests, device operation screens, etc.) that may be under the direction of processor 102. Display 112 can be associated with any suitable characteristic dimensions defining the size and shape of the display. For example, the display can be rectangular or have any other polygonal shape, or alternatively can be defined by a curved or other non-polygonal shape (e.g., a circular display). Display 112 can have one or more primary orientations for which an interface can be displayed, or can instead or in addition be operative to display an interface along any orientation selected by a user.

It should be noted that one or more input components 110 and one or more output components 112 may sometimes be referred to collectively herein as an input/output ("I/O") component or I/O interface 111 (e.g., input component 110 and display 112 as I/O component or I/O interface 111). For example, input component 110 and display 112 may sometimes be a single I/O component 111, such as a touch screen, that may receive input information through a user's and/or stylus' touch of a display screen and that may also provide visual information to a user via that same display screen. Input component 110 of electronic device 100 may provide an input surface relative to which a system user may manipulate the orientation and position of stylus 400 to convey information to electronic device 100. In many embodiments, such an input surface of input component 110 of electronic device 100 may be provided as a portion of a multi-touch display screen assembly (e.g., as a portion of I/O interface 111 with a display output component 112). However, in other embodiments, such an input surface of input component 110 of electronic device 100 may be a non-display input surface, such as, but not limited to, a trackpad or drawing tablet, whether or not device 100 may also include a display output component. The input surface of input component 110 may be a foldable or flexible surface or display.

Processor 102 of device 100 may include any processing circuitry operative to control the operations and performance of one or more components of electronic device 100. For example, processor 102 may be used to run one or more applications, such as an application 103. Application 103 may include, but is not limited to, one or more operating system applications, firmware applications, virtual drawing space applications, stylus or other suitable accessory detection applications, media playback applications, media editing applications, pass applications, calendar applications, state determination applications (e.g., device state determination applications, stylus state determination applications, accessory state determination applications, etc.), biometric feature-processing applications, compass applications, health applications, thermometer applications, weather applications, thermal management applications, force sensing applications, device diagnostic applications, video game applications, or any other suitable applications. For example, processor 102 may load application 103 as a user interface program or any other suitable program to determine how instructions or data received via an input component 110 (e.g., due to interaction with a tip of stylus 400) and/or any other component of device 100 (e.g., stylus data from stylus 400 via communications component 106, etc.) may manipulate the one or more ways in which information may be stored on device 100 (e.g., in memory 104) and/or provided to a user via an output component 112 and/or to a remote subsystem (e.g., to stylus 400 and/or to any other electronic device or server via communications component 106). Application 103 may be accessed by processor 102 from any suitable source, such as from memory 104 (e.g., via bus 114) or from another device or server (e.g., from stylus 400 via communications component 106, and/or from any other suitable remote source via communications component 106). Electronic device 100 (e.g., processor 102, memory 104, or any other components available to device 100) may be configured to process graphical data at various resolutions, frequencies, intensities, and various other characteristics as may be appropriate for the capabilities and resources of device 100. Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes. Processor 102 may be implemented as any electronic device capable of processing, receiving, or transmitting data or instructions. For example, process 102 can be a microprocessor, a central processing unit, an application-specific integrated circuit, a field-programmable gate array, a digital signal processor, an analog circuit, a digital circuit, or combination of such devices. Processor 102 may be a single-thread or multi-thread processor. Processor 102 may be a single-core or multi-core processor. Accordingly, as described herein, the term "processor" may refer to a hardware-implemented data processing device or circuit physically structured to execute specific transformations of data including data operations represented as code and/or instructions included in a program that can be stored within and accessed from a memory. The term is meant to encompass a single processor or processing unit, multiple processors, multiple processing units, analog or digital circuits, or other suitably configured computing element or combination of elements.

Stylus 400 may be any suitable accessory, digital input tool, marking tool, smart pen, smart brush, wand, chisel, user-manipulated electronic input device, hand-held input device, and/or the like that may be configured to interact with (e.g., provide input to) electronic device 100. Stylus 400 may include any suitable control circuitry or processor 402, which may be similar to any suitable processor 102 of device 100, application 403, which may be similar to any suitable application 103 of device 100, memory 404, which may be similar to any suitable memory 104 of device 100, communications component 406, which may be similar to any suitable communications component 106 of device 100, power supply 408, which may be similar to any suitable power supply 108 of device 100, input component 410, which may be similar to any suitable input component 110 of device 100, output component 412, which may be similar to any suitable output component 112 of device 100, I/O interface 411, which may be similar to any suitable I/O interface 111 of device 100, bus 414, which may be similar to any suitable bus 114 of device 100, and/or housing 401, which may be similar to any suitable housing 101 of device 100. In some embodiments, one or more components of stylus 400 may be combined or omitted. Moreover, stylus 400 may include other components not combined or included in FIG. 1. For example, stylus 400 may include any other suitable components or several instances of the components shown in FIG. 1 or only some but not all of the components shown in FIG. 1. For the sake of simplicity, only one of each of the components is shown in FIG. 1.

Moreover, as shown, system 1 may include one or more additional styli, such as one or more of styli 400a, 400b, and 400c, and/or one or more other types of accessory, such as accessory 400d, each of which may include any suitable components, such as a processor, application, memory, communications component, power supply, input component, output component, I/O interface, bus, housing, and/or the like, and may be similar to stylus 400. While each stylus of system 1 may be operative to be used with respect to an input surface of device 100 (e.g., one at a time (e.g., by a user)), each stylus of system 1 may differ from one another with respect to one or more physical characteristics (e.g., color, weight, size, shape, material, circuitry, etc.) and/or with respect to one or more device input tool characteristics (e.g., graphical object input tool characteristics) associated with the stylus as may be determined by device 100 for defining any suitable device characteristic(s) (e.g., rendered characteristic(s) (e.g., color, thickness, shape, intensity, and/or the like) of a graphical object rendered by device 100) in response to manipulation of the stylus with respect to an input surface of device 100.

Generally and broadly, FIGS. 1A-1D reference user input system 1 including electronic device 100 and stylus 400. A user U manipulates the orientation and position of stylus 400 relative to input surface input component 110a (e.g., a particular input component 110) of electronic device 100 in order to convey information to electronic device 100. User input system 1 may be configured to perform or coordinate multiple operations such as, but not limited to, locating stylus 400, estimating the angular position of stylus 400, estimating the magnitude of force by stylus 400 to input surface 110a, determining a variable setting of a variable input component 410 of stylus 400, determining a variable setting of an application 103 running on electronic device 100 (e.g., a virtual drawing space application), and/or a combination thereof. User input system 1 can perform these and other operations at the same time or at different times. In one non-limiting example, the operation of determining the location of stylus 400 can be performed simultaneously with the operation of determining the angular position of stylus 400, while the operation of estimating the magnitude of force by stylus 400 to input surface 110a may be performed only periodically and/or based on whether electronic device 100 is configured to accept force input from stylus 400 given a particular operational mode of electronic device 100 (or of stylus 400) at a particular time.

Figure 1A:
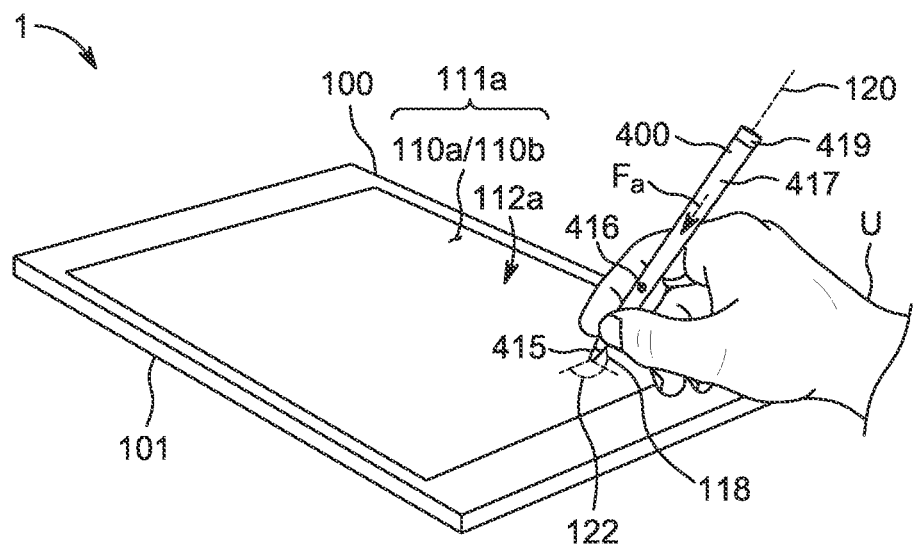
FIG. 1A is a perspective view of an exemplary power efficient stylus interacting with an input surface of an exemplary electronic device of the system of FIG. 1.
Figure 1B:
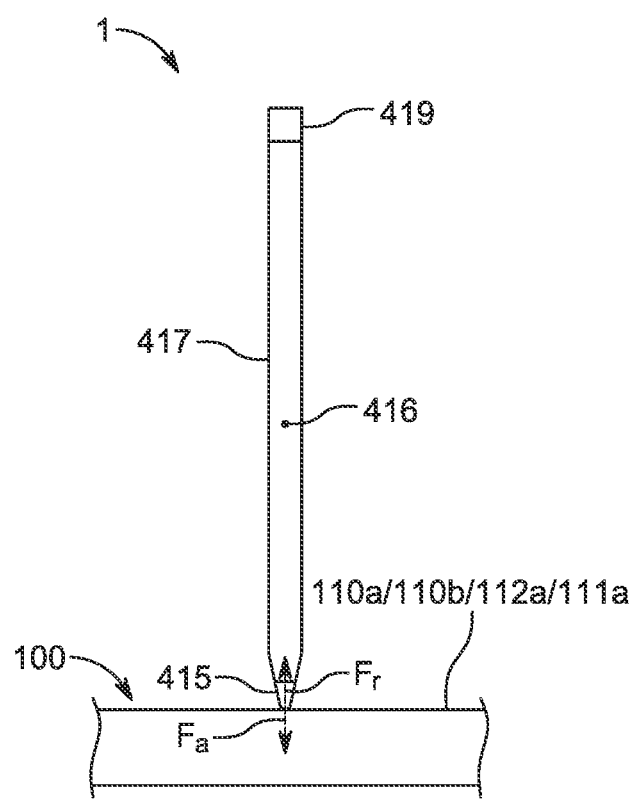
FIG. 1B is a side view of a portion of the system of FIGS. 1 and 1A with the stylus oriented normal to the input surface of the electronic device.
Figure 1C:
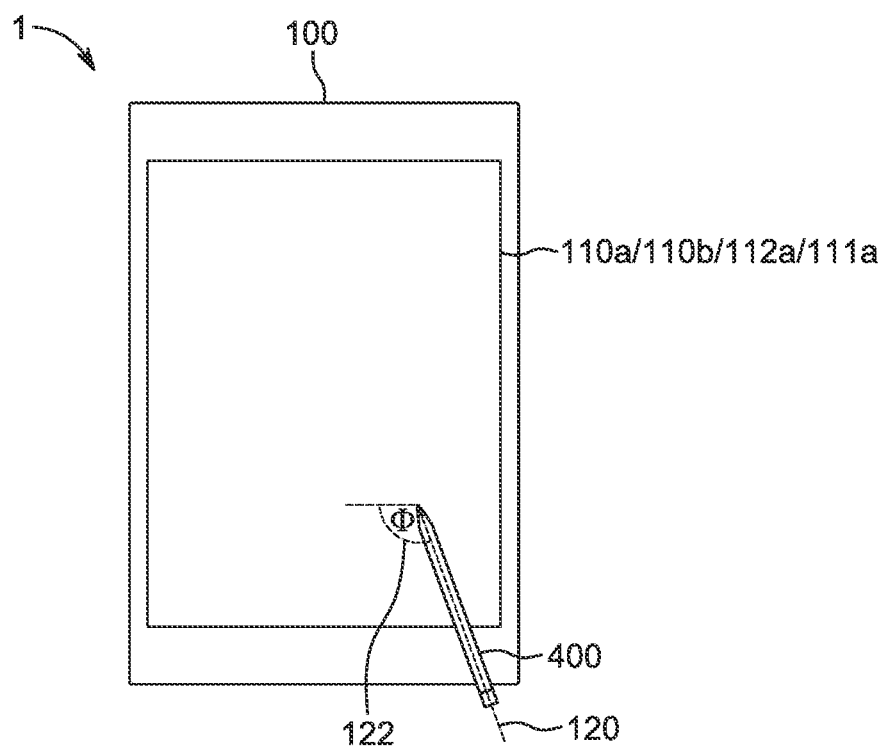
FIG. 1C is a front view of the system of FIGS. 1-1B showing the stylus oriented at an azimuthal angle of the stylus relative to a horizontal axis of the plane of the input surface of the electronic device.
Figure 1D:
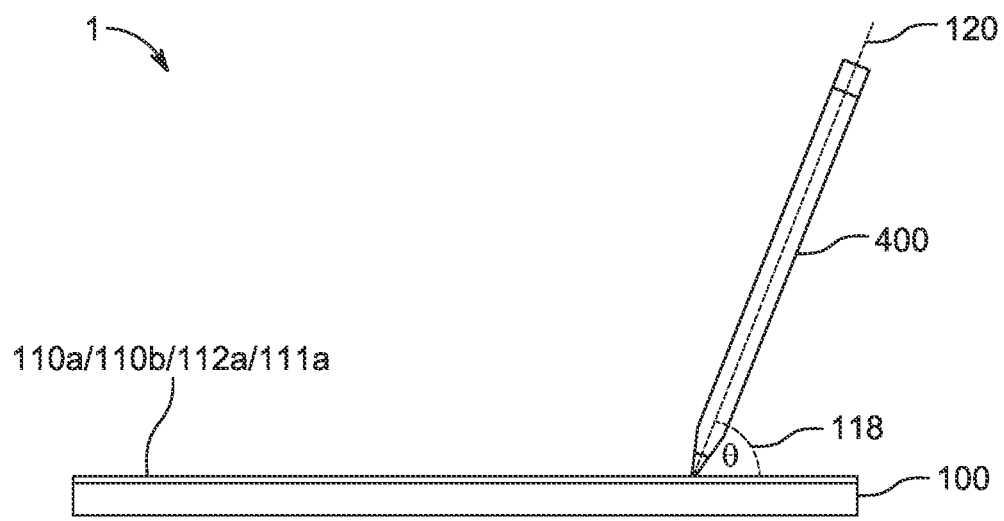
FIG. 1D is a bottom view of the system of FIGS. 1-1C showing the stylus oriented at a polar angle of the stylus relative to the plane of the input surface of the electronic device.

FIG. 1A depicts user U gripping a barrel or handle or body portion 417 of stylus 400 extending between a front tip portion 415 of stylus 400 and a rear tip portion 419 of stylus 400. User U may slide a tip portion, such as tip portion 415, of stylus 400 across input surface 110a of electronic device 100 to interact with a user interface presented or rendered on display output component 112a of electronic device 100, which may be positioned below at least a portion of input surface 110a or integrated with at least a portion of input surface 110a to provide I/O interface 111a of device 100. Although, in other embodiments, it is to be understood that device 100 may not include a display output component or may not include a display output component co-located with input surface 110a. Input surface 110a may be a foldable or flexible surface or display. As shown in FIGS. 1A-1D, device 100 may be presented as a tablet computing device as an example only, while many other electronic devices (with or without displays positioned below a stylus input surface) are envisioned. For example, the electronic device of user input system 1 can be implemented as a peripheral input device, a trackpad, a drawing tablet, and the like.

Stylus 400 may take various forms to facilitate use and manipulation by user U. In the illustrated example of FIGS. 1A-1D, stylus 400 may have a general form of a writing instrument, such as a pen or a pencil with a cylindrical body 417 with two ends, such as a first end terminated at front portion 415 and a second end terminated at rear portion 419. Either one or both of portions 415 and 419 can be removable and/or replaceable (e.g., by a user), affixed to body 417, or an integral part of body 417. User U may slide front portion 415 of stylus 400 across input surface 110a to convey information to electronic device 100. Electronic device 100 can interpret the user's manipulation of stylus 400 in any implementation-specific and suitable manner.

Body 417 of stylus 400 can be formed from any number of suitable materials, such as from plastics, metals, ceramics, laminates, glass, sapphire, wood, leather, synthetic materials, dielectric material, or any other material or combination of materials. Body 417 can form an outer surface (or partial outer surface) and protective case for one or more internal components of stylus 400 (e.g., as a portion of housing 401). Body 417 can be formed of one or more components operably connected together, such as a front piece and a back piece or a top clamshell and a bottom clamshell. Alternatively, body 417 can be formed of a single piece (e.g., uniform body or unibody). In some embodiments, body 417 may be configured, partially or entirely, as an optical signal diffuser to diffuse an infrared signal or another optical signal such as the light emitted from a multi-color light-emitting diode. In other cases, body 417 may be configured, entirely or partially, as an antenna window, allowing for wireless communications and/or electric fields to pass therethrough. Body 417 can be formed from a material doped with an agent configured to provide body 417 with a selected color, hardness, elasticity, stiffness, reflectivity, refractive pattern, texture, and so on. In other examples, the doping agent can confer other properties to body 417 including, but not necessarily limited to, electrical conductivity and/or insulating properties, magnetic and/or diamagnetic properties, chemical resistance and/or reactivity properties, infrared and/or ultraviolet light absorption and/or reflectivity properties, visible light absorption and/or reflectivity properties, antimicrobial and/or antiviral properties, oleophobic and/or hydrophobic properties, thermal absorption properties, pest repellant properties, colorfast and/or anti-fade properties, antistatic properties, liquid exposure reactivity properties, and so on.

Body 417 can exhibit a constant or a variable diameter cross-section. As illustrated, for example, the cylindrical cross-section view of body 417 may maintain a substantially constant diameter from tip portion 415 to rear portion 419. In other embodiments, body 417 can include a variable cross-section (e.g., a "profile" of body 417 can change across the length of body 417). In one example, the diameter of body 417 may be smaller near tip portion 415 than at rear portion 419. In some examples, the diameter of body 417 may bulge outward in the middle of body 417 between portions 415 and 419. In some cases, the profile of body 417 can follow a mathematical function such as a bump function, a Gaussian function, or a step function. Body 417 may include one or more grip features (not shown) such as embossments or impressions, closely-spaced channels, protrusions, projections, and/or the like. In some cases, a grip feature can be formed from a different material than body 417 (e.g., grip feature(s) may be formed from a polymer material exhibiting high friction).

Although illustrated as a cylinder, body 417 need not take a cylindrical shape in all embodiments. Accordingly, as used herein, the term "diameter" may refer to the linear distance that can connect two points of a two-dimensional shape, whether the shape is circular or otherwise. For example, stylus 400 can include a body 417 with an n-sided polygonal cross-section (e.g., a vesica piscis cross-section, a triangular cross-section, a square cross-section, a pentagonal cross-section, and so on) that either varies in diameter or is constant in diameter. In some examples, a cross-section of body 417 may be axially symmetric, although this is not required, as certain styluses in accordance with embodiments described herein may include body 417 with a cross-section that is reflectionally symmetric along one axis while being reflectionally asymmetric along another. In still further examples, body 417 can be formed into an ergonomic shape, including grooves, indents, and/or protrusions configured to enhance the comfort of user U. In some cases, body 417 may include a tapered section that decreases in diameter, linearly or non-linearly, toward tip portion 415. The diameter of body 417 at the interface of body 417 and tip portion 415 may be substantially similar to the diameter of tip portion 415 at that location. In this manner, the external surfaces of portions 415 and 417 may form a substantially continuous external surface of housing 401 of stylus 400. Additionally or alternatively, the diameter of body 417 at the interface of body 417 and rear portion 419 may be substantially similar to the diameter of rear portion 419 at that location. In this manner, the external surfaces of portions 417 and 419 may form a substantially continuous external surface of housing 401 of stylus 400.

One or more of portions 415, 417, and 419 of stylus 400 can define one or more apertures 416 in which one or more input components 410 and/or one or more output components 412 of stylus 400, such as a button, a dial, a slide, a force pad, a touch pad, audio component, haptic component, and the like, may at least partially reside and/or through which such component(s) may be at least partially exposed. The apertures (and, correspondingly, the input/output components associated therewith) can be defined at a lower end of body 417 nearby tip portion 415, such that the input/output components may be conveniently located near where user U may rest the user's forefinger when grasping stylus 400. As one example, an aperture 416 may expose at least a portion of a simple mechanical switch or button input component 410 that may be manipulated by user U for adjusting a variable setting of stylus 400 (e.g., stylus 400 may be configured to operate in a first mode when such an input component is manipulated in a first manner and in a second mode when such an input component is manipulated in a second manner (e.g., to select different patterns of stylus 400b described herein)).

Rear portion 419 of stylus 400, or more generally a "cap" of stylus 400, may be configured to provide a cosmetic end to body 417. In some cases, rear portion 419 may be formed integrally with body 417. In some cases, rear portion 419 may be formed similarly to front portion 415 for providing another tip feature for interacting with an input surface of device 100 (e.g., stylus 400 may be flipped over by user U to drag portion 419 across input surface input component 110a of electronic device 100 rather than to drag portion 415 across input surface input component 110a of electronic device 100, which may enable different user-selectable interactions with device 100). Any portion or the entirety of rear portion 419 may expose or provide at least a portion of a simple mechanical switch or button or any other suitable input component 410 that may be manipulated by user U for adjusting a variable setting of stylus 400 (e.g., stylus 400 may be configured to operate in a first mode when such an input component is manipulated in a first manner and in a second mode when such an input component is manipulated in a second manner (e.g., to select different patterns of stylus 400b described herein)).

Tip portion 415 of stylus 400, or more generally a "tip" of stylus 400, may be configured to contact or nearly contact input surface 110a of device 100 in order to facilitate interaction between user U and device 100. Tip 415 may taper to a point, similar to a pen, so that user U may control stylus 400 with precision in a familiar form factor. In some examples, tip 415 may be blunt or rounded, as opposed to pointed, or may take the form of a rotatable or fixed ball. Tip 415 may be formed from a softer material than input surface 110*a*. For example, tip 415 can be formed from a silicone, a rubber, a fluoro-elastomer, a plastic, a nylon, conductive or dielectric foam, a brass or metal ball with a polymer coating or dielectric coating (e.g., a thin coating with a high dielectric constant) or any other suitable coating, or any other suitable material or combination of materials. In this manner, drawing of tip 415 across input surface 110*a* may not cause damage to input surface 110*a* or layers applied to input surface 110*a*, such as, but not limited to, anti-reflective coatings, oleophobic coatings, hydrophobic coatings, cosmetic coatings, ink layers, and the like. Tip 415 can be configured to be removably attached to body 417, such as via threadings/screws, detents and/or recesses, interference-fit or snap-fit, and/or magnetic attraction, and/or the like, and electrically coupled capacitively, such as through a pogo-pin, spring, and/or the like.

Electronic device 100 may locate and/or estimate the angular position of stylus 400 substantially in real time. Device 100 can perform these operations with and/or without communications from stylus 400. As shown in FIGS. 1A-1D, device 100 may be depicted as a tablet computing device, although this form-factor is not required of all embodiments (as noted above). For example, device 100 can be any suitable device, such as a desktop computer, laptop computer, cellular phone, an industrial or commercial computing terminal, a medical device, a peripheral or integrated input device, a hand-held or battery powered portable electronic device, a navigation device, a wearable device, and so on. Display output component 112*a* may be positioned below input surface 110*a* or may be integrated with input surface 110*a*.

The communication interfaces, whether between electronic device 100 and stylus 400 or between device 100 and another device or server, or otherwise, can be implemented as capacitive coupling interfaces (e.g., via I/O interfaces 111 and 411 (e.g., as capacitive coupling interface data 51 (e.g., signal(s) received by or adjusted by or made available by one of the interfaces to the other interface))), inductive interfaces, resonant interfaces, optical interfaces, acoustic interfaces, magnetic interfaces, wireless interfaces, Bluetooth interfaces (e.g., via communication components 106 and 406 (e.g., as wired/wireless communication interface data 56)), universal serial bus interfaces, Wi-Fi interfaces, TCP/IP interfaces, network communications interfaces, or any other suitable communication interfaces. In some embodiments, stylus 400 may not be configured to communicate with device 100 via any communication component interfaces (e.g., stylus 400 may not be provided with any communications component (e.g., no communications component 406) but may still communicate with device 100 using any suitable I/O interface 411 (e.g., via I/O interfaces 111 and 411 (e.g., as capacitive coupling interface data 51)))). Electronic device 100 may provide information related to externally connected or communicating devices and/or software executing on such devices, messages, video, operating commands, and so forth (and may receive any of the foregoing from an external device), in addition to communications. Input surface 110*a* may cooperate with housing 101 of device 100 to form an external surface thereof. In some cases, a front surface of input surface 110*a* can be flush with an external surface of housing 101, although this is not required of all embodiments. In some examples, input surface 110*a* may stand proud of at least a portion of housing 101. Input surface 110*a* may be formed from glass or another suitable material, such as plastic, sapphire, metal, ceramic, ion-implanted glass, and so on. In some cases, input surface 110*a* may be a solid material, whereas in other cases, input surface 110*a* may be formed by laminating or adhering several materials together. Display component 112*a* may be positioned below, or integrated with, input surface 110*a*, where device 100 may utilize display 112*a* to render images to convey information to the user. Display 112*a* can be configured to show text, colors, line drawings, photographs, animations, video, and the like. Input surface 110*a* and/or display 112*a* may provide a foldable or flexible surface or display.

Device 100 can also include a sensor layer input component 110*b* positioned below, or integrated with, input surface 110*a* and/or display 112*a*, where device 100 may utilize the sensor layer to, among other purposes, detect the presence and/or location of stylus 400 on input surface 110*a*. In other examples, device 100 may utilize sensor layer 110*b* to detect the presence of another object on input surface 110*a*, such as a finger of the user. In still further examples, device 100 may utilize sensor layer 110*b* to detect the force with which an object, such as stylus 400, presses on input surface 110*a*. Such a sensor layer 110*b* (e.g., of input surface input component 110*a*) can be optically transparent or opaque. If sensor layer 110*b* of a particular embodiment is disposed within display 112*a*, sensor layer 110*b* may be optically transparent so as to not impact the clarity of the display. In another example, sensor layer 110*b* may be disposed around the perimeter of the display, positioned below a bezel surrounding the display, and/or the like. In this embodiment, sensor layer 110*b* need not be optically transparent. Input surface 110*a* and/or sensor layer 110*b* may provide at least a portion of a foldable or flexible surface or display. Sensor layer 110*b* may be a metallic grid that may be positioned between and not blocking one or more light-emissive elements of I/O interface 111*a* (e.g., for providing on-cell or in-cell electrodes). Additionally or alternatively, electrodes of sensor layer 110*b* could be shared with display electronics of I/O interface 111*a* (e.g., for providing in-cell electrodes).

Next, reference is made to the operation of locating stylus 400 on input surface 110*a* of device 100 using sensor layer 110*b* of device 100. Device 100 can locate an interface portion, such as tip 415, of stylus 400, and estimate the Cartesian coordinates thereof, in a number of suitable ways. In typical embodiments, stylus 400 is located as a result of cooperation between stylus 400 and device 100. Generally and broadly, stylus 400 may be operative to generate and/or adjust (e.g., using any suitable I/O interface or I/O component or I/O circuitry 411) an electric field (e.g., an electric field having a small effective diameter along input surface 110*a*, or an electric field where potential lines may be nearly spheres but where the electric field lines may be strongly curved but not circular). This "stylus electric field" (e.g., as adjusted and/or generated (e.g., caused) by stylus 400) may be provided by a stylus interface portion (e.g., tip 415) and may intersect input surface 110*a* when the stylus interface portion of stylus 400 is placed on or near surface 110*a*. Device 100 may detect the stylus electric field and estimate the location of stylus 400 (e.g., of the stylus interface portion (e.g., tip 415) based on the location (and/or area) at which the stylus electric field is detected). Sensor layer 110*b* may be configured to detect stylus electric fields caused by stylus 400, where layer 110*b* may include a number of capacitance sensing nodes that can be located on or between any suitable layer on or within display 112*a* and/or on or within input surface 110*a*. The capacitive sensing nodes may be formed, at least in part, from an optically transparent conductor, such as, but not limited to, metal oxides such as indium-tin oxide and antimony-tin oxide, nanowire patterns formed from silver nanowire, carbon nanotubes, platinum nanowire, gold nanowire, and so on, thin deposits of metal, and the like. The capacitive sensing nodes may be configured to operate in any suitable capacitance mode or projected capacitance touch ("PCT") mode, such as a self-capacitance mode, a mutual capacitance mode, or any other suitable capacitance mode or combination thereof, thereby capacitively coupling to stylus 400 and detecting signals and fields caused by stylus 400.

Stylus 400 may cause a substantially-spherical or hemispherical or any other suitably shaped stylus electric field to be provided thereby (e.g., from tip 415 by I/O circuitry 411). This stylus field may affect the capacitance (e.g., mutual capacitance or self-capacitance) of each capacitive sensing node nearby the stylus interface portion. Device 100 may locate stylus 400 on input surface 110*a* by monitoring each capacitive sensing node or an appropriate set of capacitive sensing nodes for these capacitive changes and estimating the location at which such changes (if any) have occurred. As used herein, the term "tip signal" may generally refer to an electrical signal provided by or received by stylus 400 at the stylus interface portion (e.g., tip 415). As used herein, the term "tip field" may generally refer to the stylus electric field provided by the stylus interface portion (e.g., tip 415) in response to the tip signal. The tip field may take any suitable shape, but in many embodiments, the tip field takes a substantially spherical (or hemispherical) shape and may be modeled as a point source monopole electric field. The area of input surface 110*a* (or a plane parallel to input surface 110*a*) intersected by the tip field may be generally referred to herein as the "tip field intersection area," which may be any suitable shape, such as substantially circular. A perimeter of the tip field intersection area may be defined as the boundary after which the power density (e.g., magnitude) of the tip field received by electronic device 100 may be below a selected threshold. In one example, the circumference of the tip field intersection area may be defined at the half-power point of the tip field. In other words, in this example, the tip field intersection area may be defined as a portion of input surface 110*a* intersected by the tip field with a magnitude at least greater than half of the power at which that field was provided. A charge footprint (e.g., charge profile) may be counted out as far as it is above a noise floor.

The tip signal can have at least one alternating current component that, via capacitive coupling or another suitable sensing technique, may be received (e.g., as the tip field) by the sensor layer of the electronic device. Many embodiments are described herein with reference to a sensor layer 110*b* of electronic device 100 that may be configured to detect the tip signal by monitoring mutual capacitance. However, it may be appreciated that electronic device 100 can be appropriately configured in any implementation-specific manner to detect the tip field. For example, electronic devices can include a sensor layer configured to monitor for changes in the self-capacitance of one or more capacitive sensor nodes. In other examples, an electronic device can be configured to operate in both a self-capacitance mode and a mutual capacitance mode. In other embodiments, other sensing techniques can be used to determine the location and relative position of the tip field. As noted above, sensor layer 110*b* can also be used to detect one or more fingers or the palm or the like of user U while simultaneously detecting the tip field. In these cases, electronic device 100 can accept both touch input and stylus input.

In many cases, processor 102 of device 100 may be configured to detect the tip signal received through sensor layer 110*b* from stylus 400 via capacitive coupling. Processor 102 may be configured to demodulate, decode, or otherwise filter one or more raw signals received from sensor layer 110*b* and/or from any other sensor/input component in order to obtain the tip signal, and/or data that may be modulated therewith and/or any other suitable data. The operation of obtaining the tip signal, as performed by processor 102 (or another component communicably coupled to sensor layer 110*b*), can be accomplished in a number of implementation-specific ways, suitable for any number of embodiments. Processor 102 may perform (or assist with the performance of) the operation of locating stylus 400 on input surface 110*a* employing any suitable techniques once the tip signal is obtained, and the tip field intersection area is determined. Processor 102 can further use such information for further processing and interpretation once the location of stylus 400 is estimated.

In many embodiments, processor 102 may be configured to obtain estimations of the location of stylus 400 within certain statistical bounds (e.g., within an error of 100 micrometers, within 50 micrometers, within 10 micrometers, or any other suitable bounds). One may appreciate that the accuracy and/or precision of the operation of locating stylus 400 by device 100 may differ from embodiment to embodiment. In some cases, the accuracy and/or precision of the operation(s) may be substantially fixed, whereas in other cases, the accuracy and/or precision of the operation(s) may be variable depending upon, among other variables, a user setting, a user preference, a speed of the stylus, an acceleration of the stylus, a setting of a program 103 operating on electronic device 100, a setting of electronic device 100, an operational mode of electronic device 100, a power state of device 100, a power state of stylus 400, an identification of a setting or characteristic of stylus 400, and so on.

The tip signal can include certain information and/or data that may be configured to identify stylus 400 to electronic device 100. Such information may generally be referred to herein as "stylus identity" information (e.g., information indicative of a particular stylus tip of stylus 400*a* with a particular harmonic and/or phase as described herein). This information and/or data may be received by sensor layer 110*b* and interpreted, decoded, and/or demodulated by processor 102 of device 100. Processor 102 may utilize stylus identity information (or an absence thereof) in any suitable manner including, but not limited to, accepting or rejecting input from a particular stylus, accepting input from multiple styli and/or from a single stylus, permitting or denying access to a particular functionality of the electronic device, applying a particular stylus profile, restoring one or more settings of the electronic device, notifying a third party that the stylus is in use, applying a setting to the electronic device, applying a setting to a program operating on the electronic device (e.g., which may include updating a user interface on display 112*a* or otherwise of device 100), changing a line thickness, color, pattern, erasure, and so on of a graphical object to be rendered by a graphics program of the electronic device, changing a setting of a video game operating on the electronic device, and so on. Processor 102 may be operative to receive stylus identity information for stylus 400. Additionally or alternatively, processor 102 may be operative to receive stylus identity information from each one of two different styluses that may be interacting with device 100. For example, processor 102 may be operative to determine that a first detected stylus is positioned 3 centimeters away from a second detected stylus, which may be communicated via display 112*a* to the user(s) in any suitable manner. Additionally or alternatively, any suitable data communicated from stylus 400 may be operative to include certain information and/or data that may serve to identify a particular setting or preference of the user or of the stylus (e.g., a current setting of a variable input component or other suitable reconfigurable characteristic of the stylus (e.g., data indicative of a particular property of an input component 410 of stylus 400)), where such information may generally be referred to herein as "stylus setting" information (e.g., information indicative of a particular pattern of stylus 400*b* as described herein). Processor 102 may be operative to use stylus setting information (or an absence thereof) in any suitable manner including, but not limited to, applying a setting to the electronic device, applying a setting to a program operating on the electronic device (e.g., which may include updating a user interface on display 112*a* or otherwise of device 100), changing a line thickness, color, pattern, erasure, and so on of a graphical object to be rendered by a graphics program of the electronic device, changing a setting of a video game operating on the electronic device, and so on.

A stylus of system 1 may not be provided with any power supply (e.g., no battery or any other suitable power supply like power supply 408), such that the stylus may not be operative to generate any stylus electric field independently (e.g., without being stimulated by an external stimulus). Instead, a stylus may be provided with limited stylus I/O circuitry that may be operative to be stimulated by an external stimulus, such as a device stimulus that may be generated by device I/O circuitry of device I/O interface 111*a* of electronic device 100 and that may be operative to stimulate the stylus I/O circuitry when located proximate to device I/O interface 111*a* and/or by user U when holding stylus 400, whereby that stimulation of the stylus I/O circuitry may be operative to enable the stylus I/O circuitry to provide any suitable stylus electric field that may then be detected by device 100 for estimating the location of the stylus. Not only may such stylus I/O circuitry be configured to require no internal power supply for providing a unique stylus electric field, but also such stylus I/O circuitry, when stimulated, may be configured to provide a stylus electric field that may be distinguishable by device 100 from an electric field that may be provided by a user's direct contact with device I/O interface 111*a*.

Figure 2:
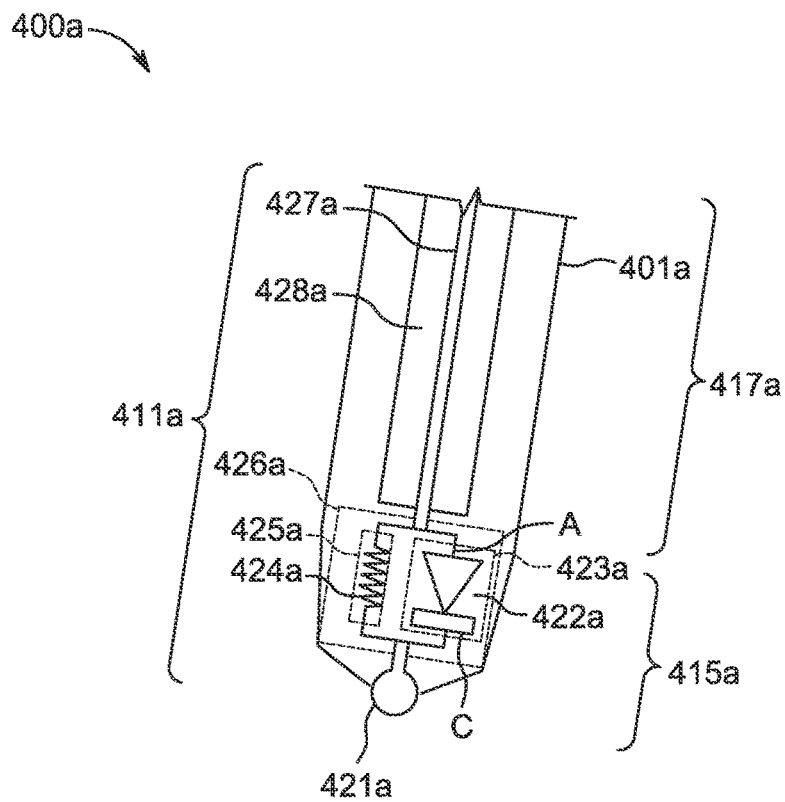
FIG. 2 is a partially transparent, semi-schematic view of an illustrative portion of a stylus of the system of FIGS. 1-1D.
Figure 2A:
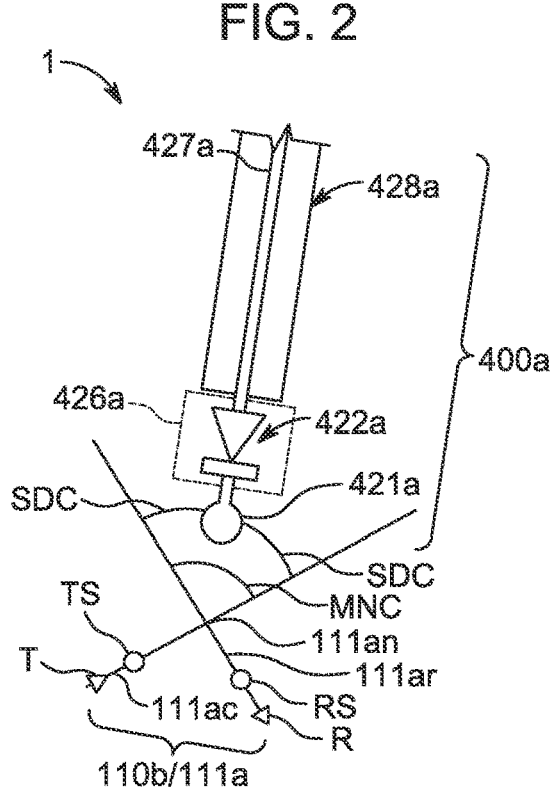
FIG. 2A is a schematic view of a portion of the system using a portion of a stylus of FIGS. 1-1D and 2.
Figure 2B:
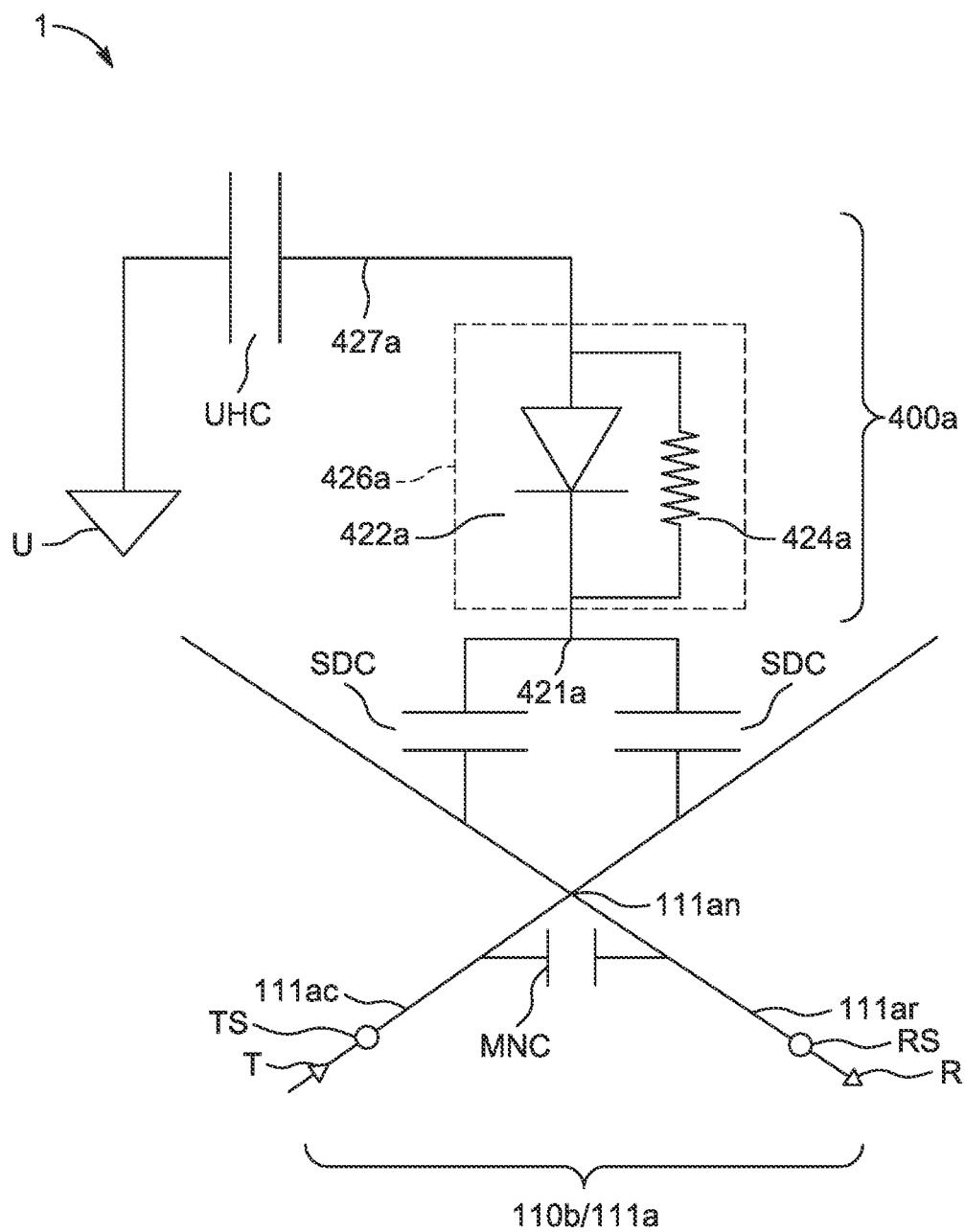
FIG. 2B is a circuit diagram of the portion of the system using the portion of the stylus of FIGS. 1-2A.
Figure 2C:
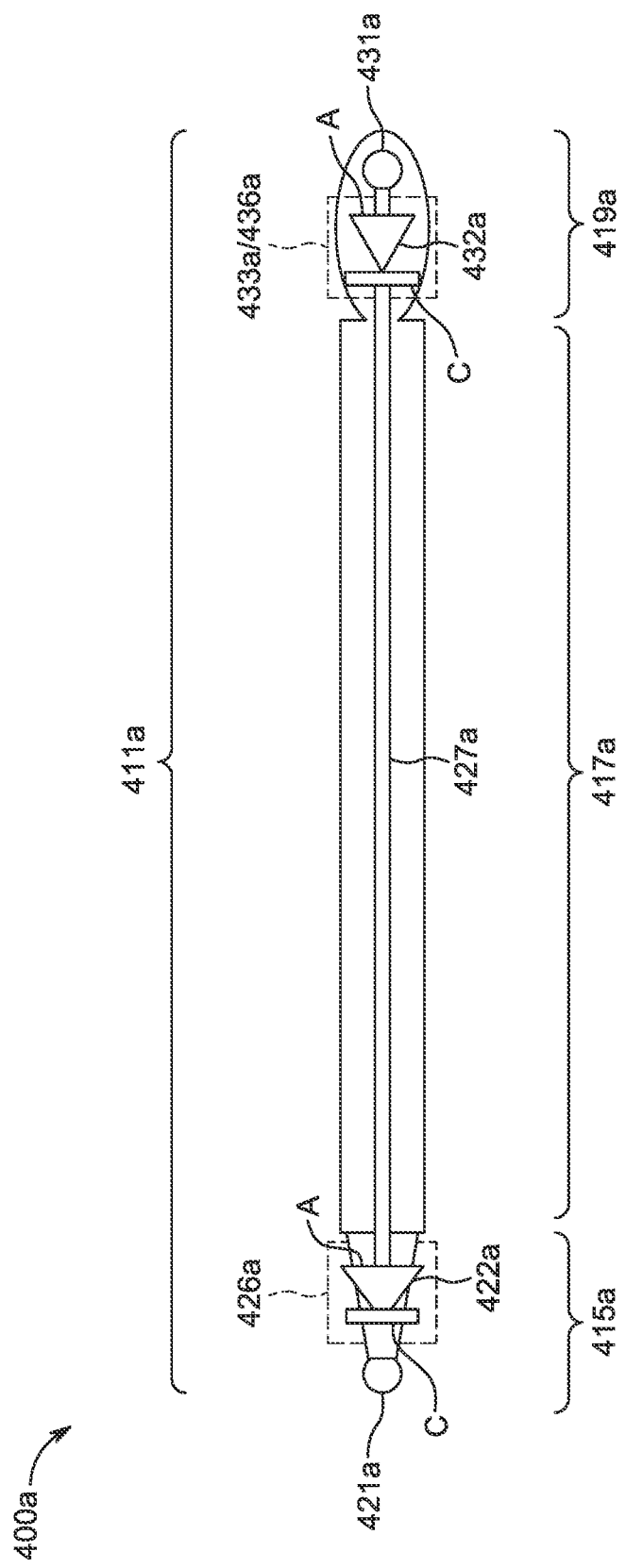
FIG. 2C is a partially transparent, semi-schematic view of the stylus of FIGS. 1-2B.
Figure 2D:
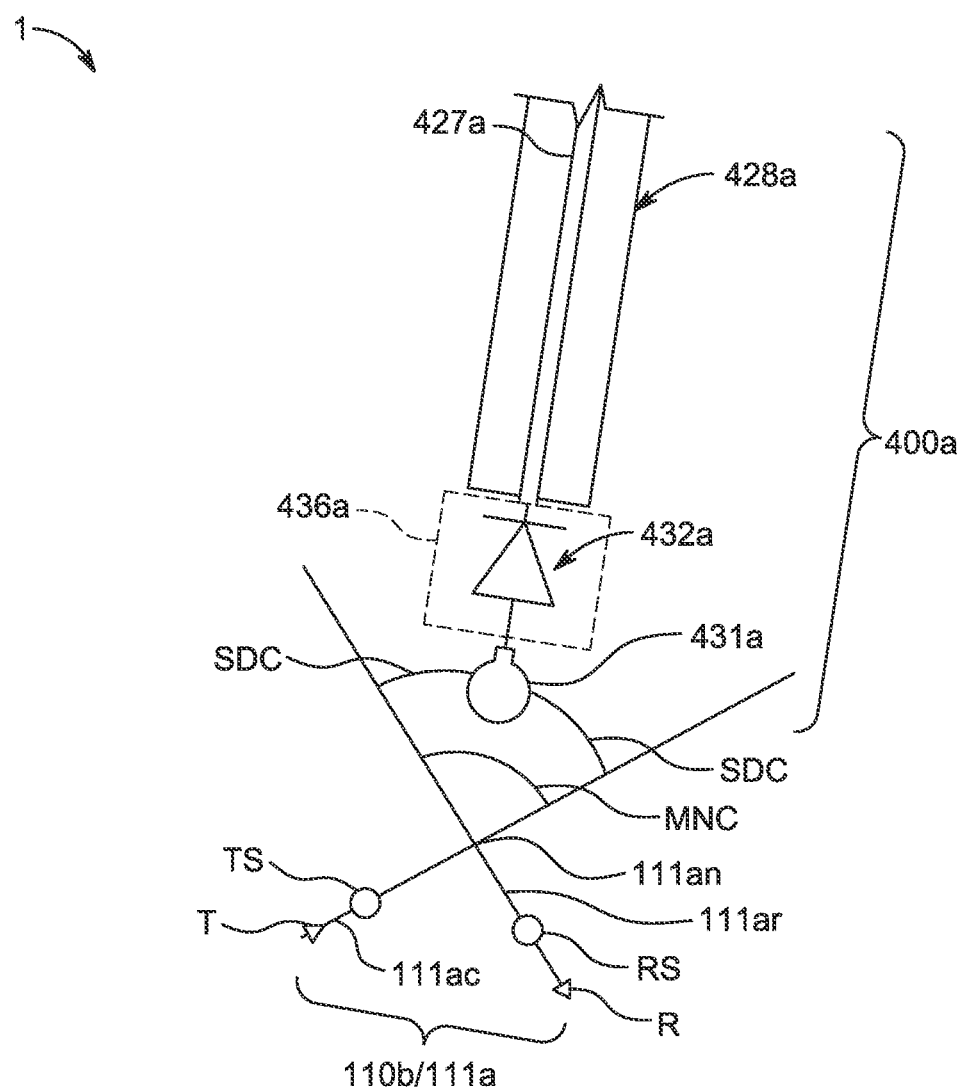
FIG. 2D is a schematic view of the portion of the system using another portion of the stylus of FIGS. 1-2C.
Figure 2E:
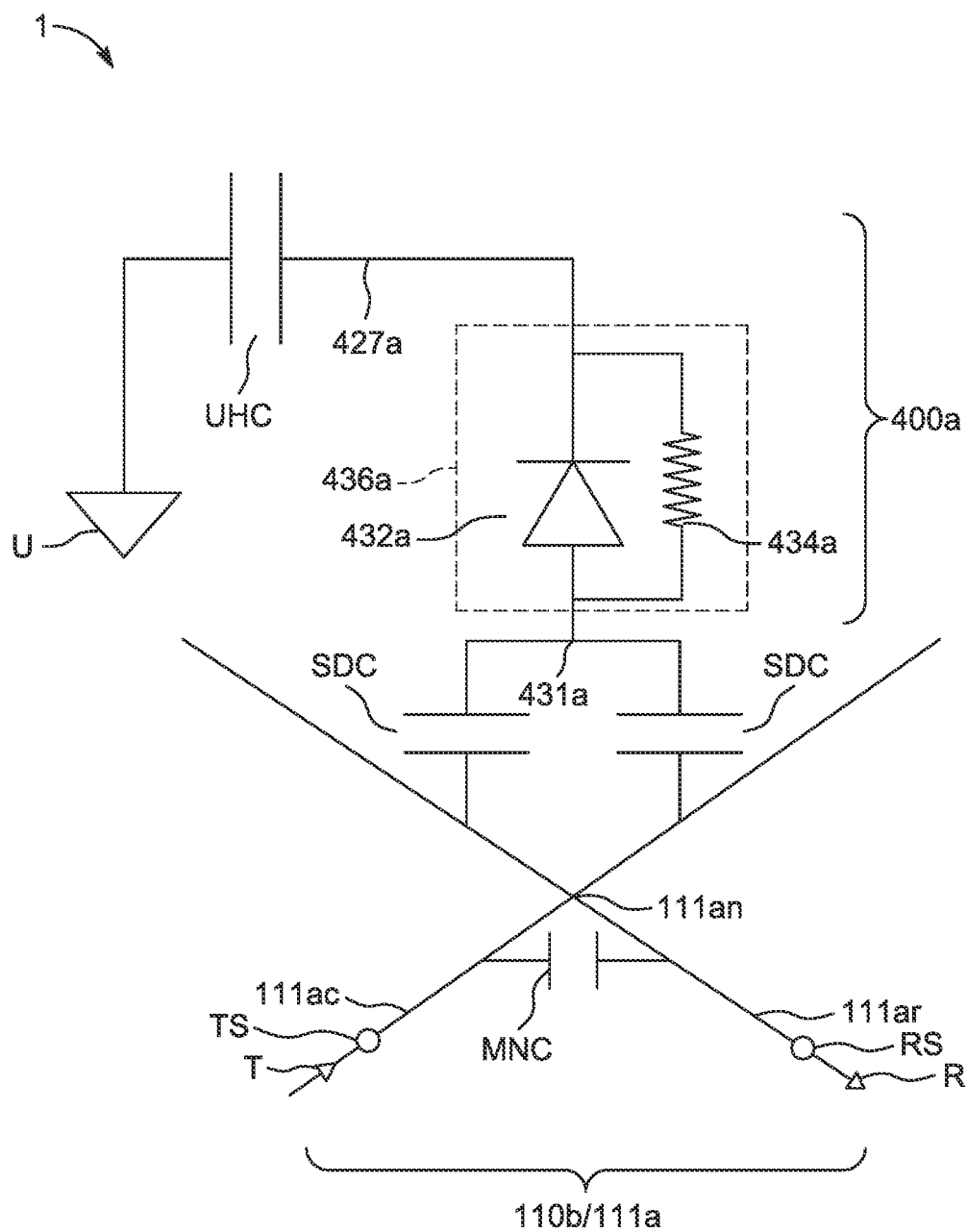
FIG. 2E is a circuit diagram of the portion of the system using the other portion of the stylus of FIGS. 1-2D.
Figure 2F:
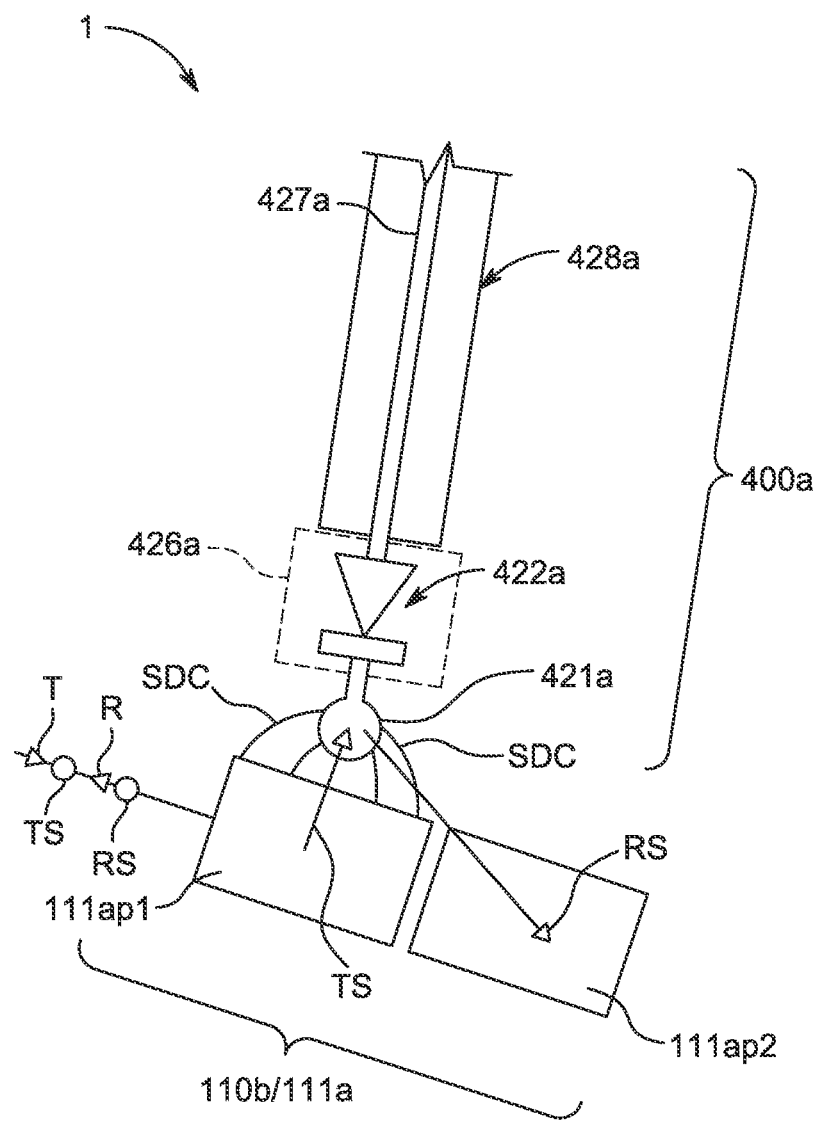
FIG. 2F is a schematic view of another portion of the system using the portion of the stylus of FIGS. 1-2E.
Figure 2G:
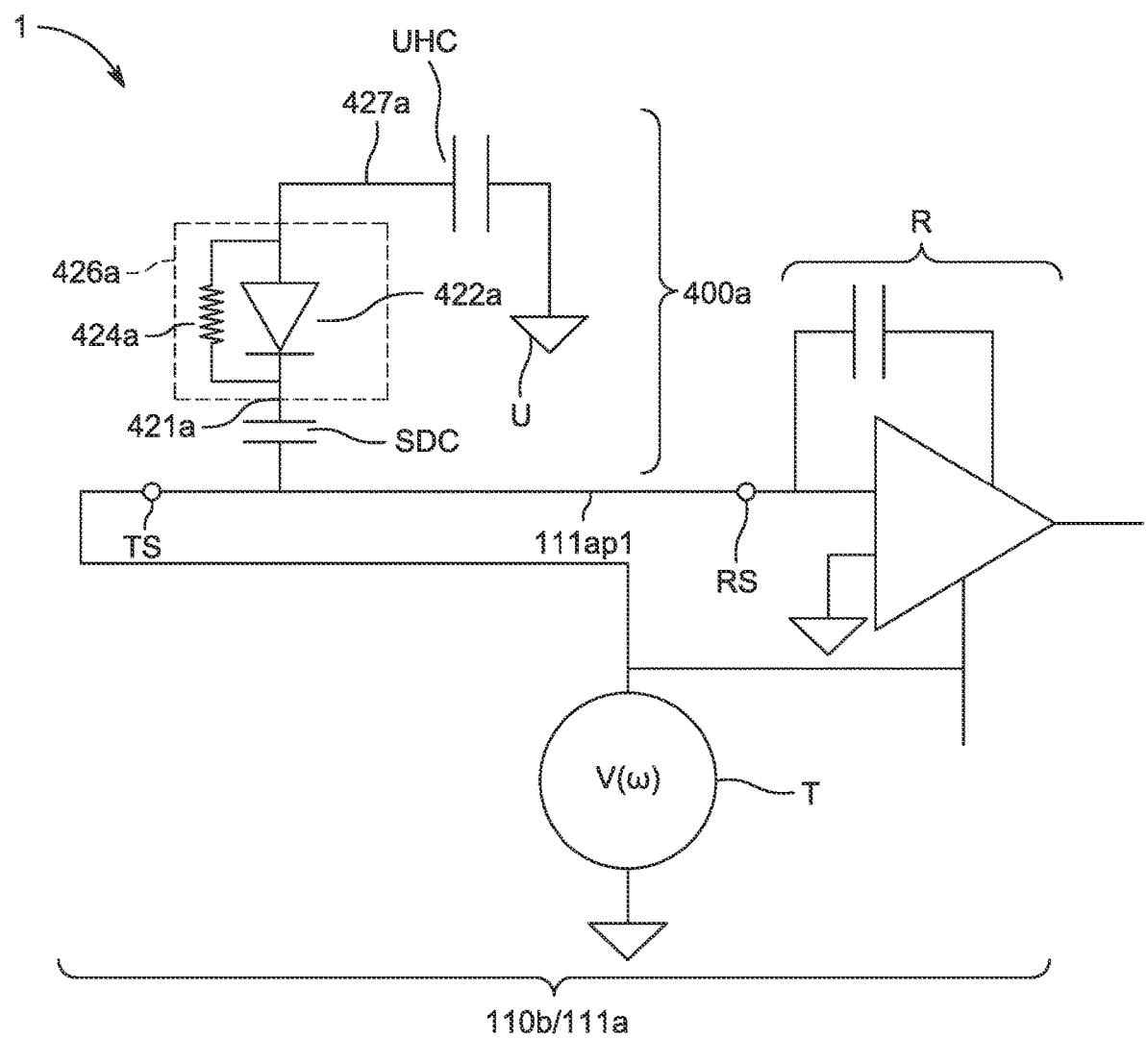
FIG. 2G is a circuit diagram of the other portion of the system using the portion of the stylus of FIGS. 1-2F.

For example, FIGS. 2-2G illustrate stylus 400*a*, alone and/or in combination with device 100 of system 1, that may include stylus I/O circuitry 411*a*, where stylus I/O circuitry 411*a* may be operative to be stimulated only by external stimulus, such as a device stimulus that may be generated by device I/O circuitry of device I/O interface 111*a* of electronic device 100 and/or by user U when holding stylus 400*a*, whereby that stimulation of stylus I/O circuitry 411*a* may be operative to enable stylus I/O circuitry 411*a* to provide any suitable stylus electric field that may then be detected by device 100 for estimating the location of stylus 400. As shown by FIGS. 2 and 2C, for example, stylus 400*a* may include a barrel or handle or body portion 417*a* extending between a front tip portion 415*a* and a rear tip portion 419*a*, where body portion 417*a* may be configured to be held by user U as the user may slide a tip portion of stylus 400 across input surface 110*a* of device I/O interface 111*a* of device 100.

Stylus I/O circuitry 411*a* may include body stylus circuitry 427*a* that may be electrically coupled to front tip stylus circuitry 426*a* and/or to rear tip stylus circuitry 436*a*. Body stylus circuitry 427*a* may be any suitable circuitry that may be operative to be electrically coupled (e.g., capacitively coupled) to user U when user U is holding stylus 400*a* about at least a portion of body portion 417*a*. As shown in FIGS. 2 and 2C, for example, body stylus circuitry 427*a* may be at least one conductive wire extending along at least a portion of a length of body portion 417*a* of stylus 400*a*, which may be insulated by any suitable insulation 428*a*. Alternatively, body stylus circuitry 427*a* may be provided by a conductive (e.g., copper) tape along a portion of body 417*a*, where such tape may be positioned under any suitable insulation, such as a finger pad of any suitable material. Any suitable housing 401*a* may be provided to protect body stylus circuitry 427*a*, such as a plastic housing. In some embodiments, such a housing may be operative to provide insulation 428*a*. Additionally or alternatively, at least a portion of body stylus circuitry 427*a* may be at least partially exposed via housing 401*a* and/or insulation 428*a* for enabling direct contact by user U. When user U is holding stylus 400*a* about and/or along a portion of body 417*a*, a capacitance or user-handle capacitor UHC may be inherently formed (e.g., as shown in FIGS. 2B, 2E, and 2G). The capacitance of user-handle capacitor UHC may be relatively large compared to a panel to tip capacitance (e.g., electric field response capacitances SDC between front tip interface component 421*a* and each one of array trace row 111*ar* and array trace column 111*ac* of one or more nodes 111$_{an}$ proximate front tip interface component 421*a*), but not so large that electrostatic discharges would be likely to damage the device. For example, the capacitance of user-handle capacitor UHC may be any suitable capacitance, such as a capacitance in the range of 1.0 picofarad to 10.0 picofarads, as a panel to tip capacitance may be in the range of 50.0 femtofarads to 200.0 femtofarads. The capacitance of user-handle capacitor UHC may be able to stand off the voltage of typical electrostatic discharge impulses (e.g., 10 kilovolts or so).

Stylus I/O circuitry 411*a* may include a front tip interface component 421*a* that may provide at least a portion of front tip portion 415*a*. Front tip interface component 421*a* may be the portion of stylus 400*a* configured to directly interface with device I/O interface 111*a*. For example, front tip interface component 421*a* may be formed from any suitable material, including, but not limited to, silicone, rubber, fluoro-elastomer, plastic, nylon, conductive or dielectric foam, metal (e.g., brass (e.g., a brass ball with a dielectric or polymer coating (e.g., a thin coating with a high dielectric constant))), or any other suitable material or combination of materials. In this manner, drawing of front tip interface component 421*a* across input surface 110*a* may not cause damage to input surface 110*a* or layers applied to input surface 110*a*, such as, but not limited to, anti-reflective coatings, oleophobic coatings, hydrophobic coatings, cosmetic coatings, ink layers, and the like. Front tip interface component 421*a* can be configured to be removably attached to body 417*a*, such as via threadings/screws, detents and/or recesses, interference-fit or snap-fit, and/or magnetic attraction, and/or the like, and electrically coupled capacitively, such as through a pogo-pin, spring, and/or the like. Transit of any stylus electric field may be provided from front tip interface component 421*a* and not from other portions of stylus I/O circuitry 411*a*. Front tip interface component 421*a* may be any suitable shape, such as a sphere or hemisphere or spherical cap, of any suitable size. For example, in some particular embodiments, front tip interface component 421a may be provided as a ball (e.g., a solder ball and/or brass ball) of any suitable diameter, such as 2 millimeters or 3.6 millimeters in diameter, or in the range of 1.7 millimeters to 2.3 millimeters, or in the range of 3.3 millimeters to 3.9 millimeters, or, as one example, a brass or metal ball with a diameter of 3.6 millimeters and with a coating thereabout of about 0.2 millimeters thickness. Front tip interface component 421a may be a metal or brass ball with a coating or a conductive polymer ball shape, with a total diameter of about 3.4 millimeters or 3.0 millimeters or 2.4 millimeters or 2.0 millimeters. Front tip interface component 421a may be configured to provide the same footprint area (e.g., tip field intersection area (e.g., of charge)) on input surface 110a no matter (e.g., substantially no matter) the angle of axis 120 with respect to a plane of input surface 110a. The size of front tip interface component 421a may be made as small as possible to enable precise localization of front tip portion 415a with respect to device I/O interface 111a.

Front tip stylus circuitry 426a may be positioned between and electrically coupled to each one of front tip interface component 421a and a portion (e.g., a front end) of body stylus circuitry 427a. Front tip stylus circuitry 426a may be configured as any suitable circuitry that may be operative to provide a non-linear load between body stylus circuitry 427a and front tip interface component 421a when user U is holding body 417a of stylus 400a such that front tip interface component 421a of stylus 400a may be stimulated by a device stimulus that may be generated by device I/O circuitry of device I/O interface 111a of electronic device 100. For example, front tip stylus circuitry 426a may include any suitable non-linear electrical circuitry 423a that may be electrically coupled (e.g., in series) between front tip interface component 421a and body stylus circuitry 427a. Non-linear electrical circuitry 423a may include any suitable number of any suitable type(s) of non-linear electrical elements, such as at least one diode 422a. Diode 422a may be any suitable type of diode, such as a Schottky diode, a transistor in diode configuration (e.g., a diode connected transistor), and/or the like. In some embodiments, non-linear electrical circuitry 423a may include any suitable number (e.g., two or three or four or more) of diodes 422a that may be coupled together in series (e.g., a cathode of one diode may be coupled to an anode of a next diode and/or the like) or in parallel. Alternatively, as shown, only a single diode 422a may be provided by non-linear electrical circuitry 423a, where an anode A of diode 422a may be electrically coupled to body stylus circuitry 427a and where a cathode C of diode 422a may be electrically coupled to front tip interface component 421a.

Device I/O circuitry of I/O interface 111a may be configured in any suitable manner to provide a device stimulus for stimulating front tip interface component 421a of stylus 400a when front tip interface component 421a of stylus 400 is positioned on or close to input surface input component 110a of I/O interface 111a as user U may drag front tip interface component 421a across input surface input component 110a. For example, sensor layer 110b of the device I/O circuitry of I/O interface 111a may be configured to monitor changes in mutual capacitance that may be caused by a stylus electric field provided by stylus 400a at one or more capacitive sensing nodes of sensor layer 110b. As shown in FIGS. 2A, 2B, 2D, and 2E, for example, sensor layer 110b may be configured to provide an array of mutual capacitive sensors or sensing nodes that may be operative to enable mutual capacitance PCT sensing techniques. Sensor layer 110b may provide an array or grid of any suitable number of array trace columns 111ac and any suitable number of array trace rows 111ar, any two of which may intersect to provide a sensing node 111an. A capacitance or mutual node capacitor MNC may be inherently formed at each sensing node 111an (e.g., as shown in FIGS. 2A, 2B, 2D, and 2E). When any suitable electrical signal (e.g., transmit signal) TS may be provided along one, some, or each of array trace columns 111ac by any suitable transmitter circuitry T (e.g., a high frequency driven amplifier and/or a voltage source V controlled by a waveform w (e.g., a sinusoid or trapezoid shaped waveform) of any suitable magnitude (e.g., 6.5 volts amplitude (e.g., peak to peak)) and/or of any suitable frequency (e.g., 150 kHz or 70 kHz or 40 kHz or the like), or any other suitable configuration), any suitable electrical signal (e.g., receive signal) RS may be detected by any suitable receiver circuitry R that may be provided along each one of array trace rows 111ar. While signal TS (e.g., a voltage) is applied to an array trace column 111ac, bringing a finger or conductive stylus close to the surface of sensor layer 110b may change the local electrostatic field (e.g., in response to signal TS and/or capacitance MNC stimulating front tip interface component 421a of stylus 400a), which in turn may reduce the mutual capacitance. The capacitance change at every individual point on the array grid can be measured to determine the touch location accurately by measuring and analyzing the signal in the other axis, such as signal RS along each array trace row 111ar. Mutual capacitance may allow multi-touch operation where multiple fingers, palms, or styli can be accurately tracked at the same time. For example, as shown in FIGS. 2A and 2B, capacitance MNC and/or signal TS at one or more nodes 111an may be received by front tip interface component 421a and may stimulate front tip stylus circuitry 426a, which, in turn, may be operative to provide a non-linear load between body stylus circuitry 427a and front tip interface component 421a for generating a stylus electric field response for changing the electric field local to one or more nodes 111an. For example, the reaction of the stimulus and the non-linear load may create harmonics, which may then be received by one or more nodes, such as by node 111an of FIGS. 2A and 2B and/or by an associated array trace row 111ar and/or by an associated array trace column 111ac, for example, via electric field response capacitances SDC between front tip interface component 421a and each one of array trace row 111ar and array trace column 111ac of one or more nodes 111an proximate front tip interface component 421a. Such harmonics may then be detected as signal RS along an array trace row 111ar of one or more nodes 111an on the array grid and then such signals may be analyzed (e.g., using any suitable algorithms or detection applications 103 of device 100 (e.g., at processor 102 or any suitable circuitry (e.g., of I/O interface 111a))) to determine the touch location of front tip interface component 421a of stylus 400a along input surface input component 110a of I/O interface 111a. Therefore, signal TS may be adjusted by the non-linearity of front tip stylus circuitry 426a at or near a node 111an and that adjustment (e.g., as harmonics) may be detected as signal RS by that node 111an.

When a frequency may be transmitted through a trace of the mutual capacitance sensor array, such as by signal TS along one or more array trace columns 111ac, the signal may drive a current back and forth through non-linear electrical circuitry 423a of front tip stylus circuitry 426a (e.g., through one or more non-linear electrical elements, such as through at least one diode 422a) when user U holding body 417a of stylus 400a positions front tip interface component 421a of stylus 400a proximate at least one of the array trace columns. Such driving of current back and forth through non-linear electrical circuitry 423a may enable front tip interface component 421a to see a modulated version of signal TS rather than a pure version of signal TS because front tip stylus circuitry 426a may be loaded by a non-linear bias, such that current may pass through front tip stylus circuitry 426a more easily in one direction but may be clipped in the other direction for providing a harmonic. For example, when front tip stylus circuitry 426a includes a single diode 422a, a second harmonic of signal TS may be provided by front tip interface component 421a. Therefore, when such a stylus 400a may be known to be available to a user of device 100, device 100 may be configured (e.g., via any suitable application and/or algorithm(s) or control circuitry for handling I/O interface 111a) to look for a second harmonic of signal TS along one or some or each array trace row 111ar (e.g., by signal RS) for determining the location of stylus 400a, where the amount of second harmonic that may be detected for each row or node 111an may depend on how close that row or node may be to front tip interface component 421a of stylus 400a. Such a second harmonic may be generated by the rectification by the diode of the transmit voltage signal TS, capacitively divided down. A divider (e.g., capacitor divider) may be provided by system 1, as may be made up of a capacitance of front tip interface component 421a of stylus 400a to the transmit plane of sensor layer 110b or otherwise of I/O interface 111a versus the impedance of front tip stylus circuitry 426a (e.g., of diode 422a), which may include its junction capacitance. Front tip interface component 421a may be configured to have adequate effective capacitance for passive location using projective capacitance, such as, for example, an effective capacitance of 200 femtofarads or any other suitable magnitude.

Once a charge on a transmit plane of I/O interface 111a (e.g., signal TS) may be seen to be modulated at a harmonic (e.g., a second harmonic (e.g., by I/O interface circuitry 411a of stylus 400a)), I/O interface 111a may be configured to act as a transmitter of that harmonic. Such a harmonic of a transmit signal TS, as may be effected by non-linearity of front tip stylus circuitry 426a, may be unique compared to any adjustment or effect that may be caused by a direct touch or near touch by user U (e.g., by a finger of user U) at I/O interface 111a, such that device 100 may be configured to distinguish between the two accordingly. For example, while a user's finger touch may be operative to steal some of an electric field generated by a transmit signal, a harmonic generated by front tip stylus circuitry 426a of stylus 400a may be specifically different and unique, such that device 100 may be configured to detect and use such passive signal harmonics, for example, and also to reject any detected finger user touches, in order to determine an accurate location of stylus 400a. For example, when front tip stylus circuitry 426a includes a single diode 422a, a second harmonic of signal TS may be provided by front tip interface component 421a, such that when a signal (e.g., signal TS) is transmitted by device 100 along I/O interface 111a with a particular frequency (e.g., 150 kHz or 70 kHz or 40 kHz), device 100 may be configured to look for a signal (e.g., signal RS) with twice that particular frequency (e.g., 300 kHz or 140 kHz or 80 kHz), where the harmonic may be weaker than the signal at the fundamental frequency (e.g., about 20-25 db down from the signal level from a passive stylus), but unique, and with low background at that frequency. Therefore, when such a stylus 400a for providing second harmonics may be known to be available to a user of device 100, device 100 may be configured (e.g., via any suitable application and/or algorithm(s) or control circuitry for handling I/O interface 111a) to look for a second harmonic of signal TS by signal RS for determining the location of stylus 400a, where the amount of second harmonic that may be detected for each row or node 111an may depend on how close that row or node may be to front tip interface component 421a of stylus 400a. Signal TS may be transmitted as any suitable signal, such as a sinusoid shaped signal or a trapezoid shaped signal or any other suitably shaped signal whose non-linear distortion or harmonics of any suitable order may be detectable efficiently and/or effectively by any suitable control application(s) and/or algorithm(s) of device 100.

Device I/O interface control of I/O interface 111a for identifying and locating such a stylus 400a may be specifically configured or tuned for that particular type of stylus, such that it may be effectively operative to initially identify and roughly locate the location of such a stylus (e.g., by effectively enabling rejection of other types of touch detection (e.g., user finger touch)), such as through detection of a non-linear distortion of the transmitted signal or one or more second harmonic signals (e.g., to a pixel or node pitch distance), and then the control (e.g., one or more algorithms or applications) may be configured to switch to a mode specific to that type of detected stylus (e.g., across sensor layer 110b or within a particular radius of the initially detected position of the stylus (e.g., for better jitter performance)). For example, an algorithm may be configured to sense for a particular harmonic of a stylus for a particular transmitted signal, and once detected, more intense and/or frequent and/or focused scans may be utilized to detect that particular harmonic along the I/O interface (e.g., as part of a normal scan, attempt to detect a particular harmonic of a particular expected stylus, and then when that particular harmonic is detected, ramp up the scan features to track that particular stylus (e.g., a type of signal driving may be updated (e.g., only traces around the initially detected position of the stylus may be driven (e.g., to reduce signal to noise))).

At least one non-linear electrical element or load or rectifier, such as at least one diode 422a, of non-linear electrical circuitry 423a that may be electrically coupled to front tip interface component 421a may enable stylus 400a to be identified and distinguished from nearby user touches, dragging fingers, palm rests, and/or the like, due to a non-linear load that may generate a non-linear distortion or harmonics (e.g., a second harmonic) at touch pixels near the stylus tip. Each non-linear electrical element may be configured with any suitable characteristics. For example, diode 422a may be provided with any suitable characteristics, such as a low capacitance (e.g., low parasitic capacitance), low reverse leakage, and/or low turn on voltage diode. The junction capacitance of such a diode may be configured to be low (e.g., less than 1.0 picofarad and/or less than 50 femtofarads). A reverse leakage current of such a diode may be controlled to be not too high. A Schottky diode, two or more Schottky diodes in series, or a specifically designed diode may be best suited for such a use. In some embodiments, as shown, circuitry 426a may also include (e.g., in parallel with non-linear electrical circuitry 423a) any suitable resistance circuitry 425a (e.g., at least one resistor 424a) for any suitable function, including, but not limited to, controlling reverse leakage current of non-linear electrical circuitry 423a and/or preventing direct current ("DC") positive voltage build up at the diode by effectively draining off any DC while maintaining non-linearity of circuitry 426a. The resistance of resistance circuitry 425a (e.g., resistor 424a) may be selected in any suitable manner, such as by using a model of the panel, including its stimulation voltage and capacitance to the tip, and the non-linear device model, and optimizing the model. For an embodiment using one or more Schottky diodes for non-linear electrical circuitry 423a, the optimum may vary, for example, between 4.0-6.0 megaohms, or even no additional leakage may be needed.

At least one non-linear electrical element of non-linear electrical circuitry 423a, such as diode 422a, may be used to modulate and rectify a voltage on front tip interface component 421a and may provide a load (e.g., a capacitance of front tip interface component 421a (e.g., effectively)) and resistance circuitry 425a, such as resistor 424a, may be used to discharge the capacitance and/or to prevent capacitance from charging up. A high performance and/or low capacitance and/or low voltage Schottky diode (e.g., on an insulating substrate) may be useful for providing such a diode (e.g., diode 422a and/or any other appropriate diode described herein), where such a diode may be made of any suitable material(s), including, but not limited to gallium arsenide and/or titanium nitride, which may have a large reverse leakage, but such leakage may be appropriately handled by resistance circuitry (e.g., resistance circuitry 425a). In some embodiments, a diode would be useful if it were configured to have a current-voltage characteristic (e.g., an I-V curve) with certain properties, including, but not limited to, one with an abrupt or substantially abrupt non-linearity at some voltage and one that may maintain that voltage by balancing the forward and reverse characteristics. To produce a certain reverse voltage, the diode may be configured with an I-V curve where current may be sufficient to leak out the current pushed into the diode on the forward voltage and/or to keep an operating point in a region that is non-linear. One or more certain materials may be used to provide such a diode with such performance characteristics. Alternatively or additionally, a particular diode may be radiation damaged such that the diode may be operative to leak during use in a stylus, which may obviate any need for resistance circuitry (e.g., resistance circuitry 425a). For example, a diode that has a constant reverse current rather than one that is modulated with a first harmonic may provide a useful result and/or may allow for a stylus without resistance circuitry (e.g., resistance circuitry 425a), thereby reducing the number of components of the stylus. Additionally or alternatively to radiation damaging a diode for use in a stylus, the diode may be processed in any other suitable manner(s), including, but not limited to, heat processing or damaging and/or radiation processing or damaging in order to configure the diode to perform in an effective manner, such as to increase or change the reverse leakage of the diode (e.g., increase reverse leakage independently of a reverse voltage).

Resistance circuitry of front tip stylus circuitry of a stylus (e.g., resistance circuitry 425a of front tip stylus circuitry 426a of stylus 400a) may include one or more resistors or may not be provided at all (e.g., when a diode with effectively increased reverse leakage is utilized by non-linear electrical circuitry 423a). Alternatively, such resistance circuitry may include or be provided by any suitable current limiting device, which may be seen as a constant current source. This may be accomplished by providing any suitable current limiting field-effect transistor ("FET") (e.g., an n-type metal-oxide-semiconductor ("NMOS") device or depletion mode device) rather than a resistor. Such a device may be configured not to have a gate, but may include SiO$_2$ or any other suitable element above a dope channel (e.g., a slightly n-type element), for example, such that the total amount of current that flows therethrough may be about 1 microAmpere. This may provide a flat region, such that when the circuitry goes to a high voltage, the channel may disappear. Therefore, in some embodiments, tip stylus circuitry, such as tip stylus circuitry 426a, may be generated as a single chip (e.g., through very-large-scale integration ("VLSI")) that may include a diode (e.g., Schottky diode) (e.g., as at least a portion of circuitry 423a) and a current limiting FET (e.g., a diode connected depletion mode device (e.g., a device with a gate connected to the drain of the MOSFET), where a diode connected FET may provide the diode action as well as the constant current backward leakage of the tip stylus circuitry) (e.g., as at least a portion of circuitry 425a).

Figure 6:
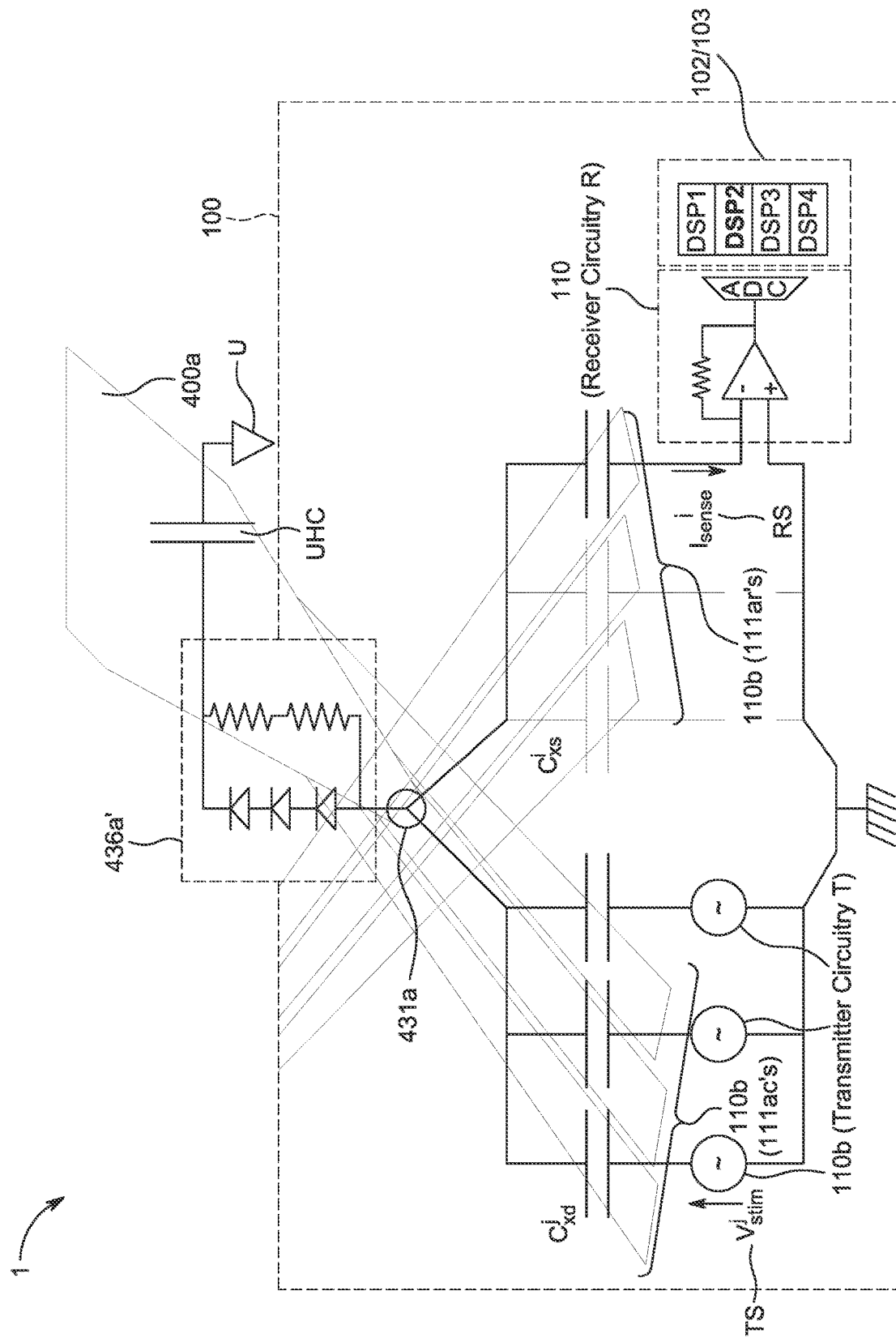
FIG. 6 is a schematic view of a portion of the system using a portion of a stylus of FIGS. 1-1D.

Although only one diode 422a may be shown as provided by non-linear electrical circuitry 423a, it is to be understood that any suitable other number of non-linear electrical elements may be provided by non-linear electrical circuitry 423a, which may be of the same type or different type of non-linear electrical element from one another. For example, two diodes may be electrically coupled in series (e.g., an anode of a first diode may be directly electrically coupled to body stylus circuitry 427a, while the cathode of that first diode may be directly electrically coupled to an anode of a second diode, while the cathode of that second diode may be directly electrically coupled to front tip interface component 421a of stylus 400a). For example, two or more diodes (e.g., three diodes as shown in FIG. 6) may be coupled in series (e.g., with the anode of a first diode coupled to the cathode of a second diode, etc.) to create an asymmetric (e.g., top to bottom) waveform, and that may provide a second harmonic. However, compared to only a single diode (see, e.g., FIG. 2B), multiple diodes provided in series (see, e.g., FIG. 6) may be operative to reduce the parasitic capacitance across the combination. In other words, two or three diodes in series may look electrically like a single diode (e.g., operative to enable extraction of same harmonic by device 100 (e.g., second harmonic)), but with lower capacitance across them. The forward voltage drop across the diodes may also increase, but the reduction in parasitic capacitance may be more significant and/or effective. For example, the parasitic capacitance across two diodes in series may be half that of one diode, but with twice the forward voltage drop. If the drive waveform is configured to be symmetric in voltage (e.g., a square wave, sinusoidal wave, or trapezoidal wave), then there may be no second harmonic in the original field, and a single diode or diode pair connected in the same direction (e.g., if two diodes are coupled in series, such as with the anode of the first diode coupled to the cathode of the second diode) may be provided by non-linear electrical circuitry 423a to create an asymmetric (e.g., top to bottom) waveform, and that may provide a second harmonic. A square or trapezoidal stimulation may have all of the odd harmonics, including the third harmonic, in the transmitted field, so it may be preferred to generate a second harmonic from the diode(s) or non-linear electrical circuitry 423a. A sinusoidal drive may not have any third harmonic, so back to back diodes or other symmetric non-linear electrical circuitry 423a could be used, which may generate odd harmonics that could be detected. In some embodiments where back to back diodes or other symmetric non-linear electrical circuitry is used, resistance circuitry of the tip stylus circuitry including such non-linear electrical circuitry may not be provided or utilized (e.g., as one diode may conduct in a forward direction and one may conduct in a backward direction).

As another example, two or more diodes may be electrically coupled in parallel (e.g., an anode of a first diode may be directly electrically coupled to body stylus circuitry, while the cathode of that first diode may be directly electrically coupled (or via a switch) to a tip interface component, and a cathode of a second diode may be directly electrically coupled to body stylus circuitry, while the anode of that second diode may be directly electrically coupled (or via a switch) to the tip interface component (see, e.g., FIG. 4)). Such parallel diodes may be operative to configure the tip stylus circuitry (e.g., non-linear electrical circuitry 423c of tip stylus circuitry 426c of FIG. 4) to generate third harmonics of the transmitted signal (e.g., as opposed to second harmonics when only one diode is provided within the non-linear electrical circuitry), and device 100 may be configured to detect and handle such third harmonics in a different manner than other harmonics of other stylus types.

The direction (e.g., forward direction) of a non-linear electrical element, such as at least one diode 422a, of non-linear electrical circuitry 423a with respect to front tip interface component 421a of stylus 400a may be any suitable direction. For example, as shown in FIGS. 2-2C, anode A of diode 422a may be directly electrically coupled to body stylus circuitry 427a, while cathode C of diode 422a may be directly electrically coupled to front tip interface component 421a of stylus 400a. Alternatively, in other embodiments, anode A of diode 422a may be directly electrically coupled to front tip interface component 421a, while cathode C of diode 422a may be directly electrically coupled to body stylus circuitry 427a (see, e.g., the direction of the diodes of circuitry 436a' of FIG. 6 or the direction of the diode of circuitry 436a of FIG. 2C). In either embodiment, the order of the harmonics generated by front tip stylus circuitry 426a with only diode 422a within non-linear electrical circuitry 423a may be second harmonics, although the phase or polarity of such harmonics may be different between those two embodiments, as may be detected by the projective capacitance circuitry of I/O interface 111a. Therefore, both embodiments may be utilized by the same or different stylus to enable two different stylus types to be located by I/O interface 111a, where each stylus type may be associated with one or more specific input characteristics. For example, a tip interface component of a stylus that provides second harmonics with a first phase may be determined by device 100 to have a first stylus identity, while a tip interface component of a stylus that provides second harmonics with a second phase different than the first phase may be determined by device 100 to have a second stylus identity different than the first stylus identity, and different stylus identities may be handled by device 100 in any suitable one or more different ways. For example, processor 102 may utilize a specific detected stylus identity (or an absence thereof) in any suitable manner including, but not limited to, accepting or rejecting input from a particular stylus, accepting input from multiple styli and/or from a single stylus, permitting or denying access to a particular functionality of the electronic device, applying a particular stylus profile, restoring one or more settings of the electronic device, notifying a third party that the stylus is in use, applying a setting to the electronic device, applying a setting to a program operating on the electronic device (e.g., which may include updating a user interface on display 112a or otherwise of device 100), changing a line thickness, color, pattern, erasure, and so on of a graphical object to be rendered by a graphics program of the electronic device, changing a setting of a video game operating on the electronic device, and so on. As shown in FIG. 2C, for example, single stylus 400a may be provided with two different tip interface components for providing two different stylus identities. For example, as shown, anode A of diode 422a of non-linear electrical circuitry 423a of front tip stylus circuitry 426a may be directly electrically coupled to body stylus circuitry 427a, while cathode C of diode 422a may be directly electrically coupled to front tip interface component 421a of stylus 400a, and, conversely, a cathode C of a diode 432a of non-linear electrical circuitry 433a of rear tip stylus circuitry 436a may be directly electrically coupled to body stylus circuitry 427a, while an anode A of diode 432a may be directly electrically coupled to rear tip interface component 431a of stylus 400a, such that front tip interface component 421a may provide second harmonics with a first phase while rear tip interface component 431a may provide second harmonics with a second phase. Alternatively, a first number of diodes (e.g., 1) may be provided by non-linear electrical circuitry 423a of front tip stylus circuitry 426a, while a second, different number of diodes (e.g., 2) may be provided by non-linear electrical circuitry 433a of rear tip stylus circuitry 436a (e.g., 2 diodes in parallel, as shown by circuitry 423c of FIG. 4, or 3 diodes in series, as shown by circuitry 436a' of FIG. 6), such that front tip interface component 421a may provide second harmonics while rear tip interface component 431a may provide different (e.g., third) harmonics. Therefore, device 100 may be configured to determine whether user U may be moving front tip interface component 421a of stylus 400a along I/O interface 111a (e.g., at FIGS. 2A and 2B) or rear tip interface component 431a of stylus 400a along I/O interface 111a (e.g., at FIGS. 2D and 2E), such that device 100 may be configured to handle the detection of those different tip interface components in different manners. For example, device 100 may be configured to utilize the detection of front tip interface component 421a for enabling generation of a drawing object (e.g., a graphical line) and to utilize the detection of rear tip interface component 431a for enabling generation of an erasure object (e.g., removal of any graphical content), such that stylus 400a may be utilized within system 1 similarly to a physical pencil that may have a drawing tool on one end and an erasure tool on another end. Although, it is to be appreciated that device 100 may be configured to handle different stylus identifies in any suitable different manners. In some embodiments, different tip interface components (e.g., on opposite ends of the same stylus or on different fingers of a glove or on different styli or accessories altogether) may include different bleed resistors (e.g., different resistance circuitries of the different tip interface components). As the bleed resistor is changed, the timing of the second harmonic may change, and may be detectable as a relative phase change of the second harmonic relative to the first harmonic. One use for such phase change detection may be to use a force sensitive resistor to change the resistance, thus, for example, enabling a tip force to be estimated (e.g., as may be described with respect to circuitry 426c of stylus 400c of FIG. 4).

Therefore, stylus 400a may be configured to operate as a semi-passive and/or non-linear stylus. A semi-passive stylus may be a stylus without an active transmitter, such as a stylus that may be configured to react to the incident field but that may not be a simple linear probe like a user's finger or a conductive rod. Stylus 400a may be provided at a very low cost, as it may not require any internal power source and may not require any direct coupling or communication of any wired/wireless communication interface data 56 with device 100. Stylus 400a may provide improved performance over a passive stylus on a projected capacitance input device by being able to be distinguished from direct user touch events (e.g., unintentional user touch events). Non-linearity of stylus 400a may double (or otherwise provide any suitable multiple of) a modulation frequency (e.g., a fundamental frequency) of a transmitted signal TS (e.g., from 200 kHz to 400 kHz (see, e.g., FIG. 6D, from a first harmonic 671 to a second harmonic 673)) such that many cycles of non-linearity may be detected, such that noise may be reduced by requiring detection of a harmonic multiple times within multiple cycles or just once in a single cycle.

In addition to use with I/O interface 111a when configured to provide mutual capacitance sensing, stylus 400a may also be configured to be used with I/O interface 111a when configured to provide self-capacitance sensing. For example, as shown in FIGS. 2F and 2G, when providing self-capacitance sensing, each pixel or pad of an array of I/O interface 111a (e.g., first pad 111ap1 and second pad 111ap2) may be driven by its own signal TS of its own transmitter circuitry T and an effected signal RS may be detected by any suitable receiver circuitry R. In the environment of self-capacitive sensing, the current taken to drive the pixels may be a non-linear function of the voltage driven, and can thus be distinguished from linear effects, such as a nearby finger or palm. Self-capacitive sensing may be combined with mutual capacitive sensing, for example, by driving a voltage on an electrode and monitoring both the current into that node and current into nearby nodes that are held at a voltage.

Figure 3:
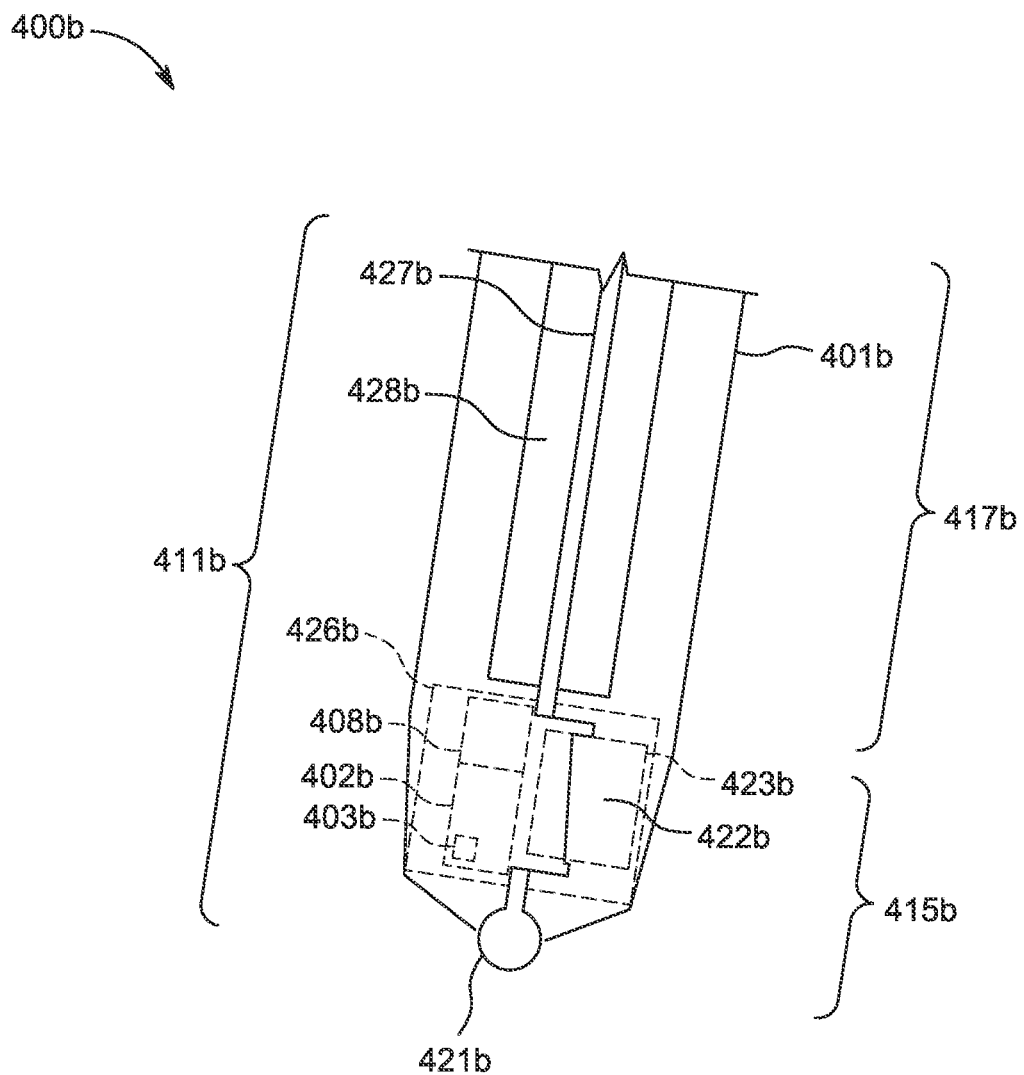
FIG. 3 is a partially transparent, semi-schematic view of an illustrative portion of another stylus of the system of FIGS. 1-1D.
Figure 3A:
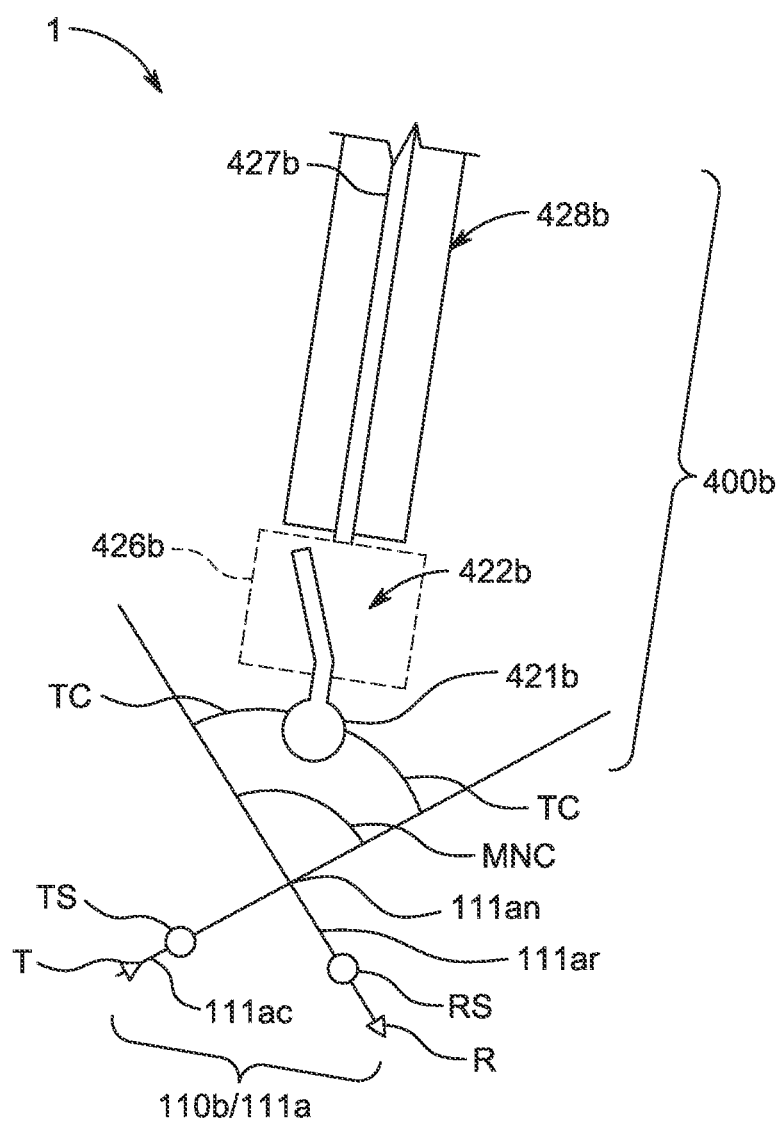
FIG. 3A is a schematic view of a portion of the system using a portion of the stylus of FIGS. 1-1D and 3.
Figure 3B:
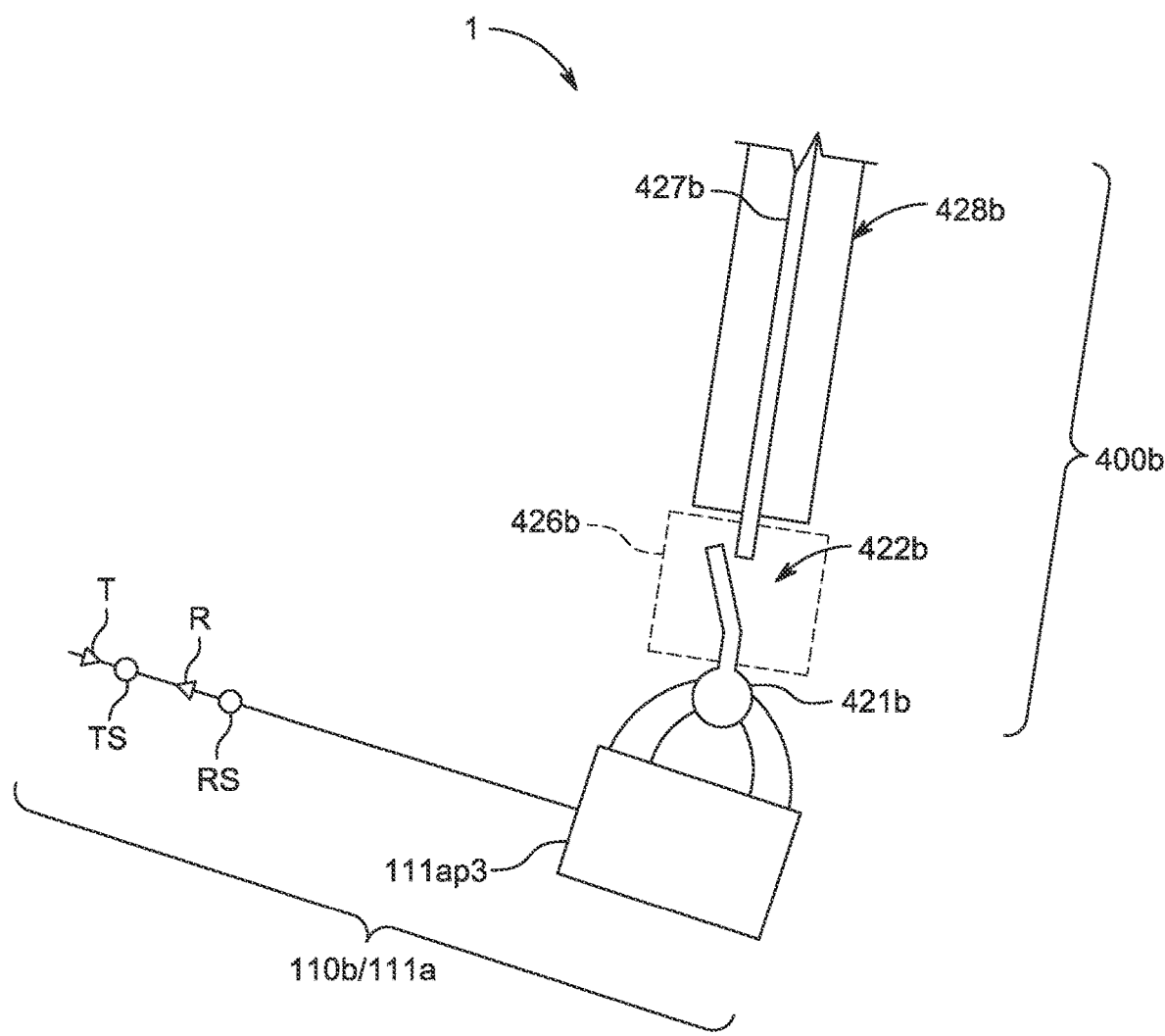
FIG. 3B is a schematic view of another portion of the system using the portion of the stylus of FIGS. 1-1D, 3, and 3A.
Figure 3C:
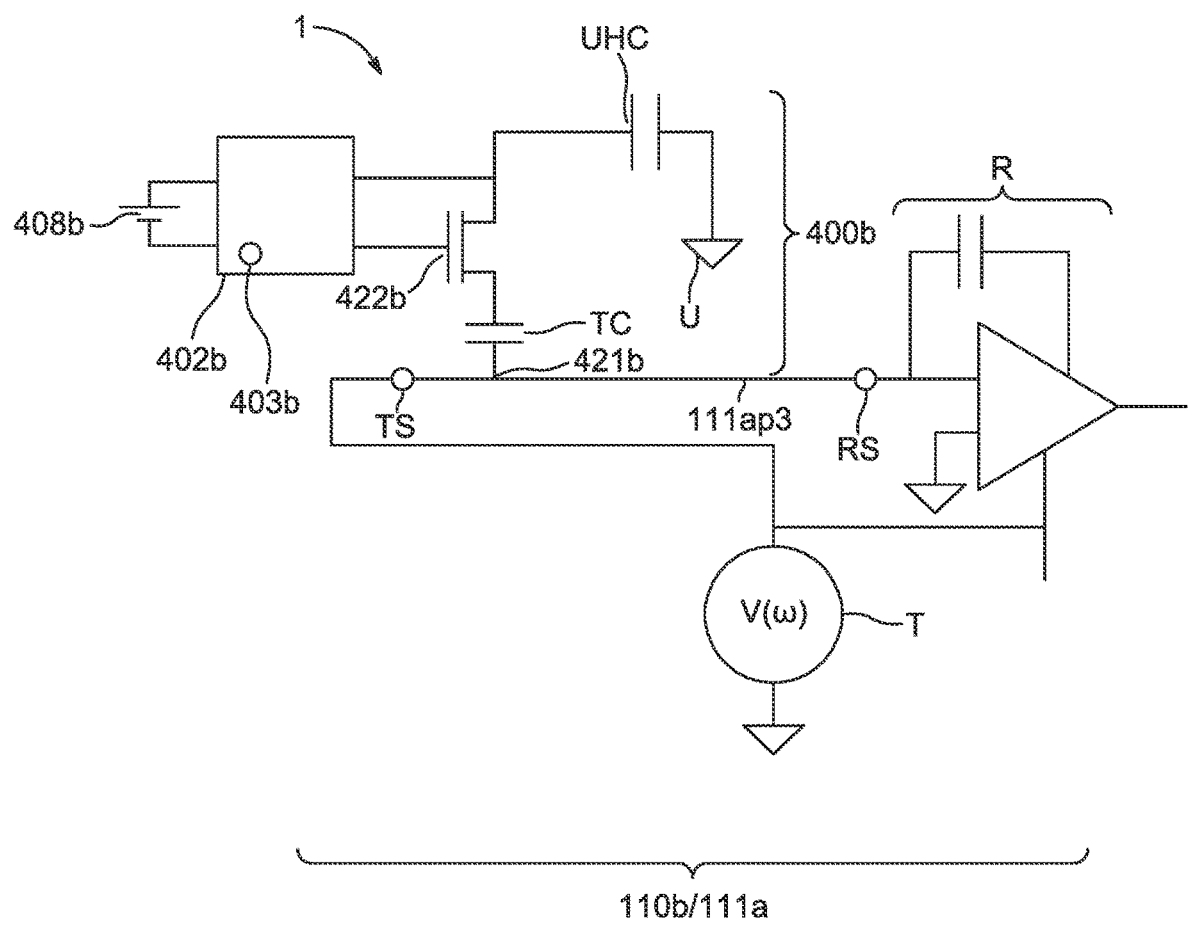
FIG. 3C is a circuit diagram of the other portion of the system using the portion of the stylus of FIGS. 1-1D and 3-3B.

Another stylus 400b, as shown in FIGS. 3-3C may include stylus I/O circuitry 411b that may include body stylus circuitry 427b that may be electrically coupled to front tip stylus circuitry 426b and/or to rear tip stylus circuitry (not shown). Body stylus circuitry 427b may be any suitable circuitry that may be operative to be electrically coupled (e.g., capacitively coupled) to user U when user U is holding stylus 400b about at least a portion of body portion 417b. As shown in FIG. 3, for example, body stylus circuitry 427b may be at least one conductive wire extending along at least a portion of a length of body portion 417b of stylus 400b, which may be insulated by any suitable insulation 428b. Alternatively, body stylus circuitry 427b may be provided by a conductive (e.g., copper) tape along a portion of body 417b, where such tape may be positioned under any suitable insulation, such as a finger pad of any suitable material. Any suitable housing 401b may be provided to protect body stylus circuitry 427b, such as a plastic housing. In some embodiments, such a housing may be operative to provide insulation 428b. Additionally or alternatively, at least a portion of body stylus circuitry 417b may be at least partially exposed via housing 401b and/or insulation 428b for enabling direct contact by user U. When user U is holding stylus 400b about and/or along a portion of body 417b, a capacitance or user-handle capacitor UHC may be inherently formed (e.g., as shown in FIG. 3C). The capacitance of user-handle capacitor UHC may be large enough to pass the desired signal from the tip, but not so large as to allow large transients from electrostatic discharge events to pass. For example, the capacitance of user-handle capacitor UHC may be any suitable capacitance, such as a capacitance in the range of 1.0 picofarad to 10.0 picofarads.

Stylus I/O circuitry 411b may include a front tip interface component 421b that may provide at least a portion of front tip portion 415b. Front tip interface component 421b may be the portion of stylus 400b configured to directly interface with device I/O interface 111a. For example, front tip interface component 421b may be formed from any suitable material, including, but not limited to, silicone, rubber, fluoro-elastomer, plastic, nylon, conductive or dielectric foam, metal (e.g., brass (e.g., a brass ball with a dielectric coating (e.g., a thin coating with a high dielectric constant))), or any other suitable material or combination of materials. In this manner, drawing of front tip interface component 421b across input surface 110a may not cause damage to input surface 110a or layers applied to input surface 110a, such as, but not limited to, anti-reflective coatings, oleophobic coatings, hydrophobic coatings, cosmetic coatings, ink layers, and the like. Front tip interface component 421b can be configured to be removably attached to body 417b, such as via threadings/screws, detents and/or recesses, interference-fit or snap-fit, and/or magnetic attraction, and/or the like, and electrically coupled capacitively, such as through a pogo-pin, spring, and/or the like. Transit of any stylus electric field may be provided from front tip interface component 421b and not from other portions of stylus I/O circuitry 411b. Like component 421a, front tip interface component 421b may be any suitable shape, such as a sphere or hemisphere, of any suitable size. For example, in some particular embodiments, front tip interface component 421b may be provided as a ball (e.g., a solder ball and/or brass ball) of any suitable diameter, such as 2 millimeters in diameter. Front tip interface component 421b may be configured to provide the same footprint area (e.g., tip field intersection area (e.g., of charge)) on input surface 110a no matter the angle of axis 120 with respect to a plane of input surface 110a. The size of front tip interface component 421b may be made as small as possible to enable precise localization of front tip portion 415b with respect to device I/O interface 111a.

Front tip stylus circuitry 426b may be positioned between and electrically coupled to each one of front tip interface component 421b and a portion (e.g., a front end) of body stylus circuitry 427b. Front tip stylus circuitry 426b may be configured as any suitable circuitry that may be operative to modulate a capacitance (e.g., an effective capacitance) at front tip interface component 421b when user U is holding body 417b of stylus 400b such that front tip interface component 421b of stylus 400b may be stimulated by a device stimulus that may be generated by device I/O circuitry of device I/O interface 111a of electronic device 100. For example, front tip stylus circuitry 426b may include any suitable switch circuitry 423b that may be electrically coupled (e.g., in series) between front tip interface component 421b and body stylus circuitry 427b. Switch circuitry 423b may include any suitable number of any suitable type(s) of switch element(s) 422b, such as a high impedance switch, such as a field-effect transistor ("FET") (e.g., a metal-oxide-semiconductor field-effect transistor ("MOSFET")). Additionally, as shown, front tip stylus circuitry 426b may include any suitable microcontroller 402b powered by any suitable power supply 408b (e.g., a low frequency, very low power battery operated circuit) for switching switch element(s) 422b between an open state where front tip interface component 421b and body stylus circuitry 427b are not electrically coupled and a closed state where front tip interface component 421b and body stylus circuitry 427b are electrically coupled by switch element 422b. Microcontroller 402b may be configured (e.g., programmed) to switch (e.g., open or close) switch element 422b according to a particular pattern (e.g., a micro application 403b) or according to a selected one of two or more patterns that may be implemented by microcontroller 402b. Front tip stylus circuitry 426b may be provided as a very low power circuit that may modulate the effective capacitance TC of front tip interface component 421b of stylus 400b according to a particular pattern. Front tip interface component 421b may be configured to have adequate effective capacitance for passive location using projective capacitance, such as, for example, an effective capacitance of 200 femtofarads or any other suitable magnitude. In some embodiments, rather than being powered by power supply 408*b* local to stylus 400*b*, controller 402*b* may be powered by any suitable external stimulation (e.g., device I/O circuitry and/or a user holding the stylus).

One, some, or each available pattern may be operative to enable device 100 to distinguish stylus 400*b* from a direct user touch event (e.g., by a finger or palm event by user U on I/O interface 111*a*), as a pattern may be detected by receive signal RS at one or more nodes 111*an* (e.g., of FIG. 3A for mutual capacitance) or pads 111*ap* (e.g., pad 111*ap*3 of FIGS. 3B and 3C for self-capacitance) in response to transmitted signal TS being effected by the pattern-modulated effective capacitance of front tip interface component 421*b*, where that pattern may be a pattern that may not be replicated by user U on its own (e.g., without front tip stylus circuitry 426*b*). As an example, an exemplary pattern may be a Barker sequence followed by a digital code, where only the bits in the trailing digital code may change. A reason to have a low frequency pattern may be to minimize the power used by the switching circuit. Therefore, stylus 400*b* may be provided as a low power, semi-permanent battery, switched stylus. No other circuitry may be provided by stylus 400*b*, such that it may be made at a low cost and with a very low powered battery that may be configured to enable stylus 400*b* to function properly for many years without replacement. In some embodiments, the battery may be configured for any suitable duration of use, such as in a range of 5-50 milliamp hours. In some embodiments, any suitable input component may also be provided by stylus 400*b* to enable user U to select a particular one of many patterns that may be available to front tip stylus circuitry 426*b*, such that a particular pattern may be detected by device 100 and a particular functionality may be carried out by device 100 that may be associated with that particular pattern (e.g., device 100 may be configured to utilize the detection of front tip interface component 421*b* with a first pattern-modulated effective capacitance for enabling generation of a red drawing object (e.g., a red graphical line) and to utilize the detection of front tip interface component 421*b* with a second pattern-modulated effective capacitance for enabling generation of a green drawing object (e.g., a green graphical line), such that stylus 400*b* may be utilized within system 1 similarly to a physical multi-colored pen that may selectively output one of various ink colors. Although, it is to be appreciated that device 100 may be configured to handle different patterns as different stylus identifies in any suitable different manners.

Device I/O interface control of I/O interface 111*a* for identifying and locating such a stylus 400*b* may be specifically configured or tuned for that particular type of stylus and/or one, some, or each pattern available to that stylus, such that it may be effectively operative to initially identify and roughly locate the location of such a stylus (e.g., by effectively enabling rejection of other types of touch detection (e.g., user finger touch or other patterns)), such as through detection of a particular pattern, and then the control (e.g., one or more algorithms or applications) may be configured to switch to a mode specific to that type of detected stylus (e.g., across sensor layer 110*b* or within a particular radius of the initially detected position of the stylus (e.g., for better jitter performance)). For example, an algorithm may be configured to sense for a particular pattern of a stylus for a particular transmitted signal, and once detected, more intense and/or frequent and/or focused scans may be utilized to detect that particular pattern along the I/O interface (e.g., as part of a normal scan, attempt to detect a particular pattern of a particular expected stylus, and then when that particular pattern is detected, ramp up the scan features to track that particular pattern (e.g., a type of signal driving may be updated (e.g., only traces around the initially detected position of the stylus may be driven (e.g., to reduce signal to noise))). In an embodiment where a pattern may be a Barker sequence followed by a digital code, the Barker sequence itself and the detection thereof may not need to change.

Therefore, stylus 400*b* may be configured to provide a switch that may be modulated at a relatively low frequency, and/or that may be driven by a low power circuit that may be similar to that of an electronic watch, while a projective capacitive input device of I/O interface 111*a* may be configured to seek and/or detect a signal modulated by a changing load of stylus 400*b* (e.g., using a matched filter). Stylus 400*b* may be a very low-power, semi-permanent battery powered stylus that may be provided at a very low cost, as it may not require a substantial internal power source and may not require any direct coupling or communication of any wired/wireless communication interface data 56 with device 100. Stylus 400*b* may provide improved performance over a passive stylus on a projected capacitance input device by being able to be distinguished from direct user touch events (e.g., unintentional user touch events). Although not shown, single stylus 400*b* may be provided with two different tip interface components, like stylus 400*a*, for providing two different stylus identities. For example, switch circuitry 423*b* of front tip stylus circuitry 426*b* may be operative to generate a first pattern, while switch circuitry of a rear tip stylus circuitry may be operative to generate a second pattern different than the first pattern. Additionally or alternatively, an input component of stylus 400*b* may be operative to adjust the type of pattern generated by its switch circuitry from a first pattern to a second pattern different than the first pattern.

Figure 4:
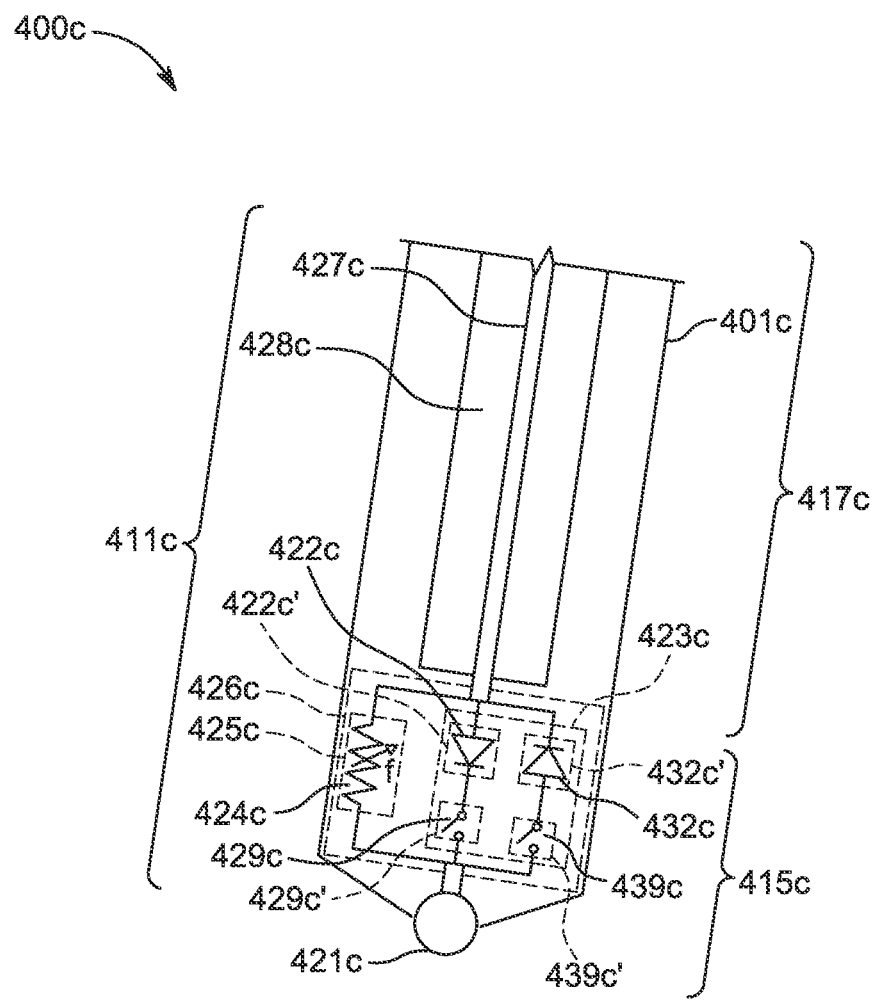
FIG. 4 is a partially transparent, semi-schematic view of an illustrative portion of yet another stylus of the system of FIGS. 1-1D.

Yet another stylus 400*c*, as shown in FIG. 4, for example, may be similar to stylus 400*a*, except as described herein. As shown, stylus 400*c* may include stylus I/O circuitry 411*c* that may be similar to stylus I/O circuitry 411*a* and may be operative to be stimulated only by external stimulus, such as a device stimulus that may be generated by device I/O circuitry of device I/O interface 111*a* of electronic device 100 and/or by user U when holding stylus 400*c*, whereby that stimulation of stylus I/O circuitry 411*c* may be operative to enable stylus I/O circuitry 411*c* to provide any suitable stylus electric field that may then be detected by device 100 for estimating the location of stylus 400*c*. Stylus 400*c* may include a barrel or handle or body portion 417*c* extending between a front tip portion 415*c* and a rear tip portion (not shown), where body portion 417*c* may be configured to be held by user U as the user may slide a tip portion of stylus 400*c* across input surface 110*a* of device I/O interface 111*a* of device 100.

Stylus I/O circuitry 411*c* may include body stylus circuitry 427*c* that may be electrically coupled to front tip stylus circuitry 426*c* and/or to rear tip stylus circuitry (not shown). Body stylus circuitry 427*c* may be any suitable circuitry that may be operative to be electrically coupled (e.g., capacitively coupled) to user U when user U is holding stylus 400*c* about at least a portion of body portion 417*c*. As shown in FIG. 4, for example, body stylus circuitry 427*c* may be at least one conductive wire extending along at least a portion of a length of body portion 417*c* of stylus 400*c*, which may be insulated by any suitable insulation 428c. Alternatively, body stylus circuitry 427c may be provided by a conductive (e.g., copper) tape along a portion of body 417c, where such tape may be positioned under any suitable insulation, such as a finger pad of any suitable material. Any suitable housing 401c may be provided to protect body stylus circuitry 427c, such as a plastic housing. In some embodiments, such a housing may be operative to provide insulation 428c. Additionally or alternatively, at least a portion of body stylus circuitry 427c may be at least partially exposed via housing 401c and/or insulation 428c for enabling direct contact by user U. When user U is holding stylus 400c about and/or along a portion of body 417c, a capacitance or user-handle capacitor (e.g., UHC (not shown in FIG. 4)) may be inherently formed. The capacitance of such a user-handle capacitor may be relatively large compared to a panel to tip capacitance (e.g., electric field response capacitances (e.g., capacitances SDC) between front tip interface component 421c and each one of array trace row 111ar and array trace column 111ac of one or more nodes 111an proximate front tip interface component 421c when stylus 400c is used with device 100), but not so large that electrostatic discharges would be likely to damage the device. Stylus I/O circuitry 411c may include a front tip interface component 421c that may provide at least a portion of front tip portion 415c. Front tip interface component 421c may be the portion of stylus 400c configured to directly interface with device I/O interface 111a. For example, front tip interface component 421c of stylus 400c may be similar to front tip component 421a of stylus 400a.

Front tip stylus circuitry 426c may be positioned between and electrically coupled to each one of front tip interface component 421c and a portion (e.g., a front end) of body stylus circuitry 427c. Front tip stylus circuitry 426c may be configured as any suitable circuitry that may be operative to provide a non-linear load between body stylus circuitry 427c and front tip interface component 421c when user U is holding body 417c of stylus 400c such that front tip interface component 421c of stylus 400c may be stimulated by a device stimulus that may be generated by device I/O circuitry of device I/O interface 111a of electronic device 100. For example, front tip stylus circuitry 426c may include any suitable non-linear electrical circuitry 423c that may be electrically coupled (e.g., in series) between front tip interface component 421c and body stylus circuitry 427c. Non-linear electrical circuitry 423c may include any suitable number of non-linear electrical sub-circuitries (e.g., in parallel), such as non-linear electrical sub-circuitry 422c' and/or non-linear electrical sub-circuitry 432c', each of which may include any suitable number and type(s) of non-linear electrical elements. For example, as shown, non-linear electrical sub-circuitry 422c' may include at least one diode 422c, and non-linear electrical sub-circuitry 432c' may include at least one diode 432c. One, some, or each diode of non-linear electrical circuitry 423c (e.g., diode 422c and/or diode 432c) may be any suitable type of diode, such as a Schottky diode, a transistor in diode configuration (e.g., a diode connected transistor), and/or the like. In some embodiments, one or each non-linear electrical sub-circuitry of non-linear electrical circuitry 423c may include any suitable number (e.g., two or three or four or more) of diodes that may be coupled together in series (e.g., a cathode of one diode may be coupled to an anode of a next diode and/or the like). Alternatively, as shown, only a single diode may be provided by each non-linear electrical sub-circuitry, where an anode of diode 422c may be electrically coupled to body stylus circuitry 427c and where a cathode of diode 422c may be electrically coupled to front tip interface component 421c via any suitable switch circuitry 429c' that may be electrically coupled (e.g., in series) between front tip interface component 421c and non-linear electrical sub-circuitry 422c', and/or where a cathode of diode 432c may be electrically coupled to body stylus circuitry 427c and where an anode of diode 432c may be electrically coupled to front tip interface component 421c via any suitable switch circuitry 439c' that may be electrically coupled (e.g., in series) between front tip interface component 421c and non-linear electrical sub-circuitry 432c'. Switch circuitry 429c' may include any suitable number of any suitable type(s) of switch element(s) 429c, and switch circuitry 439c' may include any suitable number of any suitable type(s) of switch element(s) 439c, where, for example, one, some, or each switch element may be a high impedance switch, such as a field-effect transistor ("FET") (e.g., a metal-oxide-semiconductor field-effect transistor ("MOSFET")) or any other suitable switch that may be controlled in any suitable manner (e.g., by a user input button (e.g., via aperture 416) and/or any other suitable pressure or force or the like). Any switch of tip stylus circuitry 426c may be a force or pressure sensitive switch (e.g., a switch may close if more than a certain threshold amount of force is applied to the switch (e.g., switch 429c may be configured to be open unless at least 10 grams of force is applied thereto (e.g., unless a user presses tip interface component 421c against device 100 with at least 10 grams of force) and/or switch 439c may be configured to be open unless at least 20 grams of force is applied thereto (e.g., unless a user presses tip interface component 421c against device 100 with at least 20 grams of force) and/or the like). Additionally or alternatively, any switch of tip stylus circuitry 426c may be a mechanical switch that may be opened or closed by a user pressing or depressing a user interface button (e.g., via an aperture 416) or via any other suitable user action.

Therefore, like stylus 400a, stylus 400c may be operative to provide at least two different stylus identities. For example, due to diode 422c being flipped with respect to diode 432c, such that front tip interface component 421c may provide second harmonics with a first phase when switch 429c is closed and when switch 439c is open whereby diode 422c but not diode 432c is electrically coupled between body stylus circuitry 427c and front tip interface component 421c, and/or such that front tip interface component 421c may provide second harmonics with a second phase different than the first phase when switch 429c is open and when switch 439c is closed whereby diode 432c but not diode 422c is electrically coupled between body stylus circuitry 427c and front tip interface component 421c, and/or such that front tip interface component 421c may provide no second harmonics when each one of switches 429c and 439c is open whereby none of diodes 422c and 432c is electrically coupled between body stylus circuitry 427c and front tip interface component 421c. Alternatively, front tip interface component 421c may provide second harmonics when only one of switch 429c and switch 439c is closed and when the other one of switch 429c and switch 439c is open, whereby only a single one of diode 422c and diode 432c is electrically coupled between body stylus circuitry 427c and front tip interface component 421c, or front tip interface component 421c may provide different (e.g., third) harmonics when each one of switch 429c and switch 439c is closed, whereby each one of diodes 422c and 432c may be electrically coupled between body stylus circuitry 427c and front tip interface component 421c, or front tip interface component 421c may provide no second harmonics or third harmonics when each one of switches 429c and 439c is open, whereby none of diodes 422c and 432c is electrically coupled between body stylus circuitry 427c and front tip interface component 421c. Therefore, device 100 may be configured to determine whether user U may be moving front tip interface component 421c of stylus 400c along I/O interface 111a with only non-linear electrical sub-circuitry 422c' electrically coupled thereto by switch circuitry 429c', or with only non-linear electrical sub-circuitry 432c' electrically coupled thereto by switch circuitry 439c', or with each one of non-linear electrical sub-circuitry 422c' and non-linear electrical sub-circuitry 432c' electrically coupled thereto by switch circuitry 429c' and switch circuitry 439c', or with no non-linear sub-circuitry electrically coupled thereto by any switch circuitry, such that device 100 may be configured to handle the detection of those different tip interface components in different manners. Therefore, use of one or more switching circuitries may be utilized to alter the stylus identity of tip interface component 421c of stylus 400c (e.g., between different harmonics and/or between different phases) rather than utilizing different tip interface components (e.g., as described above with respect to tip interface components 421a and 431a of stylus 400a).

In some embodiments, as shown, circuitry 426c may also include (e.g., in parallel with non-linear electrical circuitry 423c) any suitable resistance circuitry 425c (e.g., at least one resistor 424c (e.g., any suitable force-sensing resistor (e.g., as shown) or any other suitable resistor)) for any suitable function, including, but not limited to, controlling reverse leakage current of non-linear electrical circuitry 423c and/or preventing DC positive voltage build up at the diode by effectively draining off any DC while maintaining non-linearity of circuitry 426c. In some embodiments, such as similarly to resistance circuitry 425a of stylus 400a, the resistance of resistance circuitry 425c (e.g., resistor 424c) may be selected in any suitable manner, such as by using a model of the panel, including its stimulation voltage and capacitance to the tip, and the non-linear device model, and optimizing the model. For an embodiment using one or more Schottky diodes for non-linear electrical circuitry 423c, the optimum may vary, for example, between 4.0-6.0 megaohms, or even no additional leakage may be needed.

Any switch described herein as may be provided by any stylus or accessory may be provided in a handle portion, such as behind any diodes or resistors or non-linear electrical circuitry or tip stylus circuitry. Such a switch may be operative to break a DC path between them, which may effectively turn off non-linearity because a DC voltage may build up across the diode(s), and the reverse bias may not allow any current to flow. This may be used as a signal to (e.g., detectable by) the sensor circuitry of I/O interface 111a of device 100, or to "break" or lift the pen. Additionally or alternatively, this may be done with a switch that may turn on only when pressure is applied to the tip of the stylus/accessory, which may enable a "make/break" on force rather than on estimated Z-height (e.g., as mentioned herein).

Figure 5:
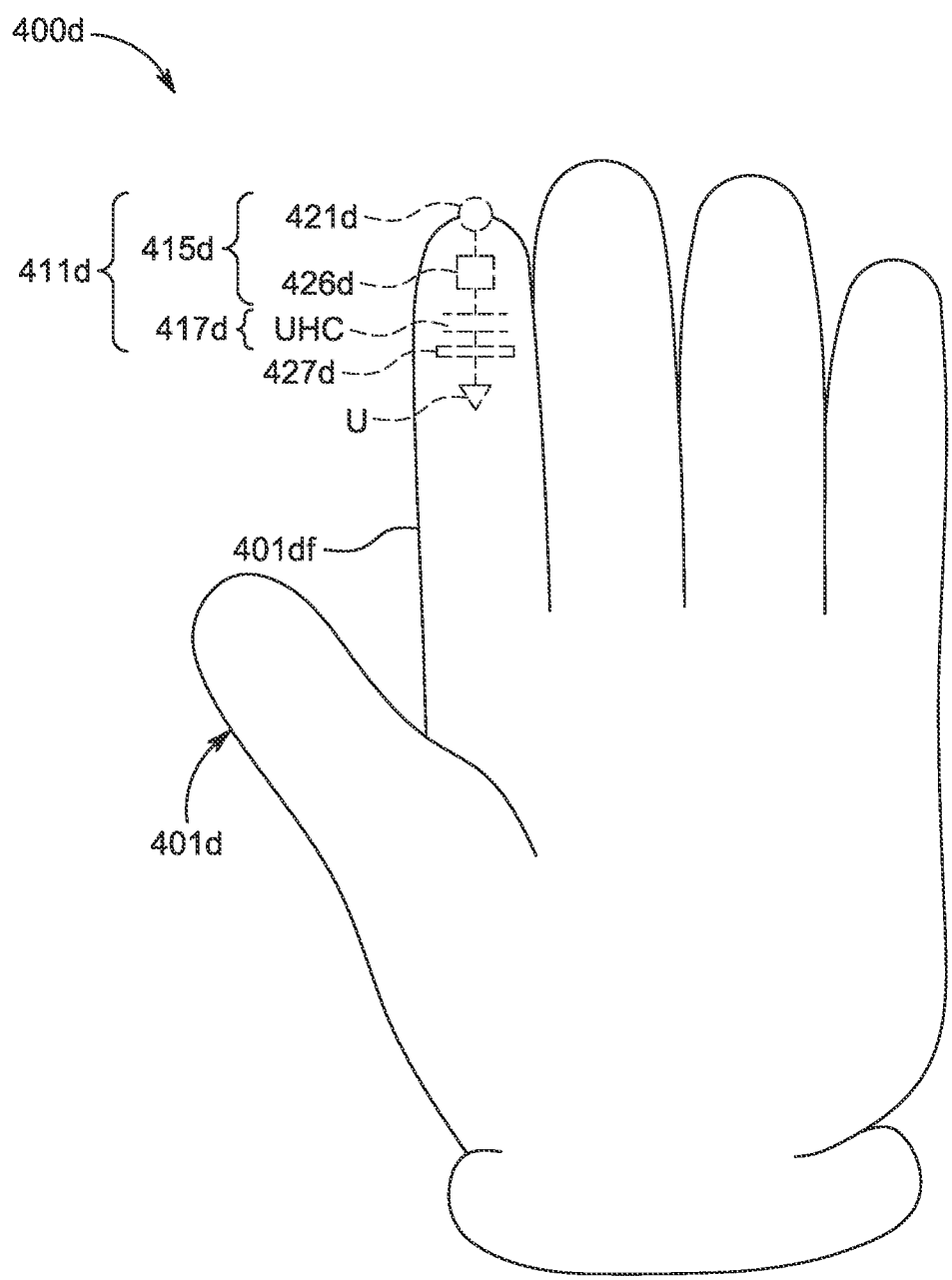
FIG. 5 is a partially transparent, semi-schematic view of an illustrative portion of yet another accessory of the system of FIGS. 1-1D.

Yet another accessory 400d, as shown in FIG. 5, for example, may be similar to stylus 400a or any other stylus of this disclosure, except as described herein. Accessory 400d may be configured with an accessory housing 401d of any suitable structure, such as a glove, as shown, or any other accessory wearable or otherwise usable by a user for interacting with electronic device 100. Accessory 400d include accessory I/O circuitry 411d that may be similar to stylus I/O circuitry 411a or stylus I/O circuitry 411b and may be operative to be stimulated by external stimulus, such as a device stimulus that may be generated by device I/O circuitry of device I/O interface 111a of electronic device 100 and/or by user U when using accessory 400d (e.g., when a user's hand is wearing glove accessory 400d) and/or by a small power supply of accessory 400d, whereby that stimulation of accessory I/O circuitry 411d may be operative to enable accessory I/O circuitry 411d to provide any suitable accessory electric field that may then be detected by device 100 for estimating the location of accessory 400d. Accessory 400d may include a hollow barrel or finger body portion 417d (e.g., of a finger 401df of body 401d) extending between a front tip portion 415d and a rear tip (or open end) portion, where body portion 417d may be configured to be worn by user U (e.g., by or about or otherwise on a finger of the user) as the user may slide a tip portion of accessory 400d (e.g., a fingertip portion that may electrically expose or otherwise be adjacent front tip interface component 421d of accessory 400d) across input surface 110a of device I/O interface 111a of device 100.

Accessory I/O circuitry 411d may include body accessory circuitry 427d that may be electrically coupled to front tip accessory circuitry 426d. Body accessory circuitry 427d may be any suitable circuitry that may be operative to be electrically coupled (e.g., capacitively coupled) to user U when user U is wearing accessory 400d (e.g., body portion 417d of finger 401df) about a portion or against a portion (e.g., finger (e.g., fingertip)) of user U. As shown in FIG. 5, for example, body accessory circuitry 427d may be at least one conductive pad extending across a hollow of body portion 417d of finger 401df for being contacted by a user's finger and/or a ring like conductive structure operative to be worn about a user's finger. Any suitable housing 401d of any suitable material(s) may be provided to protect body accessory circuitry 427d. When user U is wearing accessory 400d, a capacitance or user-handling capacitor (e.g., UHC) may be inherently formed. The capacitance of such a user-handling capacitor may be relatively large compared to a panel to tip capacitance (e.g., electric field response capacitances (e.g., capacitances SDC) between front tip interface component 421d and each one of array trace row 111ar and array trace column 111ac of one or more nodes 111an proximate front tip interface component 421d when accessory 400d is used with device 100), but not so large that electrostatic discharges would be likely to damage the device. Accessory I/O circuitry 411d may include a front tip interface component 421d that may provide at least a portion of front tip portion 415d. Front tip interface component 421d may be the portion of accessory 400d configured to directly interface with device I/O interface 111a. For example, front tip interface component 421d of accessory 400d may be similar to front tip component 421a of stylus 400a.

Front tip accessory circuitry 426d may be positioned between and electrically coupled to each one of front tip interface component 421d and a portion (e.g., a front end) of body accessory circuitry 427d. Front tip accessory circuitry 426d may be configured as any suitable circuitry (e.g., similar to circuitry 426a and/or circuitry 426c) that may be operative to provide a non-linear load between body accessory circuitry 427d and front tip interface component 421d when user U is wearing body 417d of accessory 400d such that front tip interface component 421d of accessory 400d may be stimulated by a device stimulus that may be generated by device I/O circuitry of device I/O interface 111a of electronic device 100. Alternatively, front tip accessory circuitry 426d may be configured as any suitable circuitry that may be operative to function similarly to circuitry 426b and/or any other tip accessory circuitry described herein.

Therefore, while the overall structure of accessory 400d may resemble a glove or any other suitable wearable accessory rather than a stylus, accessory 400d may be utilized similar to any stylus described herein.

Figure 6A:
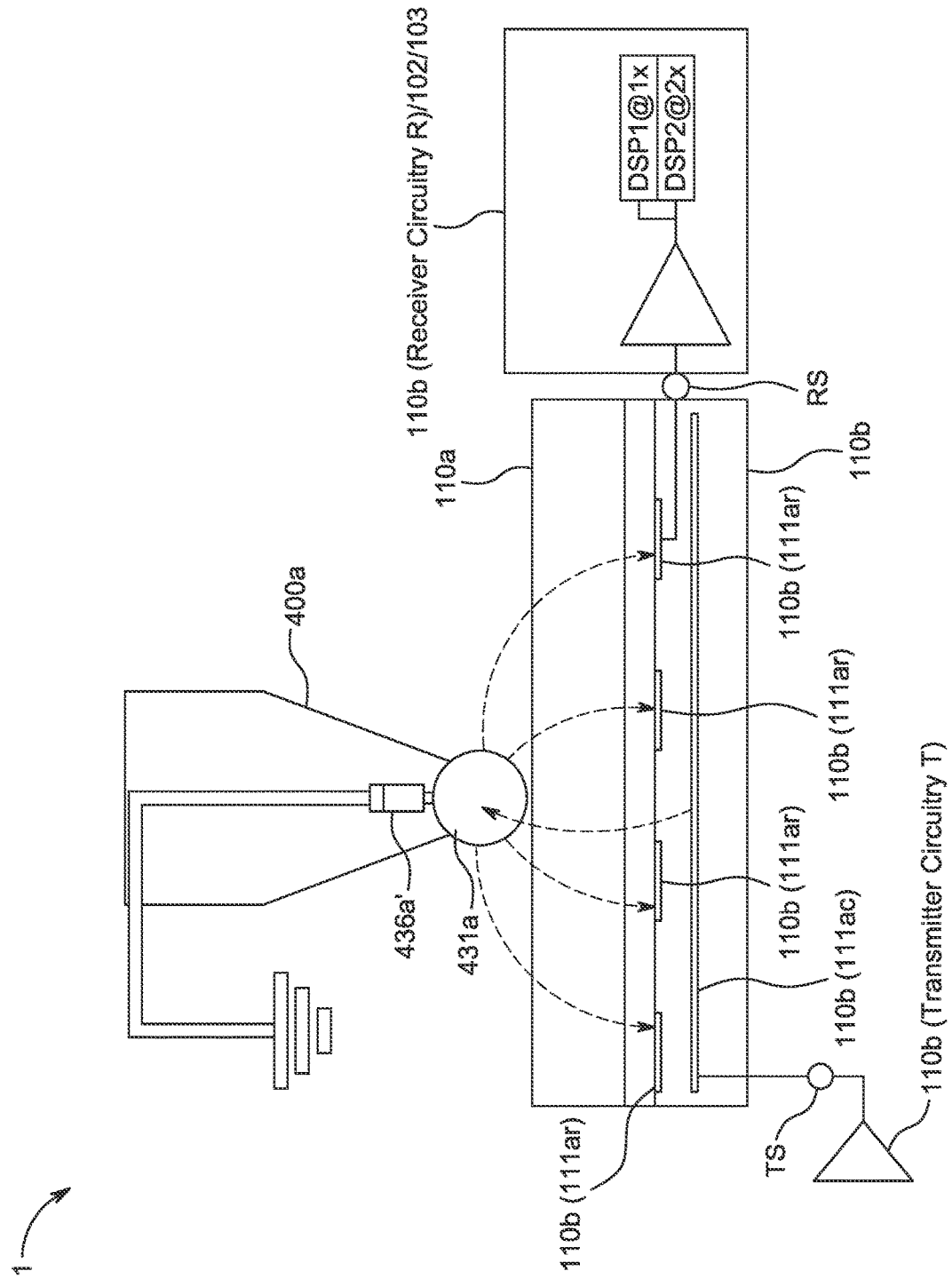
FIG. 6A is a schematic view of a portion of the system and a cross-sectional view of another portion of the system and stylus of FIGS. 1-1D and 6.

As mentioned, and as further shown in FIGS. 6 and 6A, sensor layer 110b of electronic device 100 may be configured to provide a matrix or array or grid of any suitable number of array trace columns 111ac and any suitable number of array trace rows 111ar, any two of which may intersect to provide a sensing node. Array trace columns 111ac may also be referred to herein as transmit electrodes, while array trace rows 111ar may also be referred to herein as receive electrodes. In some embodiments, each one of these transmit and receive electrodes may be formed, at least in part, from an optically transparent conductor, such as, but not limited to, metal oxides such as indium-tin oxide and antimony-tin oxide, nanowire patterns formed from silver nanowire, carbon nanotubes, platinum nanowire, gold nanowire, and so on, thin deposits of metal, and the like. Each transmit electrode may provide any suitable capacitance (e.g., $C^j_{xd}$) and each receive electrode may provide any suitable capacitance (e.g., $C^i_{xs}$). As shown, the transmit electrodes may be provided in an array that may be orthogonal to the receive electrodes (e.g., below the receive electrodes) in a matrix, while the array or matrix of orthogonal transmit electrodes and receive electrodes of sensor layer 110b may be provided below or otherwise adjacent (e.g., etched into or layered on or otherwise positioned against) input surface input component 110a (e.g., glass). It is to be understood that although various direction and orientational terms, such as "column" and "row," and "X-" and "Y-" and "Z," "up" and "down," "front" and "back," "left" and "right," "upper" and "lower," "top" and "bottom" and "side," "above" and "below," "vertical" and "horizontal" and "diagonal," "length" and "width" and "thickness" and "diameter" and "cross-section" and "longitudinal," and/or the like, may be used herein, such references are only for convenience, and that no fixed or absolute directional or orientational limitations are intended by the use of these words. If reoriented, different directional or orientational terms may need to be used in their description, but that will not alter their fundamental nature as within the scope and spirit of the subject matter described herein in any way. For example, while an "X-Y" layout may be referenced with respect to I/O component 111a, a diagonal lattice layout, where there may be no dedicated X- or Y-elements, but where each element may be transmitting or sensing at different times during a scan of the touch screen, may be utilized for enabling use of any stylus or accessory described herein. Thus, references to the details of the described embodiments are not intended to limit their scope.

Any suitable electrical signal (e.g., transmit signal) TS, such as any suitable voltage waveforms (e.g., sinusoidal drive or trapezoidal voltages) (e.g., $V^j_{stim}$), may be emitted or transmitted on one, some, or each transmit electrode by any suitable transmitter circuitry T of I/O interface 111a (e.g., of sensor layer 110b). Such a transmit signal TS may drive non-linear circuitry of a stylus (e.g., circuitry 436a' of stylus 400a) that may be positioned on input surface 110a, and such non-linearity may produce harmonics or any other suitable non-linear aspects of transmit signal TS. Any suitable electrical signal (e.g., receive signal) RS, such as any suitable sensed current (e.g., $I^i_{sense}$), may be detected by any suitable receiver circuitry R of I/O interface 111a (e.g., of sensor layer 110b) that may be provided along each one of the receive electrodes or that may be shared and used serially with two or more receive electrodes. As shown, receiver circuitry R may be any suitable circuitry, such as any suitable operational amplifier circuitry (e.g., a current sense amplifier (e.g., with feedback)) and an analog-to-digital converter ("ADC") that may be operative to digitize a current or other signal that may be sensed on a receive electrode (e.g., receiver circuitry R may be operative to hold other electrodes at virtual ground and utilize a current to voltage amplifier and then digitize the voltage on the receive electrode). Then, any suitable digital signal processing ("DSP") may be provided by processor 102 and any suitable application 103 running thereon in combination with the circuitry of I/O interface 111a (e.g., circuitry T and circuitry R of sensor layer 110b) in order to extract any non-linear aspects of the receive signal RS with respect to the transmit signal TS (e.g., to demodulate the second harmonic of a sine wave) and then to estimate a position of the stylus or accessory tip with respect to device 100 (e.g., X-Y location along the surface of input component 110a) based on the extracted non-linear aspects.

For example, graph 650 of FIG. 6B may be indicative of an exemplary plot over time of an exemplary transmit voltage, such as a voltage transmit signal TS that may be applied by circuitry T to a transmit electrode of sensor layer 110b of I/O interface 111a. Graph 660 of FIG. 6C may be indicative of an exemplary plot over time of an exemplary tip voltage, such as a voltage receive signal RS that may be sensed by circuitry R as provided on a receive electrode of sensor layer 110b of I/O interface 111a by a tip of a stylus (e.g., tip 431a of stylus 400a (e.g., with non-linear circuitry 436a')) when the tip may be stimulated by the transmit voltage of graph 650 (if no tip is present, then the transmit electrode may be just a pure capacitance, and the current sensed may be reactively related through the capacitance, and may be out of phase but still similar to the transmit signal (e.g., sinusoidal, not asymmetrically distorted)). Graph 670 of FIG. 6D may be indicative of an exemplary plot of an exemplary magnitude with respect to frequency of an applied voltage (e.g., voltage transmit signal TS of graph 650) as sensed by a receive electrode (e.g., voltage receive signal RS of graph 660), for example, as may be determined by the DSP of device 100. For example, as shown, graph 670 may identify a fundamental frequency (e.g., first harmonic) 671 (e.g., at a frequency of 200 kHz (e.g., a fundamental frequency of transmit signal TS)) and a non-linear aspect (e.g., second harmonic) 673 (e.g., at a frequency of 400 kHz (e.g., a multiple of the fundamental frequency of transmit signal TS)). Therefore, the non-linearity of stylus 400a may double (or otherwise provide any suitable multiple of) a modulation frequency (e.g., a fundamental frequency) of a transmitted signal TS (e.g., from 200 kHz to 400 kHz (see, e.g., FIG. 6D, from a first harmonic 671 to a second harmonic 673)) such that many cycles of non-linearity may be detected, such that noise may be reduced by requiring detection of a harmonic or any other suitable non-linear aspect multiple times within multiple cycles or just once in a single cycle. Depiction 680 of FIG. 6E may be indicative of any external element(s) determined (e.g., by DSP1 (e.g., DSP1@1x) of any suitable processing of device 100) to be sensed on a surface of input component 110a based on any fundamental frequency or first harmonic information (e.g., information of frequency 671 of graph 670) for some or each receive electrode of the system, which, as shown, may be indicative of not only a stylus tip by depiction portion 681 but also a portion of a user's hand by depiction portion 683, while depiction 690 of FIG. 6F may be indicative of any external element(s) determined (e.g., by DSP2 (e.g., DSP2@2x) of any suitable processing of device 100) to be sensed on a surface of input component 110a based on any non-linear aspect or multiple (e.g., second) harmonic information (e.g., information of frequency 673 of graph 670) for some or each receive electrode of the system, which, as shown, may be indicative of only a stylus tip by depiction portion 691 and not also a portion of a user's hand. This may create a unique identifier for a stylus with non-linear circuitry that may resolve certain location detection issues, such as disambiguation, merge, and negative pixel.

Therefore, one DSP per receive electrode demodulation path may be set to two-times the stimulation frequency (e.g., the frequency of the stimulation transmitted signal TS) in order to identify the location of a stylus with non-linear circuitry (e.g., circuitry providing a second harmonic), which may be used to only identify the location of the stylus and not a user that may not provide any non-linearity. Therefore, a transmitted signal (e.g., stimulation voltage (e.g., a pure tone or only with odd harmonics)) may be provided on one or more transmit electrodes to drive non-linear circuitry of a stylus that may produce at a stylus tip harmonic(s) or any other suitable non-linear aspect(s) of the transmitted signal (e.g., asymmetrical distortion due to a non-linear load (e.g., rectifier (e.g., diode))) that may be received as receive signal(s) on one or more receive electrodes and used through any suitable processing (e.g., DSP) to diagnose harmonics or non-linearity (e.g., by identifying non-linearity in a sense current spectrum (e.g., identifying that a sense current spectrum contains a second order harmonic)) to determine where a tip of the stylus may be located with respect to the electrodes.

Figure 7:
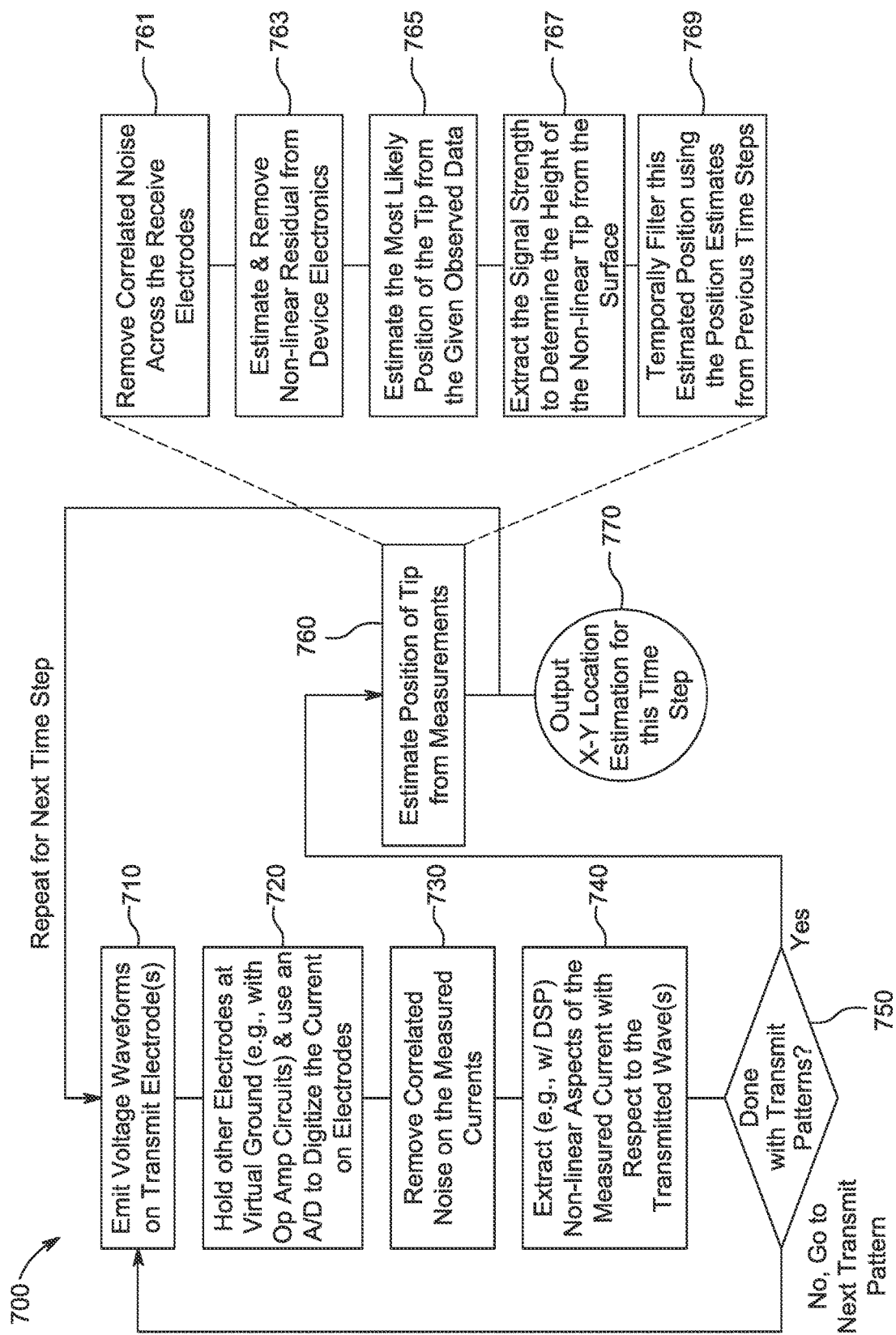
FIGS. 7-10 are flowcharts of illustrative processes for using a stylus.

FIG. 7 is a flowchart of an illustrative process 700 for determining a location of a stylus with non-linear circuitry at an input component of an electronic device (e.g., stylus 400a with non-linear circuitry 423a at an input component 110a of electronic device 100). Process 700 may begin at operation 710, where any suitable transmit signal or voltage waveform (e.g., transmit signal TS) may be emitted or otherwise provided by the electronic device on one, some, or each transmit electrode (e.g., each transmit electrode serially) in any suitable manner (e.g., in any suitable transmit pattern (e.g., the same stimulation waveform may be provided with one of two alternated phases (e.g., 0° or 180°) or not provided at all to different transmit electrodes in any suitable transmit pattern (e.g., according to any multi-stim matrix)). The transmit signal may include waveforms with little or negligible second harmonic or a known second harmonic. For example, the second harmonic may be low, such as about 50 db below the fundamental of the waveform. The transmit signal may be a sinusoidal waveform or a non-sinusoidal waveform. For example, a trapezoidal waveform may be generated or approximated by adding first harmonic and some amount of third harmonic and/or fifth harmonic, and/or the like to a sinusoidal waveform, which may not add to the voltage (e.g., Vmax) of the transmitted waveform but that may increase the fundamental of the waveform, which may increase the non-linear aspect (e.g., second harmonic) that may be generated and detected via a non-linear stylus (e.g., stylus 400a with circuitry 426a). Therefore, by adding odd harmonics (e.g., generating a waveform that may only have or may only substantially have odd harmonics), we may essentially drive a trapezoidal waveform that may provide a higher fundamental without a higher Vmax, which may obey certain system constraints while also increasing the non-linear aspect (e.g., second harmonic) of the transmit signal that may be detectable by the system through use of a stylus with non-linear circuitry.

At operation 720, process 700 may include the electronic device holding other electrodes (e.g., receive electrodes) at virtual ground (e.g., with op amp circuitry (e.g., current to voltage amplifier)) and digitize (e.g., with an ADC) any current sensed (e.g., a receive signal RS) on the electrodes (e.g., on one, some, or each receive electrode). For example, any suitable receive circuitry R of sensor layer 110b of I/O interface 111a may be capacitively coupled to a node (e.g., a capacitive sensing node of the array of receive and transmit electrodes) and may use any suitable feedback circuitry to maintain at a constant voltage and/or at virtual ground and may then output a voltage (e.g., tip voltage) to an ADC. While the receive signal(s) RS sensed at operation 720 may generally be sensed on one or more receive electrodes, device 100 may additionally or alternatively be configured to monitor the current on the drive electrodes for determining one or more receive signals RS. For example, a current at a drive electrode may be measured that may include a harmonically driven portion or otherwise non-linearly or asymmetrically distorted portion when a stylus with non-linear circuitry is affecting one or more transmit signal(s) on one or more drive electrodes. At operation 730, process 700 may include removing any correlated noise on the measured currents (e.g., the received signal(s) RS of the receive electrode(s) (and/or of the drive electrode(s)) of operation 720).

At operation 740, process 700 may include extracting (e.g., with the electronic device (e.g., using any suitable DSP) any suitable non-linear aspects of the measured current with respect to the transmitted waveforms. For example, operation 740 may include demodulating a second harmonic of a sinusoidal transmit signal TS of operation 710 from a current receive signal RS sensed at operation 720. Operation 740 may include carrying out any suitable comparison of a sensed output current on a receive electrode with respect to an input voltage provided on a transmit electrode in order to identify a non-linear aspect (e.g., a second or third or other suitable harmonic or asymmetric distortion or non-linear distortion of the fundamental (e.g., of the transmit signal at the receive signal)). At operation 750, it may be determined if all transmit patterns for a current time step have been carried out, and, if not, process 700 may return to operation 710 and once again carry out operations 710-740 for another transmit pattern for the current time step. However, if all transmit patterns for a current time step have been carried out, process 700 may proceed from operation 750 to operation 760. In some embodiments, for a particular time step of device 100, one, some, or each transmit electrode may be modulated (e.g., provided with a transmit waveform TS) one at a time and an output on one, some, or each receive electrode may be measured at operations 710-750. Alternatively, to be more efficient, for a particular time step of device 100, a correlated pattern (e.g., invertible Hadamard matrix) of transmit electrodes may be modulated (e.g., provided with a transmit waveform TS) and an output on one, some, or each receive electrode may be measured at operations 710-750. However, generally, for a particular time step of device 100, one or more transmit electrodes may be stimulated (e.g., serially or in various patterns) and receive signal data may be extracted from one or more receive electrodes (and/or drive electrodes) for use in identifying non-linear aspects for determining a location of a non-linear accessory or stylus during that particular time step. At operation 760, process 700 may include estimating (e.g., using any suitable processing of device 100) a position of a tip of an accessory on an input surface of the electronic device for a particular time step of the device using the measurements of operations 710-740 for the particular time step. At operation 770, process 700 may include outputting (e.g., using any suitable processing of device 100) an X-Y location estimation for the tip of the accessory for the particular time step, while process 700 may also return to operation 710 and repeat the process for a next time step of the device. Such an output X-Y location estimation for the accessory tip may be utilized (e.g., using any suitable processing and/or other component(s) of device 100) in any suitable manner for carrying out or adjusting any suitable functionality of the system, such as for adding graphical object data to a presented display on device 100 or adjusting the position of a cursor on device 100 or selecting an option associated with a graphical object displayed by device 100 at that X-Y location and/or the like.

As just one example, operation 760 may include one or more sub-operations, such as operations 761, 763, 765, 767, and/or 769. For example, operation 761 may include removing any suitable correlated noise across the receive electrodes (e.g., in addition to or as an alternative to the removal at operation 730). For example, in a given time step, multiple receive electrodes may be receiving current or any other signal(s) that may be sensed at operation 720, such that any or all noise that may be common mode or linearly related between those receive electrodes may be removed (e.g., as an effective procedure to improve signal to noise ratio). At operation 763, any suitable non-linear residual may be estimated and removed from any suitable electronics of device 100 (e.g., any second harmonic of the fundamental that may be emitted by any electronics of device 100 that may interfere with the accuracy of process 700). At operation 765, the most likely position (e.g., X-Y location) of the tip from the given observed data (e.g., as observed earlier in process 700 for the particular time step (e.g., as may have been adjusted through removal of noise and residuals)) may then be estimated. At operation 767, a signal strength of any signals of process 700 (e.g., the signal strength of any receive signals RS of operation 720) may be extracted to determine the height of the tip from the surface of input surface 110a. Such a determined height may be used by device 100 to determine whether or not the stylus is touching input surface 110a or otherwise determine whether the position of the tip being estimated is a position intended to be identified as an intentional stylus input event (e.g., to determine if the stylus is intended to be used as an input device for drawing a line or if the stylus is not intended to be used as an input device but is rather lifted off the input surface and is being moved to a new location for a new input event). At operation 769, the estimated position for the particular time step of operation 765 (e.g., if not to be disregarded due to an insufficient signal strength of operation 767) may be temporally filtered using any suitable estimated positions from previous iterations of process 700 for previous time steps. For example, any suitable temporal filter may be configured to provide estimates for where a tip is for a particular time step that may be smoothed out based on earlier estimates for earlier time steps before presenting an estimated location for the current time step for use at operation 770 (e.g., before the estimate is presented to an operating system or specific stylus-position dependent application that may be running on device 100).

Any suitable process(es) may be carried out (e.g., automatically by any suitable processing/application(s) of device 100) in order to estimate the most likely position of the tip of the stylus. For example, the non-linear aspects and/or any other determined information from operations 710-763 for a particular time step may be compared to outputs of any suitable model for an array of various possible X-Y locations and then find the model output that compares most favorably to the data determined for the current time step (e.g., using best fit via a least squares method) and then using the X-Y location of that model output as the estimated location of the stylus tip for the current time step. Such a model may be generated in any suitable manner. For example, such a model may be a mathematical model built based on a physics model of capacitance to the tip of the stylus and based on a circuit simulator model (e.g., simulation program with integrated circuit emphasis ("SPICE") model) of the electronic device. For example, such a physics model may utilize finite element analysis ("FEA") to physically diagram the interaction between the stylus and the device in order to calculate the expected fields (e.g., location of tip to location of capacitance), which may include a calculation of capacitance between transmit and receive electrodes for every possible position of the stylus tip with respect to the device's input surface, while such a circuit simulator model may utilize circuitry information about the circuitry (e.g., any suitable non-linear elements) of device 100 and/or of the stylus. The combined mathematical model may then be utilized to generate various sets of outputs, where each set may be indicative of the receive signal RS expected to be received at each device electrode when the tip is at a respective one of the various possible X-Y locations along the device's input surface. Such sets of model outputs may then be compared to an actual set of outputs by the device as determined at operations 710-763 for a particular time step in order to determine the best fit model output set in order to use the X-Y position associated with that best fit model output set as the estimated most likely position of the stylus with respect to device 100 for that particular time step.

In some embodiments, a magnitude of the force or pressure exerted by the accessory tip on the input surface may be determined by the electronic device. For example, a phase angle between the fundamental of a transmit signal and a non-linear aspect of a sensed receive signal may be identified and used to determine an amount of pressure exerted by the stylus (e.g., when a signal is demodulated to extract a second harmonic, the in-phase and quadrature ("I&Q") components and phase angle may be realized by such processing). For example, the resistance of resistance circuitry 425c may be selectively adjusted by a user during use of stylus 400c, which may adjust voltage of tip voltage and/or the phase angle between the fundamental of the transmit signal and the non-linear aspect of the detected receive signal. For example, a strain sensitive or force-sensing or any other suitable resistor 424c may be provided by resistance circuitry 425c that may adjust the resistance of resistor 424c based on how much force or pressure is applied thereto. Therefore, a stylus may be configured such that an amount of force used by the user to press the stylus tip against an input surface of an electronic device may adjust the amount of resistance provided by resistance circuitry (e.g., resistance circuitry in parallel with non-linear circuitry of that stylus). Such resistance adjustment may adjust the voltage of a receive signal and/or the phase angle detected by the electronic device and may be used to estimate the amount of force used by the user and stylus, which may provide yet another input for affecting the functionality of device 100 (e.g., in addition to an estimated location of the stylus (e.g., such that location and force of the stylus may together be used to determine how the device adjusts a device functionality (e.g., draw a light green line at a location or draw a dark green line at the location))). As just one example, an output of the model described with respect to operation 765 may include a phase angle output that may then be associated with a force output or the model may include a force output based on a determined phase angle.

In some embodiments, selective or dynamic scanning may be utilized to make process 700 more effective and/or efficient. For example, from one or more previous iterations of process 700 for one or more previous time steps, a previous location of a stylus may be estimated, and such an estimated location may be used to selectively or dynamically limit the electrodes that may be used in a current iteration of process 700 for a current time step (e.g., to only transmit signal(s) on certain transmit electrodes that may be proximate to the earlier estimated location and/or to only sense receive signal(s) on certain receive and/or transmit electrodes that may be proximate to the earlier estimated location), which may speed up processing and/or reduce power consumption for such a process. Different modes of location detection may be used for different types of external inputs, such as direct user touch, stylus with non-linear circuitry (e.g., stylus 400a), stylus with pattern generating circuitry (e.g., stylus 400b), and/or the like. For example, as shown by FIG. 6, a first DSP1 may be used to detect fundamental information of any external element(s) that may be used to determine the location of a user and/or any stylus or accessory (see, e.g., depiction 680 of FIG. 6E), while a second DSP2 may be used to detect non-linear information of any external element(s) that may be used to determine the location of a stylus or accessory with non-linear circuitry (see, e.g., depiction 690 of FIG. 6F). Such different modes may be switched temporally such that each mode may be carried out for a single time step (e.g., in a time slice fashion). The detected location data for external element(s) that may be generated by each mode for a single time step (e.g., data of depiction 680 and data of depiction 690) may be utilized together to provide one or more improved location estimates (e.g., for a stylus with non-linear circuitry) and/or to provide a more effective and/or efficient localization process. Additionally or alternatively, such temporally switched modes may allow for the concurrent detection of different styli during a single time step, such as by using a first mode to detect a first non-linear aspect (e.g., a second harmonic or a harmonic with a first phase) and by using a second mode to detect a second non-linear aspect (e.g., a third harmonic or a harmonic with a second phase).

It is understood that the operations shown in process 700 of FIG. 7 are only illustrative and that existing operations may be modified or omitted, additional operations may be added, and the order of certain operations may be altered. While FIGS. 6, 6A-6F, and 7 may be discussed generally with respect to second order harmonic extraction as a particular type of non-linear aspect that may be utilized for stylus localization, it is to be understood that any other suitable type of non-linear aspect may be detected and utilized according to process 700, such as third order harmonic with respect to a stylus with non-linear circuitry providing two diodes in parallel, for example.

Figure 8:
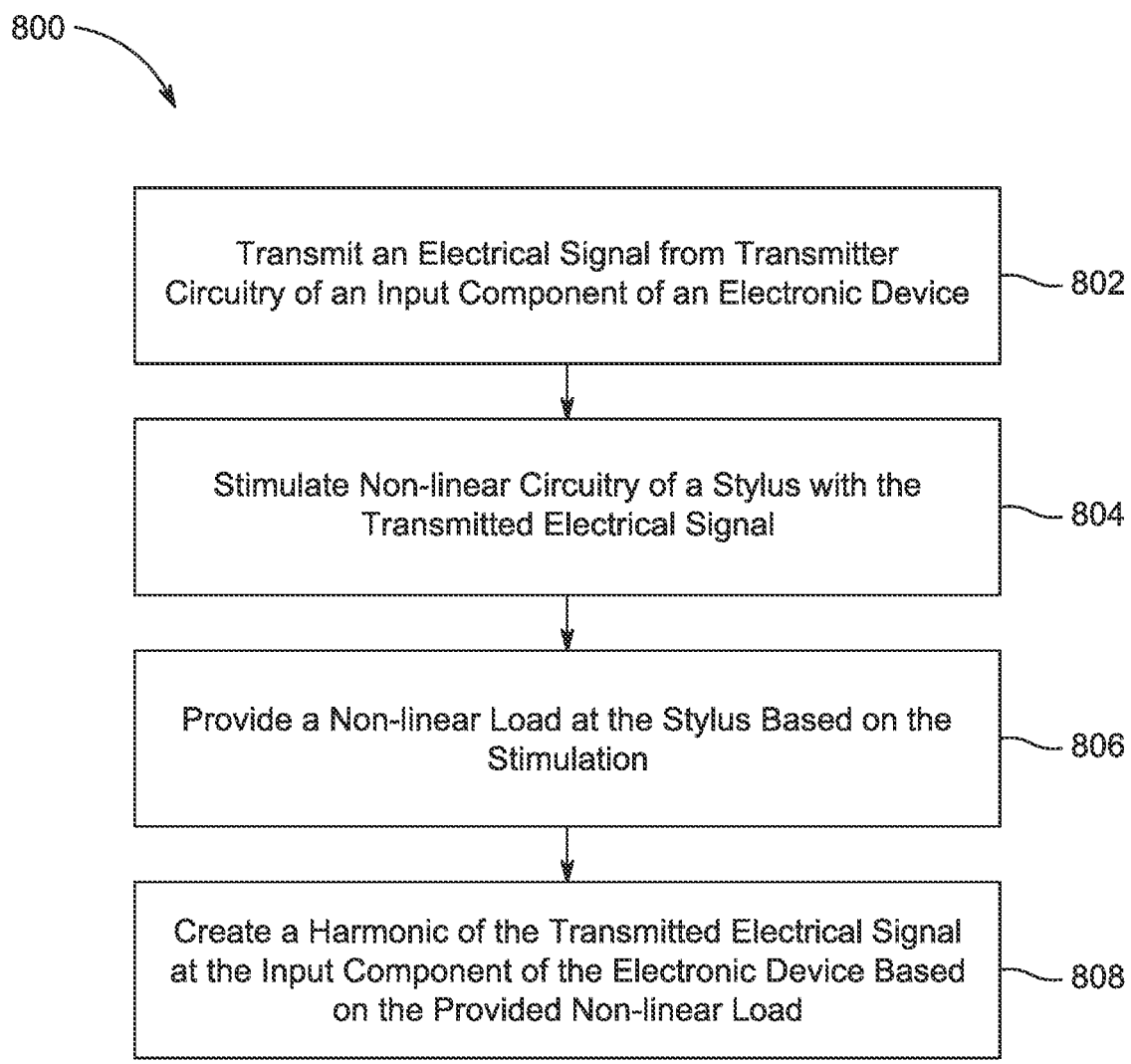

FIG. 8 is a flowchart of an illustrative process 800 for using a stylus that may include non-linear circuitry at an input component of an electronic device (e.g., stylus 400a with non-linear circuitry 423a at an input component 110a of electronic device 100). Process 800 may begin at operation 802, where an electrical signal may be transmitted from transmitter circuitry of the input component of the electronic device (e.g., signal TS). At operation 804, the non-linear circuitry of the stylus may be stimulated with the transmitted electrical signal. At operation 806, a non-linear load may be provided at the stylus based on the stimulating of operation 804. At operation 808, a harmonic of the transmitted electrical signal may be created at the input component of the electronic device based on the non-linear load provided at operation 806. Then, for example, the created harmonic may be detected with the electronic device and, based on the detecting, a position of the stylus with respect to the input component may be determined.

It is understood that the operations shown in process 800 of FIG. 8 are only illustrative and that existing operations may be modified or omitted, additional operations may be added, and the order of certain operations may be altered.

Figure 9:
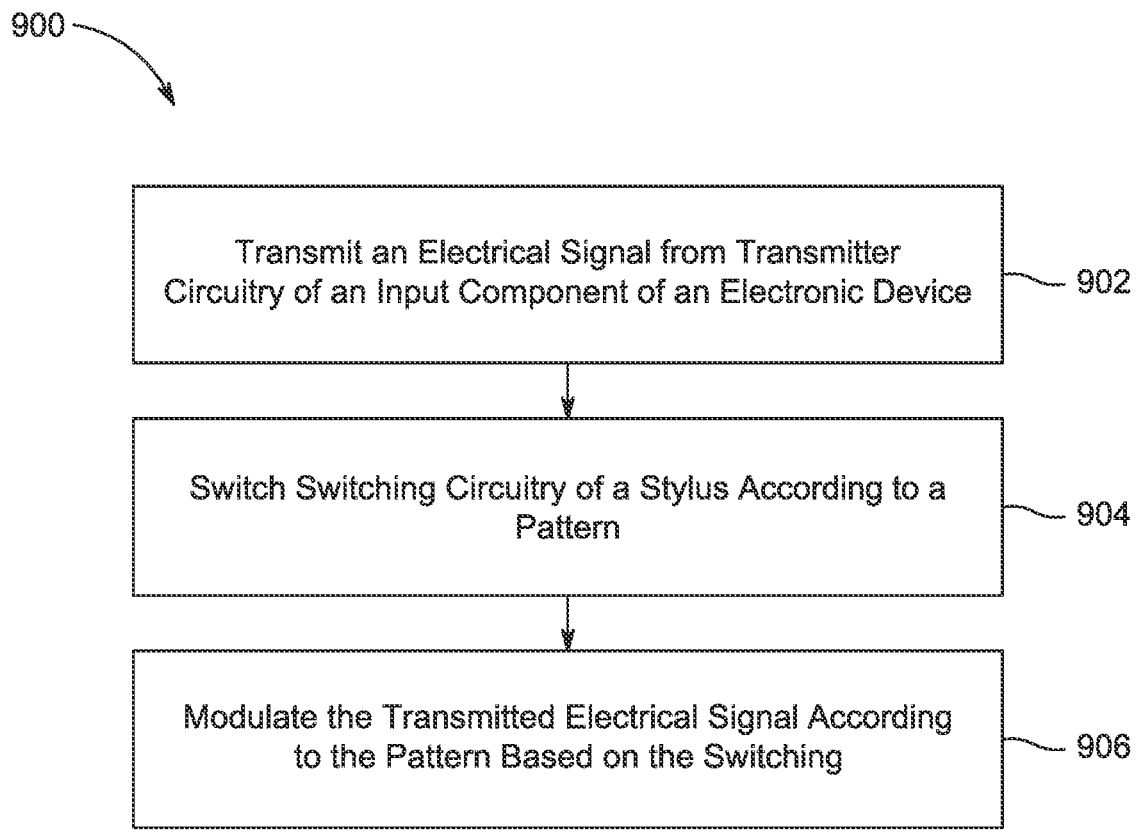

FIG. 9 is a flowchart of an illustrative process 900 for using a stylus that may include switching circuitry at an input component of an electronic device (e.g., stylus 400b with switching circuitry 423b at an input component 110a of electronic device 100). Process 900 may begin at operation 902, where an electrical signal may be transmitted from transmitter circuitry of the input component of the electronic device (e.g., signal TS). At operation 904, the switching circuitry may be switched according to a pattern (e.g., concurrently with operation 902). At operation 906, based on the switching of operation 904, the transmitted electrical signal may be modulated according to the pattern. Then, for example, the modulated electrical signal may be detected with the electronic device and, based on the detecting, a position of the stylus with respect to the input component may be determined.

It is understood that the operations shown in process 900 of FIG. 9 are only illustrative and that existing operations may be modified or omitted, additional operations may be added, and the order of certain operations may be altered.

Figure 10:
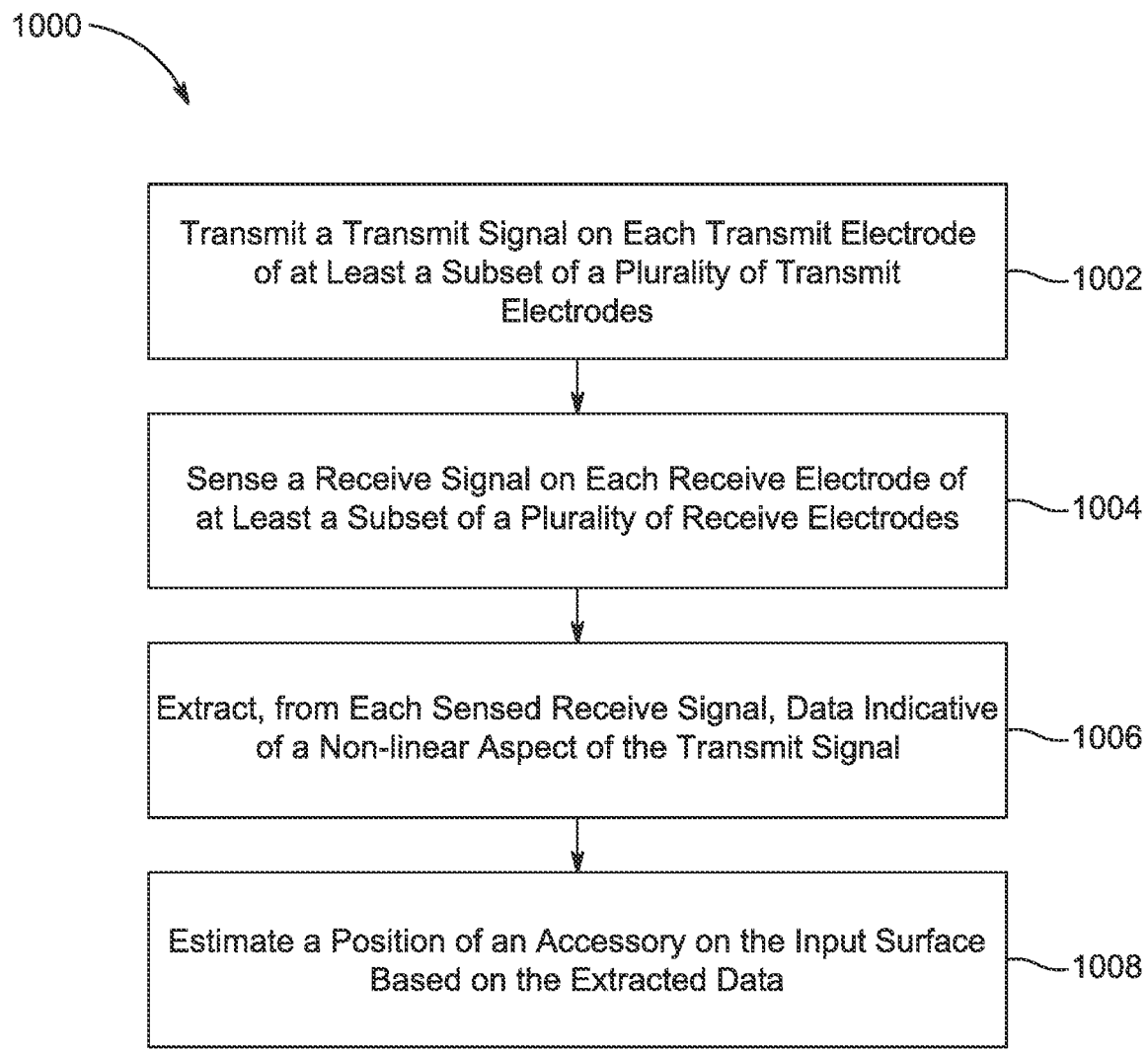

FIG. 10 is a flowchart of an illustrative process 1000 for detecting an accessory on an input surface of an input component of an electronic device that includes a matrix of a plurality of transmit electrodes and a plurality of receive electrodes (e.g., for detecting any accessory or stylus 400-400d on input surface 110a of I/O component 111a that includes an array of electrodes). Process 1000 may begin at operation 1002, where a transmit signal may be transmitted on each transmit electrode of at least a subset of the plurality of transmit electrodes (e.g., a transmit signal TS may be transmitted by transmitter circuitry T of device 100). At operation 1004, a receive signal may be sensed on each receive electrode of at least a subset of the plurality of receive electrodes (e.g., a receive signal RS may be sensed by receiver circuitry R of device 100). At operation 1006, data indicative of a non-linear aspect of the transmit signal may be extracted from each sensed receive signal (e.g., as described with respect to operation 740 of process 700), and, at operation 1008, a position of the accessory on the input surface may be estimated based on the extracted data (e.g., as described with respect to operation 760 of process 700).

It is understood that the operations shown in process 1000 of FIG. 10 are only illustrative and that existing operations may be modified or omitted, additional operations may be added, and the order of certain operations may be altered. Different transmit signals may be transmitted on different transmit electrodes of at least the subset at operation 1002 (e.g., at the same time or at different times), and data indicative of a non-linear aspect of those transmit signals may be extracted at operation 1006 from the sensed receive signals.

Figure 11:
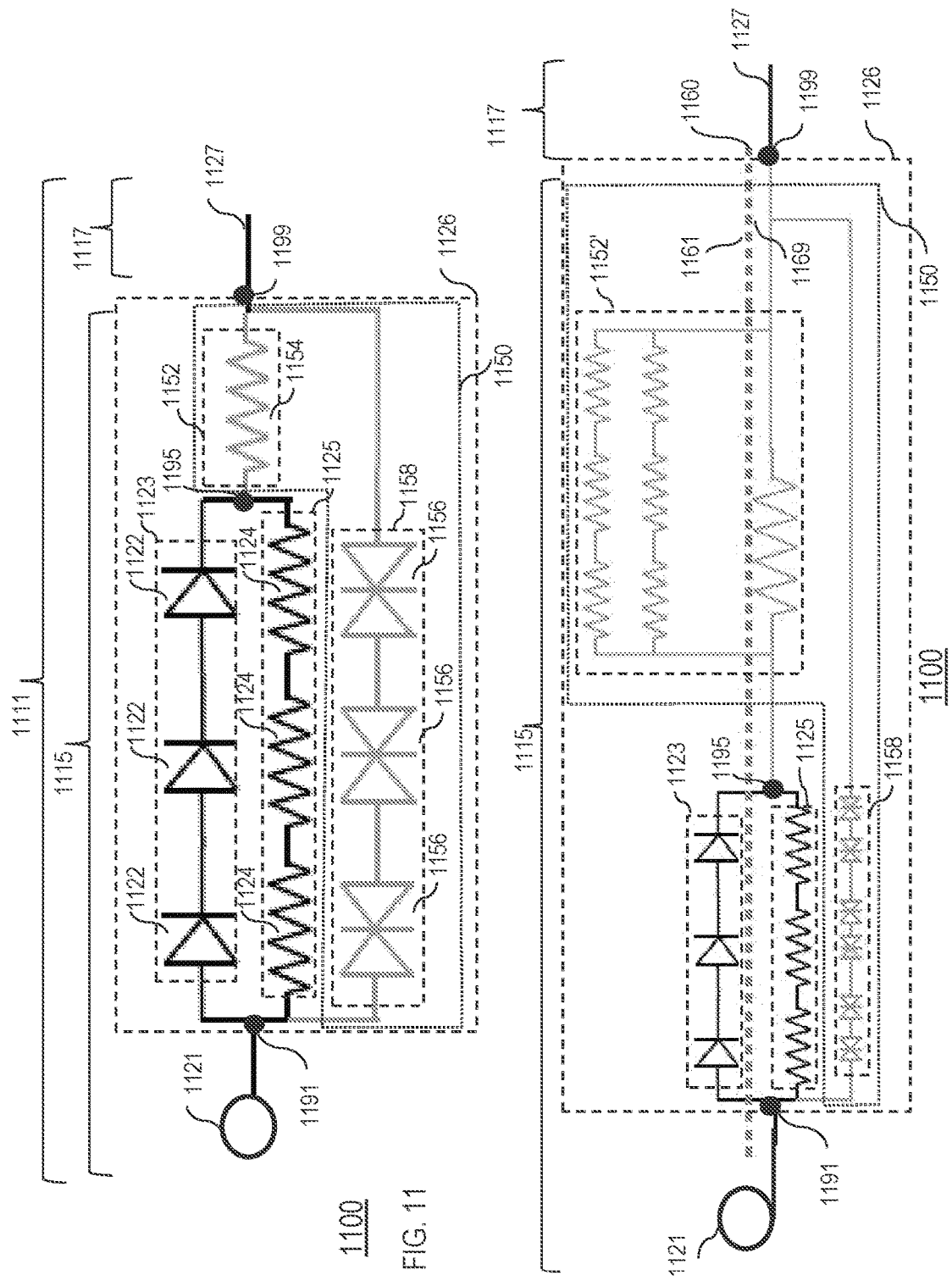

Tip components of styli and other accessories described herein may be sensitive to electrostatic discharge. Therefore, various features may be provided for protecting the accessories (e.g., tip components of accessories) against electrostatic discharge ("ESD"). Any tip stylus circuitry of any suitable tip portion may be provided with any suitable ESD protection circuitry for providing ESD protection to the tip stylus circuitry (e.g., to the non-linear electrical circuitry of the tip stylus circuitry). As shown in FIGS. 11 and 11A, any suitable accessory or stylus 1100 (e.g., which may be the same as or similar to any one or more of accessories or styli 400, 400a, 400b, 400c, and 400d) may include any suitable tip portion 1115 (e.g., which may be the same as or similar to any one or more of tip portions 415, 415a, 415b, 415c, 415d, 419, and 419a) that may be removably or fixedly coupled (e.g., physically and/or electrically) to any suitable body stylus circuitry 1127 (e.g., which may be the same as or similar to any one or more of circuitries 427a, 427b, 427c, and 427d) of any suitable barrel or handle or body portion 1117 (e.g., which may be the same as or similar to any one or more of body portions 417, 417a, 417b, 417c, and 417d) for providing any suitable accessory or stylus I/O circuitry 1111 (e.g., which may be the same as or similar to any one or more of I/O circuitries tip portions 411, 411a, 411b, 411c, and 411d) for use by any suitable user U with any suitable device I/O interface (e.g., device I/O interface 111a). Tip portion 1115 may include any suitable tip interface component 1121 (e.g., which may be the same as or similar to any one or more of tip interface components 421a, 421b, 421c, 421d, and 431a) and any suitable tip stylus circuitry 1126 (e.g., which may be the same as or similar to any one or more of tip stylus circuitries 426a, 426b, 426c, 426d, 436a, and 436a'). Tip stylus circuitry 1126 may be positioned between and electrically coupled to each one of tip interface component 1121 and a portion (e.g., an end) of body stylus circuitry 1127 (e.g., a ground rod (e.g., of a purely capacitively coupled device)). Tip stylus circuitry 1126 may include any suitable non-linear electrical circuitry 1123 (e.g., which may be similar to any one or more of circuitries 423a, 423b, 423c, and 433a) that may be electrically coupled (e.g., in series) between tip interface component 1121 and body stylus circuitry 1127. For example, non-linear electrical circuitry 1123 may include any suitable number of any suitable type(s) of non-linear electrical elements 1122, such as one or more signaling diodes 1122 (e.g., any suitable type of diode, such as a Schottky diode, a transistor in diode configuration (e.g., a diode connected transistor), and/or the like). Non-linear electrical circuitry 1123 may include any suitable number (e.g., one or two or three or four or more) of non-linear electrical elements 1122 (e.g., 3, as shown) that may be coupled together in series (e.g., a cathode of one signaling diode 1122 may be coupled to an anode of a next signaling diode 1122 and/or the like) or in parallel or otherwise (e.g., between a node 1191 and a node 1195). Additionally, tip stylus circuitry 1126 may include (e.g., in parallel with non-linear electrical circuitry 1123 (e.g., between node 1191 and node 1195)) any suitable signaling resistance circuitry 1125 (e.g., which may be the same as or similar to any one or more of circuitries 425a and 425c). For example, signaling resistance circuitry 1125 may include any suitable number of any suitable type(s) of signaling resistance elements 1124, such as one or more signaling resistors 1124 that may be coupled together in series (e.g., 3, as shown) or in parallel or otherwise, for any suitable function, including, but not limited to, controlling reverse leakage current of non-linear electrical circuitry 1123 and/or preventing DC positive voltage build up at the diode(s) or other non-linear electrical element(s) 1122 of non-linear electrical circuitry 1123 by effectively draining off any DC while maintaining non-linearity of tip stylus circuitry 1126. The resistance of resistance circuitry 1125 may be selected in any suitable manner, such as by using a model of the panel, including its stimulation voltage and capacitance to the tip, and the non-linear device model, and optimizing the model. For an embodiment using one or more Schottky diodes for non-linear electrical circuitry 1123, the optimum may vary, for example, between 4.0-6.0 megaohms, between 4.0-10.0 megaohms, between 4.0-15.0 megaohms, or even no additional leakage may be needed.

Moreover, as shown, tip stylus circuitry 1126 may include any suitable ESD protection circuitry 1150 for providing ESD protection to tip stylus circuitry 1126 (e.g., to enable the diode(s) or other non-linear electrical element(s) 1122 of non-linear electrical circuitry 1123 to survive ESD shocks (e.g., to prevent a current that may be generated by an ESD shock from damaging the diode(s) or other non-linear electrical element(s) 1122 of non-linear electrical circuitry 1123 by static electricity flowing thereacross)). For example, ESD protection circuitry 1150 may include any suitable ESD path circuitry 1158, which may be positioned between and electrically coupled to node 1191 and a node 1199 that may be coupled to body stylus circuitry 1127 (e.g., ESD path circuitry 1158 may be electrically coupled in parallel with non-linear electrical circuitry 1123 and with resistance circuitry 1125). For example, ESD path circuitry 1158 may include any suitable number of any suitable type(s) of ESD path elements 1156, such as one or two or more diodes 1156 in series (e.g., three (e.g., as shown in FIG. 11) or six (e.g., as shown in FIG. 11A)) or in parallel or otherwise, for any suitable function, including, but not limited to, providing an ESD path around non-linear electrical circuitry 1123 (e.g., for bleeding at least a portion of an ESD event through a different circuit path than through non-linear electrical circuitry 1123). One, some, or each ESD path element 1156 may be any suitable diode, such as a transient-voltage-suppression ("TVS") diode or transil or thyrector or transorb or TVS array package (e.g., several in one package), which may be configured to standoff several volts under ordinary circumstances but then shunt excess current therethrough when an induced voltage (e.g., an ESD event from a 7,000 volt discharge event or from a 15,000 volt discharge event or from any other suitable discharge event) exceeds an avalanche breakdown potential, thereby suppressing overvoltages above its breakdown voltage, and to reset automatically when the overvoltage goes away, but to absorb much of the transient energy. Therefore, ESD path element(s) 1156 may be configured to divert at least some excess current (e.g., as generated by static electricity) through ESD path circuitry 1158 rather than such current causing damage to non-linear electrical circuitry 1123 by flowing across non-linear electrical element(s) 1122 of non-linear electrical circuitry 1123. In some embodiments, rather than providing just one ESD path element 1156, which may protect against certain ESD events but add significant parasitic capacitance (e.g., about 0.1 picofarad), ESD path circuitry 1158 may include two or more ESD path elements 1156 in series, which may decrease or limit the amount of parasitic capacitance (e.g., series capacitance) added and/or may increase the breakdown voltage. In some embodiments, a series capacitance of tip stylus circuitry 1126 may be in the range of 50.0 femtofarads to 200.0 femtofarads. Stylus 1100 may be designed such that the total capacitance through stylus 1100 (e.g., through the tip) may be between 20.0 femtofarads and 500 femtofarads, or at least less than 300 femtofarads, wherein total capacitance through the structure (e.g., through the tip) may be less than 300 femtofarads.

In some situations, non-linear electrical element(s) 1122 of non-linear electrical circuitry 1123 may carry most of the current and may breakdown before ESD path element(s)

1156 of ESD path circuitry 1158 detects enough voltage of the ESD event to start shunting excess current therethrough. Therefore, additional circuitry may be provided to enable or better ensure that when an ESD event occurs, at least a large portion of the ESD may travel through ESD path circuitry 1158 rather than through non-linear electrical circuitry 1123. For example, ESD protection circuitry 1150 may include any suitable ESD resistance circuitry 1152, which may be positioned between and electrically coupled to node 1195 and node 1199 (e.g., ESD resistance circuitry 1152 may be electrically coupled in series with body stylus circuitry 1127 and the parallel combination of non-linear electrical circuitry 1123 and resistance circuitry 1125, while ESD resistance circuitry 1152 may also be electrically coupled in parallel with ESD path circuitry 1158). For example, ESD resistance circuitry 1152 may include any suitable number of any suitable type(s) of ESD resistance elements 1154, such as one or more current limiting resistors 1154 (e.g., one (e.g., as shown in FIG. 11) or two or more that may be coupled together in series or in parallel or otherwise (e.g., two sets of three in-series resistors (e.g., 0402 size resistors) in parallel with one another and/or with a single resistor (e.g., an 0805 or 0603 size resistor) (e.g., as shown by an alternative circuitry 1152' in FIG. 11A)) or the like), for any suitable function, including, but not limited to, limiting the amount of current (e.g., ESD current) able to pass through non-linear electrical circuitry 1123. ESD resistance circuitry 1152 (e.g., resistance element 1154 of FIG. 11) may be any suitable size or type with any suitable resistance, such as a resistor with a resistance of 10 kiloohms, 50 kiloohms, 100 kiloohms, 200 kiloohms, 500 kiloohms, anything therebetween, or the like. Without ESD path circuitry 1158, resistance element(s) 1154 of ESD resistance circuitry 1152 may degrade during an ESD shock event, whereby tip stylus circuitry 1126 may fail after degradation of such resistance element(s) 1154. However, in combination with ESD path circuitry 1158 in ESD protection circuitry 1150 of tip stylus circuitry 1126, ESD resistance circuitry 1152 may protect non-linear electrical element(s) 1122 of non-linear electrical circuitry 1123 at least up to the added breakdown voltage of ESD path element(s) 1156 of ESD path circuitry 1158. ESD resistance circuitry 1152 may be configured to prevent non-linear electrical circuitry 1123 from conducting first in the event it has a breakdown event and to make most of the current flow through ESD path circuitry 1158 during the ESD event as ESD path element(s) 1156 of ESD path circuitry 1158 may break down to a very low resistance in response to a high voltage pulse. ESD resistance circuitry 1152 may be configured such that tip stylus circuitry 1126 may avoid voltage/current degradation during an ESD event. ESD resistance circuitry 1152 may be configured to prevent an ESD strike event from arcing around one, some, or each of the resistance element(s) 1154 of ESD resistance circuitry 1152 and damaging tip stylus circuitry 1126. In some embodiments, multiple resistance elements 1154 may be provided by ESD resistance circuitry 1152, such that ESD resistance circuitry 1152 may still provide ESD protection even if one or some of the multiple resistance elements 1154 fail or are damaged. The longer a package of resistor elements provided by ESD resistance circuitry 1152 (e.g., the longer the ESD resistance circuitry), the less likely ESD resistance circuitry 1152 may be to fail (e.g., the less likely it may be arced around). Additionally or alternatively, the bigger a resistor element provided by ESD resistance circuitry 1152, the less likely that resistor element may be to fail (e.g., fail from just seeing too much current).

As shown in FIG. 11A, tip stylus circuitry 1126 may be mounted on or otherwise supported by or interconnected by any suitable circuit board 1160 (e.g., for providing any suitable bus or the like, which may be similar to bus 414). Circuit board 1160 (e.g., a printed circuit board ("PCB")) may then be positioned within a housing of the stylus or accessory and electrically coupled to tip interface component 1121 (e.g., at node 1191) and to body stylus circuitry 1127 (e.g., at node 1199). While FIGS. 11 and 11A may show tip interface component 1121 electrically coupled to tip stylus circuitry 1126 at node 1191 and body stylus circuitry 1127 electrically coupled to tip stylus circuitry 1126 at node 1199 (e.g., to keep oscillating voltages of circuitry 1126 (e.g., of circuitry 1123) to be constrained as close to tip interface component 1121 as possible, which may help reduce wobble), it is to be understood that the opposite could be true where tip interface component 1121 may be electrically coupled to tip stylus circuitry 1126 at node 1199 and body stylus circuitry 1127 may be electrically coupled to tip stylus circuitry 1126 at node 1191. Moreover, as shown in FIG. 11A, circuit board 1160 may provide each one of a first (e.g., top) surface 1161 and a second (e.g., bottom) surface 1169, and different portions of tip stylus circuitry 1126 may be electrically coupled to different surfaces of board 1160. For example, as shown, non-linear electrical circuitry 1123 may be provided on and electrically coupled to surface 1161 while resistance circuitry 1125 and ESD path circuitry 1158 may be provided on and electrically coupled to surface 1169. ESD resistance circuitry 1152 may include different resistance elements 1154 on different surfaces or each resistance element 1154 on only one of the surfaces. However, in other embodiments, it is to be understood that non-linear electrical circuitry 1123 and ESD path circuitry 1158 may be provided on the same circuit board surface. Any arrangement of various components of tip stylus circuitry 1126 on various surfaces of circuit board 1160 may be made (e.g., diodes on one side and resistors on another), although a goal may be to keep the net capacitance across the whole circuitry to be as low as possible when the device is in operation, to minimize trace parasitic coupling, to prevent fields from skipping over devices and jumping from one electrode to another in the stack, and/or to reduce stray capacitance.

Figure 12:
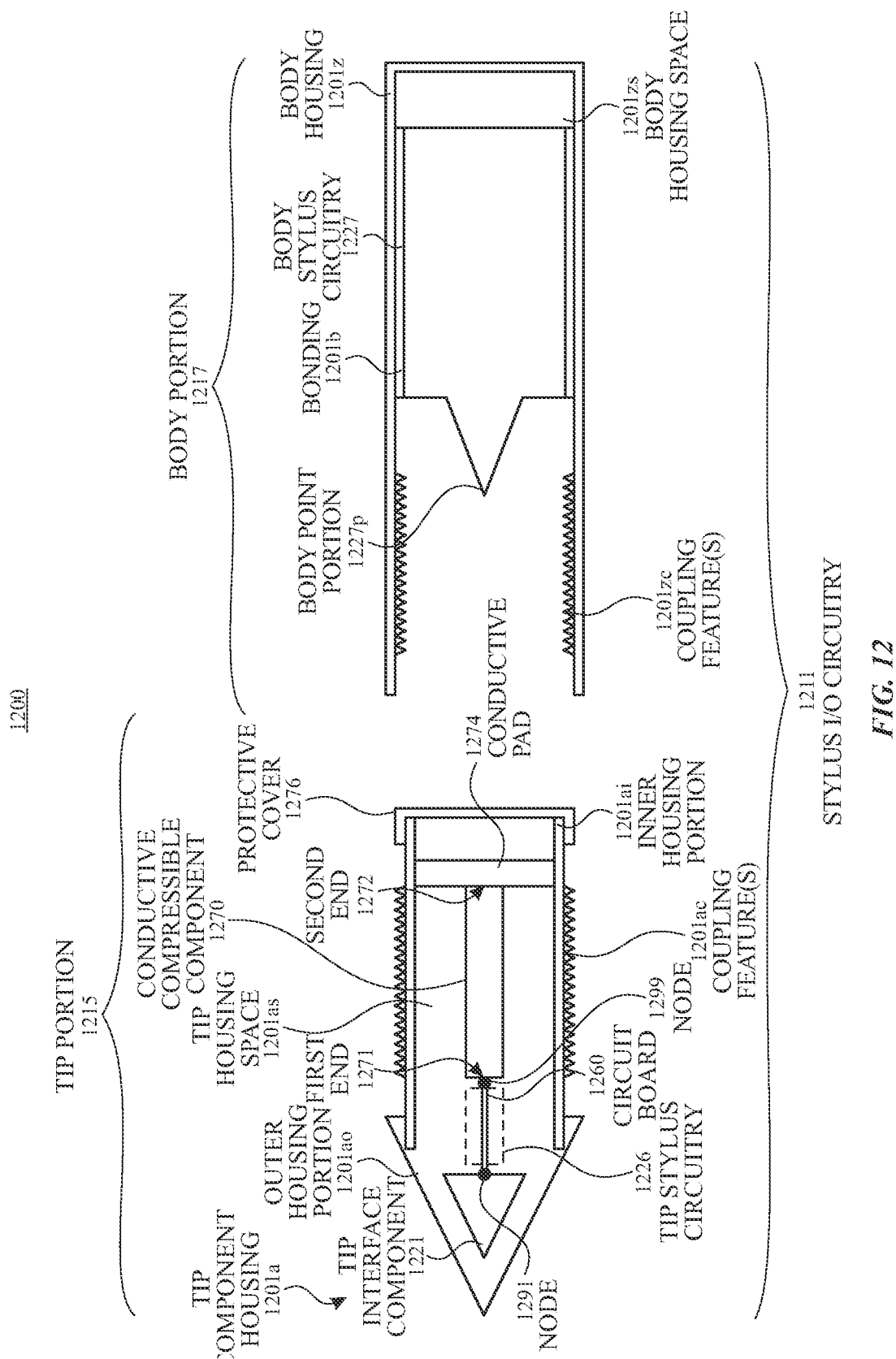
FIGS. 12 and 12A are cross-sectional views of another stylus in different stages of assembly.
Figure 12A:
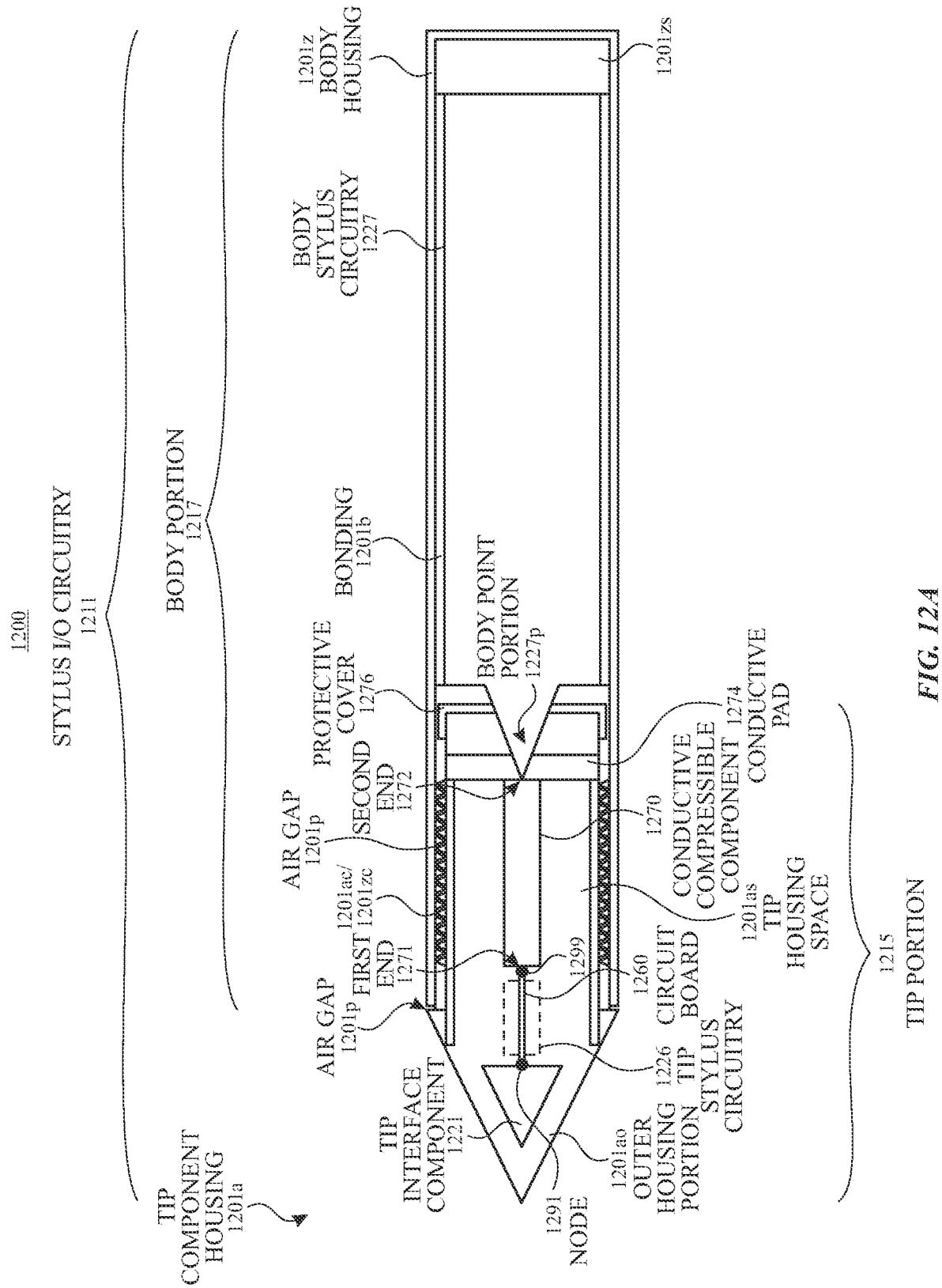

Tip components of styli and other accessories described herein may be configured to be removably or fixedly coupled to a barrel or handle or body portion. As shown in FIGS. 12 and 12A, any suitable accessory or stylus 1200 (e.g., which may be the same as or similar to any one or more of accessories or styli 400, 400a, 400b, 400c, 400d, and 1100) may include any suitable tip portion 1215 (e.g., which may be the same as or similar to any one or more of tip portions 415, 415a, 415b, 415c, 415d, 419, 419a, and 1115) that may be removably or fixedly coupled (e.g., physically and/or electrically) to any suitable body stylus circuitry 1227 (e.g., which may be the same as or similar to any one or more of circuitries 427a, 427b, 427c, 427d, and 1127) of any suitable barrel or handle or body portion 1217 (e.g., which may be the same as or similar to any one or more of body portions 417, 417a, 417b, 417c, 417d, and 1117) for providing any suitable accessory or stylus I/O circuitry 1211 (e.g., which may be the same as or similar to any one or more of I/O circuitries tip portions 411, 411a, 411b, 411c, 411d, and 1111) for use by any suitable user U with any suitable device I/O interface (e.g., device I/O interface 111a). Tip portion 1215 may include any suitable tip interface component 1221 (e.g., which may be the same as or similar to any one or more of tip interface components 421a, 421b, 421c, 421*d*, 431*a*, and 1121) and any suitable tip stylus circuitry 1226 (e.g., which may be the same as or similar to any one or more of tip stylus circuitries 426*a*, 426*b*, 426*c*, 426*d*, 436*a*, 436*a*', and 1126). Tip stylus circuitry 1226 may be positioned between and electrically coupled to each one of tip interface component 1221 and a portion (e.g., an end) of body stylus circuitry 1227 (e.g., a ground rod (e.g., of a purely capacitively coupled device)). Tip stylus circuitry 1226 may extend between nodes 1291 and 1299 (e.g., which may be the same as or similar to nodes 1191 and 1199) and may be provided on a circuit board 1260 (e.g., which may be the same as or similar to board 1160). As shown, tip component portion 1215 may include a tip component housing 1201*a* that may at least partially protect one, some, or each of the components of tip component portion 1215. For example, tip component housing 1201*a* may at least partially define a tip housing space 1201*as* within which tip interface component 1221 and/or tip stylus circuitry 1226 and/or circuit board 1260 may be at least partially positioned. As shown, tip portion 1215 may also include any suitable conductive compressible component 1270 (e.g., foam or spring (e.g., a preloaded spring)) that may extend between a first end 1271 and a second end 1272. Tip portion 1215 may also include a conductive pad 1274. As shown, conductive compressible component 1270 may be positioned within housing space 1201*as* such that first end 1271 of conductive compressible component 1270 may contact or at least face node 1299 of circuitry 1226 (e.g., a node contact of board 1260 or otherwise) and such that second end 1272 of conductive compressible component 1270 may contact or at least face conductive pad 1274. In some embodiments, a protective cover 1276 (e.g., a polymide film (e.g., KAPTON® by DuPont)) may be provided over an opening at an open end of tip component housing 1201*a*, which may retain the contents of space 1201*as* therein (e.g., board 1260, conductive compressible component 1270, conductive pad 1274, etc.) and/or protect such contents against ESD. As shown, body portion 1217 may include a body housing 1201*z* that may at least partially protect one, some, or each of the components of body portion 1217. For example, body housing 1201*z* may at least partially define a body housing space 1201*zs* within which body stylus circuitry 1227 may be at least partially positioned (e.g., freely or adhered to an interior of body housing 1201*z* via any suitable bonding 1201*b*). Body housing 1201*z* may be defined to have an open end towards which a body point portion 1227*p* of body stylus circuitry 1227 may face. An enclosure or housing of stylus 1200 may be provided by a combination of tip component housing 1201*a* and body housing 1201*z*.

Tip portion 1215 can be configured to be removably or fixedly coupled to body portion 1217 using any suitable coupling features. For example, any suitable tip coupling feature(s) 1201*ac* may be provided by tip component housing 1201*a* and/or by any other suitable component(s) of tip portion 1215, and any suitable body coupling feature(s) 1201*zc* may be provided by body housing 1201*z* and/or by any other suitable component(s) of body portion 1217, and features 1201*ac* and 1201*zc* may interact with one another in any suitable manner for removably or fixedly coupling tip component housing 1201*a* and body housing 1201*z* to one another. For example, features 1201*ac* and 1201*zc* may provide such coupling via threadings/screws, detents and/or recesses, interference-fit or snap-fit, magnetic attraction, and/or the like. When coupled together (e.g., via features 1201*ac* and 1201*zc*) by inserting an end portion of housing 1201*a* into the open end of housing 1201*z* (e.g., in the direction of arrow I), body point portion 1227*p* of body stylus circuitry 1227 may puncture or rupture or otherwise pass through protective cover 1276 (if provided) and press into conductive pad 1274, which may press conductive pad 1274 against and maintain electrical contact with end 1272 of conductive compressible component 1270, which may compress conductive compressible component 1270 for pressing end 1271 of conductive compressible component 1270 against and maintain electrical contact with node 1299, thereby creating and maintaining an electrical coupling of body stylus circuitry 1227 and tip stylus circuitry 1226 via conductive compressible component 1270 and conductive pad 1274. The compressibility of conductive compressible component 1270 and/or the compressibility of conductive pad 1274 may enable any suitable mechanical tolerances between tip portion 1215 and body portion 1217 while ensuring robust electrical coupling between body stylus circuitry 1227 and tip stylus circuitry 1226 once housings 1201*a* and 1201*z* have been mechanically coupled together. Whether the coupling of housings 1201*a* and 1201*z*, and thus the coupling of tip portion 1215 and body portion 1217, is configured to be a removable coupling (e.g., a screwable/unscrewable coupling that an end user may utilize to replace one of the portions (e.g., re-use a body portion with different replaceable tip portions)) or is configured to be a fixed coupling (e.g., a glued or snap fit coupling that is configured to be done once by a manufacturer and not intended to be undone by an end user (e.g., in the direction of arrow O)), the compressibility of conductive compressible component 1270 and/or the compressibility of conductive pad 1274 may be utilized to ensure a robust electrical coupling (e.g., maintain electrical pressure) while enabling any suitable mechanical tolerances. Moreover, the compressibility of conductive compressible component 1270 and/or the compressibility of conductive pad 1274 may help prevent physical damage to portions of the accessory if dropped. For example, if the accessory were to be dropped from some height and then land on its tip, then the weight of the body portion may impart a damaging force onto the circuit board, if not for the compressibility of the conductive compressible component and/or the compressibility of the conductive pad that may be operative to reduce the force imparted by the body portion on to the circuitry (e.g., from 10,000 g's to 200 g's). If tip portion 1215 is to be removably coupled to body portion 1217 for enabling user replacement of one tip portion 1215 for another tip portion, then protective cover 1276 may be configured to be any suitable ESD protection film that may protect an ESD airgap between protective cover 1276 and conductive pad 1274 within space 1201*as* and/or that may be effectively an ESD barrier that may prevent an ESD event at back of the tip (e.g., prior to puncture of the cover by the body portion (e.g., by body point portion 1227*p* (e.g., any suitable tip or sharp or leading portion))). Some replaceable tips may be especially ESD sensitive due to potentially not having full housing protection prior to the replaceable tip being coupled to the body portion, such that the protective cover may be protecting an otherwise open and unprotected back side of the replaceable tip against ESD damage (e.g., prior to the tip being coupled to the body portion for the first time (e.g., prior to the protective cover being punctured or otherwise broken by the initial (e.g., only) coupling of the replaceable tip to the body portion) and/or while the tip is coupled to the body portion for the first time). End 1271 of conductive compressible component 1270 may be mechanically connected to node 1299 (e.g., via solder) or conductive compressible component 1270 may not be fixed to node 1299 but rather held thereagainst at least when housings 1201*a* and 1201*z* are assembled together. Similarly, end 1272 of conductive compressible component 1270 may be mechanically connected to conductive pad 1274 (e.g., via solder) or conductive compressible component 1270 may not be fixed conductive pad 1274 but rather held thereagainst at least when housings 1201a and 1201z are assembled together.

When tip portion 1215 is coupled to body portion 1217, an airgap 1201p may exist between housing 1201a and housing 1201z (e.g., between coupling features 1201ac and 1201az and/or between any other opposing portions of housings 1201a and 1201z). During certain ESD strike events, an arc may attempt to cross airgap 1201p. Therefore, airgap 1201p may be configured to be of a geometry that may prevent such behavior in order to protect the circuitry within spaces 1201as and 1201zs of housings 1201a and 1201z. For example, airgap 1201p may be configured to be long and skinny enough (e.g., 3 centimeters long) so a voltage able to cross such a gap would need to be higher than an ESD strike is likely to produce. Alternatively, a glue may be provided to completely fill the airgap.

Tip component housing 1201a may be formed by one or more housing portions. For example, as shown, tip component housing 1201a may include an inner or first housing portion 1201ai and an outer or second housing portion 1201ao. First housing portion 1201ai may be any suitable material(s), such as a high dielectric strength material, such as Nylon 11 or Polyamide 11 (e.g., a polyamide, bioplastic, and a member of the nylon family of polymers (e.g., produced by the polymerization of 11-aminoundecanoic acid (e.g., as may be produced by Arkema as RILSAN®))), where such a high dielectric strength material may be operative to reduce the electrical breakdown risk due to an ESD event. Second housing portion 1201ao, which may be softer than first housing portion 1201ai, may be any suitable material(s), such as polyether block amide (e.g., a thermoplastic elastomer ("TPE") (e.g., as may be produced by Arkema as PEBAX® or by Evonik Industries as VESTAMID®)) or polyvinylidene fluoride or polyvinylidene difluoride ("PVDF") (e.g., a highly non-reactive thermoplastic fluoropolymer (e.g., as may be produced by the polymerization of vinylidene difluoride (e.g., as may be produced by Arkema as Kynar®))). In some embodiments, tip component housing 1201a may be produced by molding first housing portion 1201ai as a first shot and then molding second housing portion 1201ao as a second shot about tip interface component 1221 (e.g., a metal ball) and about at least a portion of first housing portion 1201ai. In other embodiments, tip component housing 1201a may not include first housing portion 1201ai but may be produced by molding housing portion 1201ao about tip interface component 1221, where such a housing portion may take the form of the entirety of the tip component housing as a single shot housing (see, e.g., housing 1301a of FIGS. 13A and 13B). Body housing 1201z may be any suitable material(s), such as the same material(s) as housing portion 1201ao. Body housing 1201z of body 1217 can be formed of one or more components operably connected together, such as a front piece and a back piece or a top clamshell and a bottom clamshell. Alternatively, body housing 1201z of body 1217 can be formed of a single piece (e.g., uniform body or unibody).

Figure 13:
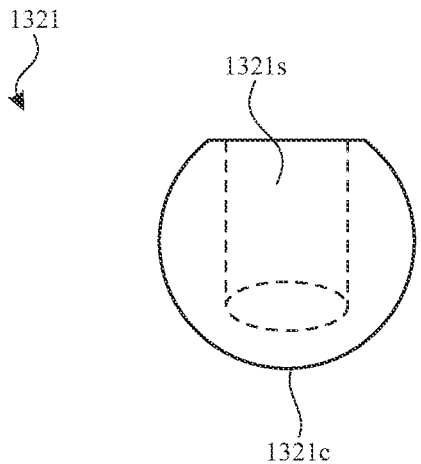
FIG. 13 is a cross-sectional view of a hollow tip interface component.
Figure 13A:
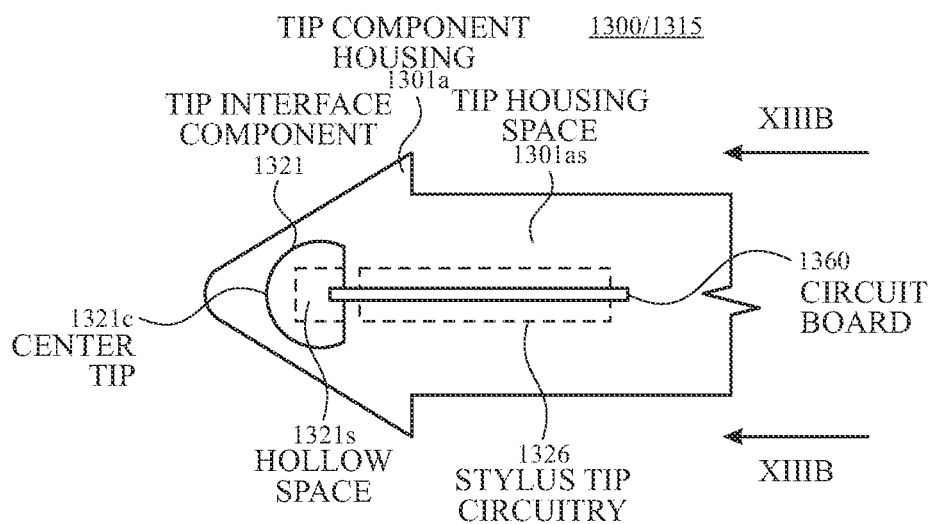
FIG. 13A is a cross-sectional view of a tip portion of an accessory that includes the hollow tip interface component of FIG. 13.
Figure 13B:
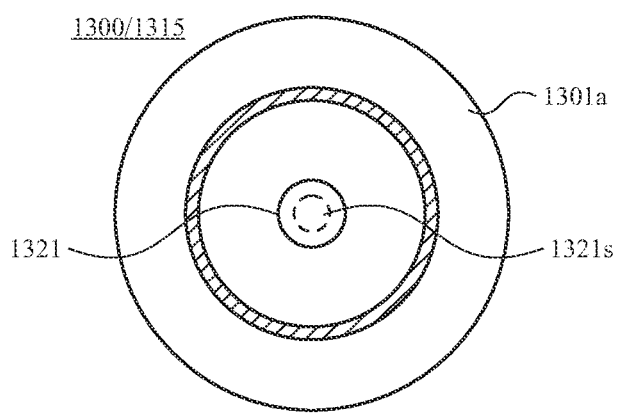
FIG. 13B is a view of the tip portion of FIG. 13A, taken from line XIIIB-XIIIB of FIG. 13A.

Different types of tips may be used in different embodiments. For example, as shown in FIGS. 13, 13A, and 13B, a tip interface component 1321 may be substantially spherical or a spherical cap but may include or define a hollow feature or hollow space 1321s. Such a hollow space 1321s may enable any suitable assembly tool (e.g., a pin inside an insert mold) to hold tip interface component 1321 in a particular position such that a tip component housing 1301a may be molded (e.g., injection molded) at least partially about tip interface component 1321 for providing any suitable tip portion 1315 (e.g., which may be the same as or similar to any one or more of tip portions 415, 415a, 415b, 415c, 415d, 419, 419a, 1115, and 1215), where such a position during molding may ensure that a center tip 1321c of the spherical portion of tip interface component 1321 may be pointing towards the tip of tip portion 1315. Any suitable accessory or stylus 1300 (e.g., which may be the same as or similar to any one or more of accessories or styli 400, 400a, 400b, 400c, 400d, 1100, and 1200) may include tip portion 1315. Any suitable tip stylus circuitry 1326 (e.g., which may be the same as or similar to any one or more of tip stylus circuitries 426a, 426b, 426c, 426d, 436a, 436a', 1126, and 1226) may be provided in any suitable manner on any suitable circuit board 1360 (e.g., which may be the same as or similar to any one or more of boards 1160 and 1260). As shown, tip component housing 1301a may at least partially protect one, some, or each of the components of tip component portion 1315. For example, tip component housing 1301a may at least partially define a tip housing space 1301as within which tip interface component 1321 and/or tip stylus circuitry 1326 and/or circuit board 1360 may be at least partially positioned. Any suitable portion or node of circuitry 1326/1360 may be electrically coupled in any suitable manner to any suitable portion of tip interface component 1321. In some embodiments, at least a portion of circuitry 1326 and/or at least a portion of board 1360 may extend into and be positioned within hollow space 1321s of tip interface component 1321. The closer electronic components of circuitry 1326 may be to the external tip of the accessory (e.g., as may be enabled by hollow space 1321s), the less undesirable wobble effects may result during use of the accessory. For example, as the accessory is tilted, one or more portions of circuitry within the accessory (e.g., tip interface component 1321 and/or tip stylus circuitry 1326 and/or circuit board 1360 of accessory 1300) may be positioned closer to the surface of any suitable device I/O interface, which may introduce wobble by distorting the shape of the stylus electric field(s), which may distort the ability of the system to estimate the position of the tip of the accessory with respect to the surface of the device I/O interface. However, by moving more electronic components closer to center tip 1321c of the spherical portion of tip interface component 1321, wobble may be reduced.

Figure 14:
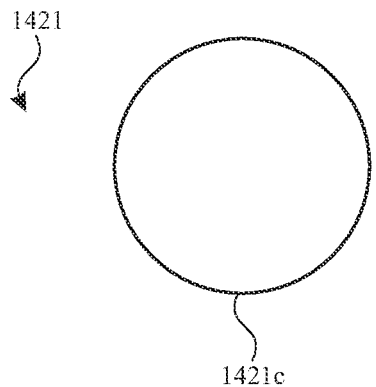
FIG. 14 is a side view of a spherical tip interface component.
Figure 14A:
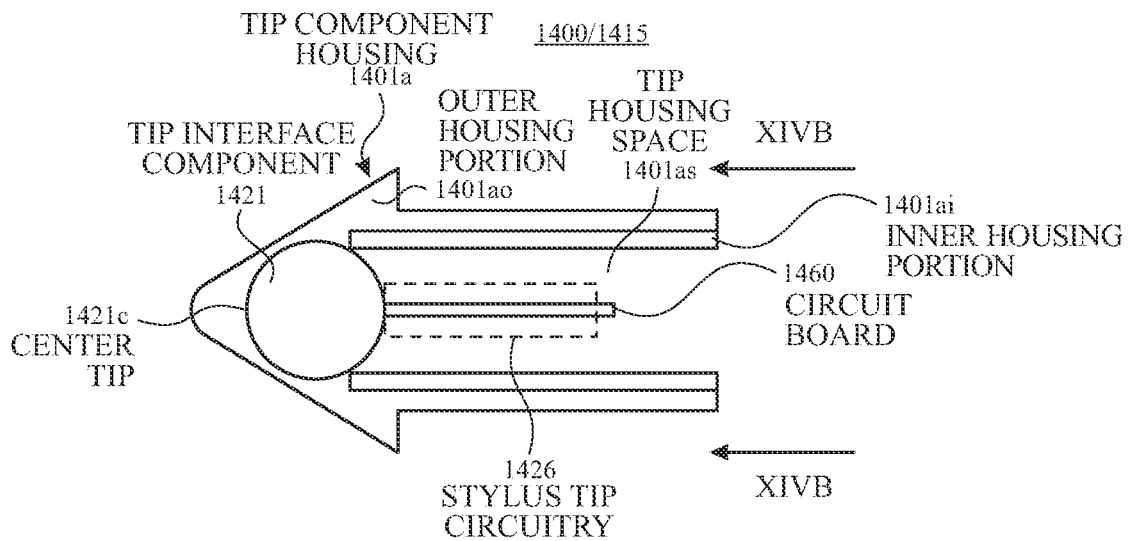
FIG. 14A is a cross-sectional view of a tip portion of an accessory that includes the spherical tip interface component of FIG. 14.
Figure 14B:
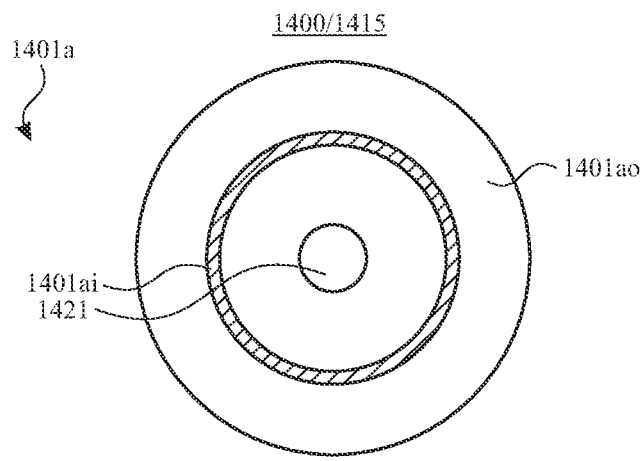
FIG. 14B is a view of the tip portion of FIG. 14A, taken from line XIVB-XIVB of FIG. 14A.

As shown in FIGS. 14, 14A, and 14B, a tip interface component 1421 may be a solid sphere. Such a spherical shape may provide a symmetrical three-dimensional object such that it may be dropped into and/or held at any orientation within and/or with respect to a mold such that a second housing portion 1401ao of a tip component housing 1401a may be molded as a second shot about tip interface component 1421 and about at least a portion of a first housing portion 1401ai for providing any suitable tip portion 1415 (e.g., which may be the same as or similar to any one or more of tip portions 415, 415a, 415b, 415c, 415d, 419, 419a, 1115, 1215, and 1315), where such a position during molding may ensure that a center tip 1421c of the sphere of tip interface component 1421 may be pointing towards the tip of tip portion 1415. Any suitable accessory or stylus 1400 (e.g., which may be the same as or similar to any one or more of accessories or styli 400, 400a, 400b, 400c, 400d, 1100, 1200, and 1300) may include tip portion 1415. Any suitable tip stylus circuitry 1426 (e.g., which may be the same as or similar to any one or more of tip stylus circuitries 426a, 426*b*, 426*c*, 426*d*, 436*a*, 436*a*', 1126, 1226, and 1326) may be provided in any suitable manner on any suitable circuit board 1460 (e.g., which may be the same as or similar to any one or more of boards 1160, 1260, and 1360). As shown, tip component housing 1401*a* may at least partially protect one, some, or each of the components of tip component portion 1415. For example, tip component housing 1401*a* may at least partially define a tip housing space 1401*as* within which tip interface component 1421 and/or tip stylus circuitry 1426 and/or circuit board 1460 may be at least partially positioned. Any suitable portion or node of circuitry 1426/1460 may be electrically coupled in any suitable manner to any suitable portion of tip interface component 1421.

Figure 15:
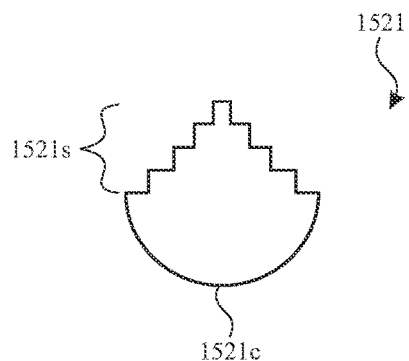
FIG. 15 is a side view of a spherical tip interface component.
Figure 15A:
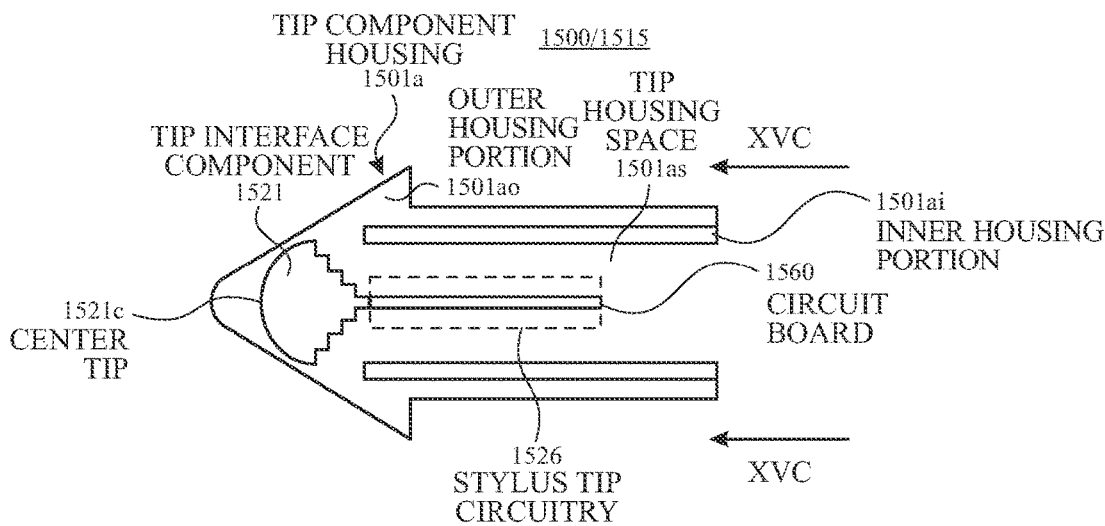
FIG. 15A is a cross-sectional view of a tip portion of an accessory that includes the spherical tip interface component of FIG. 15.
Figure 15B:
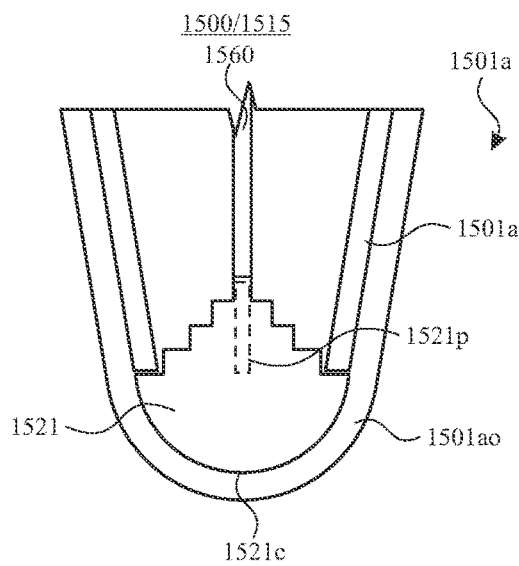
FIG. 15B is a cross-sectional view of a tip portion of an accessory that includes the spherical tip interface component of FIG. 15 but with a compressible feature.
Figure 15C:
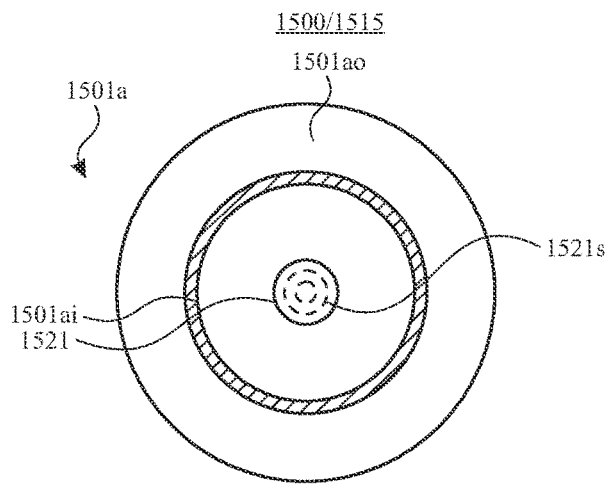
FIG. 15C is a view of the tip portion of FIG. 15A, taken from line XVC-XVC of FIG. 15B.

As shown in FIGS. 15, 15A, 15B, and 15C, a tip interface component 1521 may be at least partially spherical (e.g., hemispherical) but may include any suitable tapered or mushroom shaped or chamfered or step portion 1521*s* extending away from a center tip 1521*c* of the spherical portion of tip interface component 1521. Such a step portion 1521*s* may enable any suitable assembly tool (e.g., a clamp used with an insert mold) to hold tip interface component 1521 in a particular position such that a tip component housing 1501*a* may be molded (e.g., injection molded) at least partially about tip interface component 1521 for providing any suitable tip portion 1515 (e.g., which may be the same as or similar to any one or more of tip portions 415, 415*a*, 415*b*, 415*c*, 415*d*, 419, 419*a*, 1115, 1215, 1315, and 1415), where such a position during molding may ensure that a center tip of the spherical portion of tip interface component 1521 may be pointing towards the tip of tip portion 1515 (e.g., such that a second housing portion 1501*ao* of tip component housing 1501*a* may be molded as a second shot about tip interface component 1521 and about at least a portion of a first housing portion 1501*ai* for providing any suitable tip portion 1515). Any suitable accessory or stylus 1500 (e.g., which may be the same as or similar to any one or more of accessories or styli 400, 400*a*, 400*b*, 400*c*, 400*d*, 1100, 1200, 1300, and 1400) may include tip portion 1515. Any suitable tip stylus circuitry 1526 (e.g., which may be the same as or similar to any one or more of tip stylus circuitries 426*a*, 426*b*, 426*c*, 426*d*, 436*a*, 436*a*', 1126, 1226, 1326, and 1426) may be provided in any suitable manner on any suitable circuit board 1560 (e.g., which may be the same as or similar to any one or more of boards 1160, 1260, 1364, and 1460). As shown, tip component housing 1501*a* may at least partially protect one, some, or each of the components of tip component portion 1515. For example, tip component housing 1501*a* may at least partially define a tip housing space 1501*as* within which tip interface component 1521 and/or tip stylus circuitry 1526 and/or circuit board 1560 may be at least partially positioned. Any suitable portion or node of circuitry 1526/1560 may be electrically coupled in any suitable manner to any suitable portion of tip interface component 1521. Electrical fields (e.g., stylus electric fields detectable by an electronic device) may be different when the accessory is tilted toward the surface of any suitable device I/O interface (see, e.g., angle 118 of FIG. 1D and/or angle 122 of FIG. 1C) as compared to when the accessory is held straight and perpendicular to the device surface (see, e.g., FIG. 1B). For example, as the accessory is tilted, one or more portions of circuitry within the accessory (e.g., tip interface component 1521 and/or tip stylus circuitry 1526 and/or circuit board 1560 of accessory 1500) may be positioned closer to the surface of any suitable device I/O interface, which may introduce wobble by distorting the shape of the stylus electric field(s), which may distort the ability of the system to estimate the position of the tip of the accessory with respect to the surface of the device I/O interface. By providing step portion 1521*s* extending away from center tip 1521*c* of the spherical portion of tip interface component 1521 (e.g., by cutting away from a fully spherical tip interface component by reducing the size of the tip interface component as it extends away from center tip 1521*c*), less circuitry may be provided by tip interface component 1521, which may reduce wobble. As shown in FIG. 15B, a pogo pin 1521*p* or any other suitable compressible or spring loaded or resilient feature may be provided within or at an end of tip interface component 1521, which may provide any suitable compressible interaction between tip interface component 1521 and tip stylus circuitry 1526 and/or circuit board 1560, which may obviate the need for any other conductive compressible component (e.g., conductive compressible component 1270 and/or conductive pad 1274 of accessory 1200).

Figure 16:
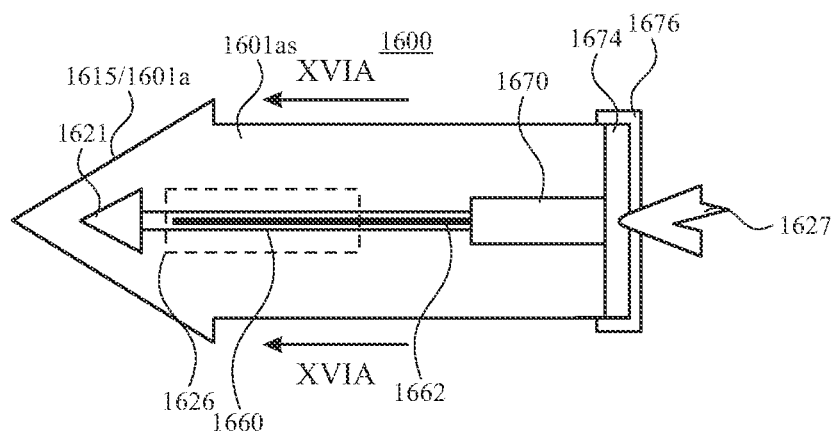
FIG. 16 is a cross-sectional view of a portion of an accessory that includes certain grounding features.
Figure 16A:
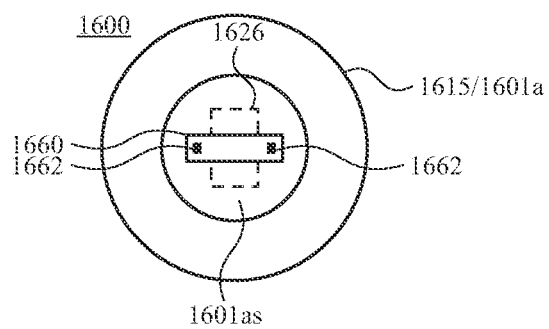
FIG. 16A is a view of the accessory of FIG. 16, taken from line XVIA-XVIA of FIG. 16.
Figure 17:
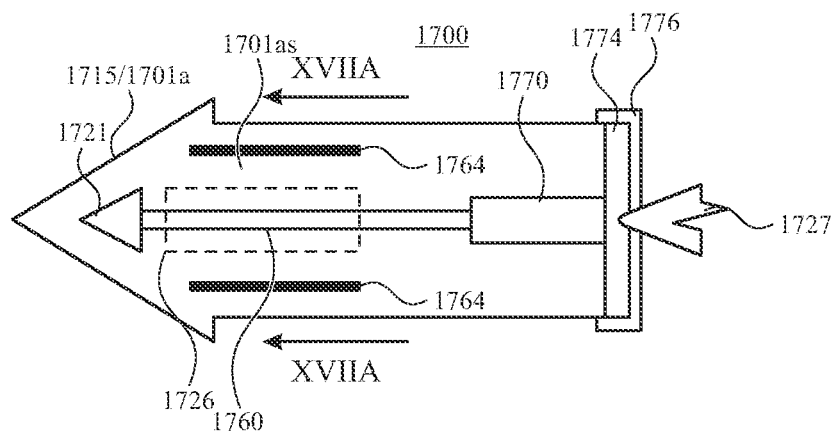
FIG. 17 is a cross-sectional view of a portion of an accessory that includes other certain grounding features.
Figure 17A:
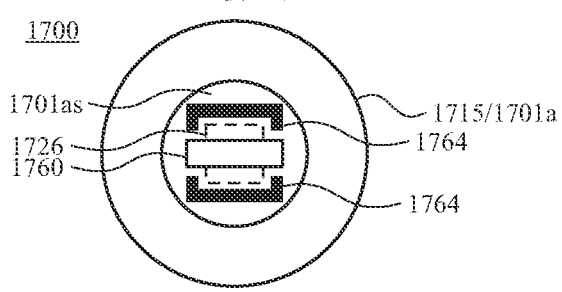
FIG. 17A is a view of the accessory of FIG. 17, taken from line XVIIA-XVIIA of FIG. 17.
Figure 18:
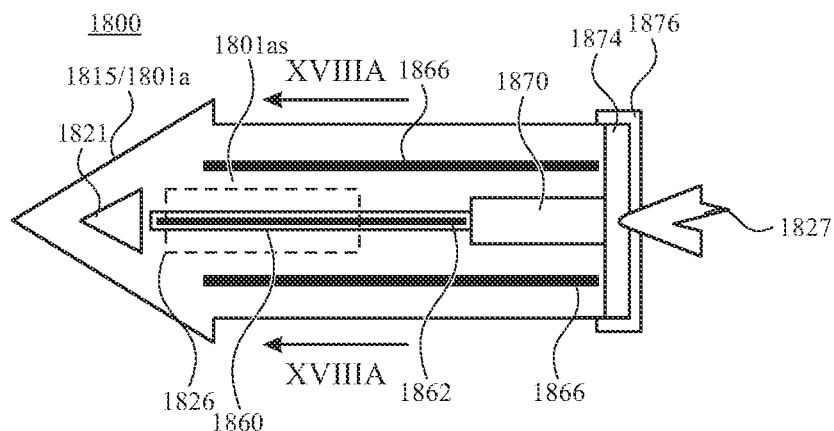
FIG. 18 is a cross-sectional view of a portion of an accessory that includes yet other certain grounding features.
Figure 18A:
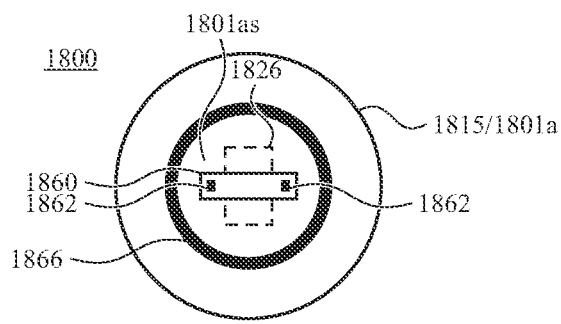
FIG. 18A is a view of the accessory of FIG. 18, taken from line XVIIIA-XVIIIA of FIG. 18.

An accessory may include one or more features to enable a grounded area to reduce wobble. For example, as shown in FIGS. 16 and 16A, an accessory 1600, which may be similar to accessory 1200, may include a tip portion 1615 with a tip interface component 1621 and a tip component housing 1601*a* and may be configured to be coupled to body stylus circuitry 1627 of a body portion. A body point portion of body stylus circuitry 1627 may puncture or rupture or otherwise pass through a protective cover 1676 (if provided) and press into a conductive pad 1674, which may press conductive pad 1674 against and maintain electrical contact with an end of a conductive compressible component 1670, which may compress conductive compressible component 1670 for pressing an end of conductive compressible component 1670 against and maintain electrical contact with circuitry 1626 and/or circuit board 1660 (e.g., which may be the same as or similar to any one or more of boards 1160, 1260, 1364, 1460, and 1560) as positioned within space 1601*as* of housing 1601*a*. As shown, accessory 1600 may include at least one ground trace 1662 (e.g., two ground traces 1662) that may extend through at least a portion of board 1660 and may be electrically coupled to body stylus circuitry 1627 (e.g., a ground rod (e.g., of a purely capacitively coupled device)) via conductive pad 1674 and/or conductive compressible component 1670. As another example, as shown in FIGS. 17 and 17A, an accessory 1700, which may be similar to accessory 1200, may include a tip portion 1715 with a tip interface component 1721 and a tip component housing 1701*a* and may be configured to be coupled to body stylus circuitry 1727 of a body portion. A body point portion of body stylus circuitry 1727 may puncture or rupture or otherwise pass through a protective cover 1776 (if provided) and press into a conductive pad 1774, which may press conductive pad 1774 against and maintain electrical contact with an end of a conductive compressible component 1770, which may compress conductive compressible component 1770 for pressing an end of conductive compressible component 1770 against and maintain electrical contact with circuitry 1726 and/or circuit board 1760 (e.g., which may be the same as or similar to any one or more of boards 1160, 1260, 1364, 1460, 1560, and 1660) as positioned within space 1701*as* of housing 1701*a*. As shown, accessory 1700 may include at least one shield can structure 1764 (e.g., two shield can structures 1764 (e.g., one on each surface of board 1760)) that may provide shielding to any portion(s) or all of circuitry 1726 on board 1760. Moreover, as shown, housing 1701*a* may have a reduced structure. As another example, as shown in FIGS.

Figure 19:
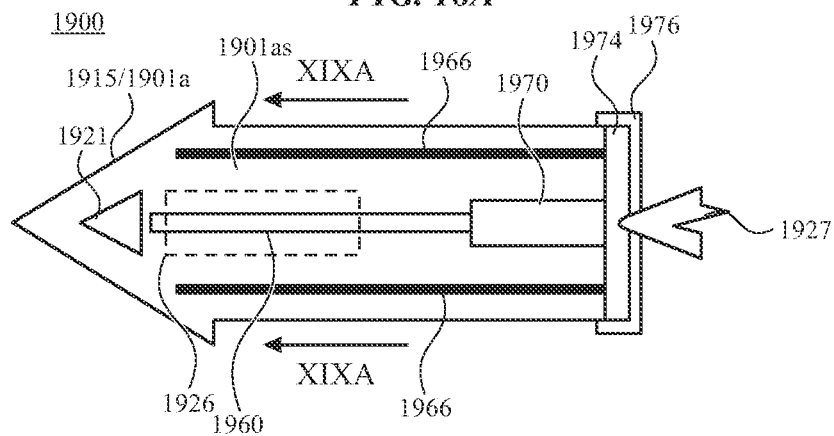
FIG. 19 is a cross-sectional view of a portion of an accessory that includes yet other certain grounding features.
Figure 19A:
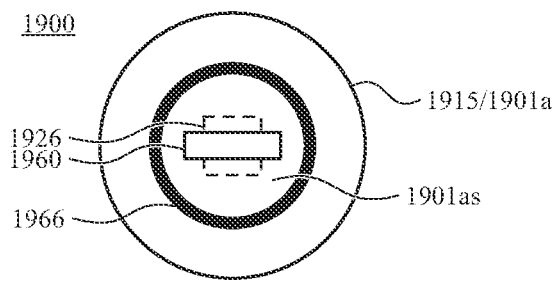
FIG. 19A is a view of the accessory of FIG. 19, taken from line XIXA-XIXA of FIG. 19.

18 and 18A, an accessory 1800, which may be similar to accessory 1200, may include a tip portion 1815 with a tip interface component 1821 and a tip component housing 1801a and may be configured to be coupled to body stylus circuitry 1827 of a body portion. A body point portion of body stylus circuitry 1827 may puncture or rupture or otherwise pass through a protective cover 1876 (if provided) and press into a conductive pad 1874, which may press conductive pad 1874 against and maintain electrical contact with an end of a conductive compressible component 1870, which may compress conductive compressible component 1870 for pressing an end of conductive compressible component 1870 against and maintain electrical contact with circuitry 1826 and/or circuit board 1860 (e.g., which may be the same as or similar to any one or more of boards 1160, 1260, 1364, 1460, 1560, 1660, and 1760) as positioned within space 1801as of housing 1801a. As shown, accessory 1800 may include a shielding sleeve 1866 that may surround at least a portion of the entirety of board 1860 and extend to conductive compressible component 1870 and/or conductive pad 1874, such that sleeve 1866 may be electrically coupled to body stylus circuitry 1827 (e.g., a ground rod (e.g., of a purely capacitively coupled device)) via conductive pad 1874 and/or conductive compressible component 1870. Moreover, as shown, accessory 1800 may include at least one ground trace 1862 (e.g., two ground traces 1862) that may extend through at least a portion of board 1860 and may be electrically coupled to body stylus circuitry 1827 via conductive pad 1874 and/or conductive compressible component 1870. Moreover, as shown, housing 1801a may have a reduced structure. Moreover, as shown, accessory 1800 may have a larger diameter plug. As another example, as shown in FIGS. 19 and 19A, an accessory 1900, which may be similar to accessory 1200, may include a tip portion 1915 with a tip interface component 1921 and a tip component housing 1901a and may be configured to be coupled to body stylus circuitry 1927 of a body portion. A body point portion of body stylus circuitry 1927 may puncture or rupture or otherwise pass through a protective cover 1976 (if provided) and press into a conductive pad 1974, which may press conductive pad 1974 against and maintain electrical contact with an end of a conductive compressible component 1970, which may compress conductive compressible component 1970 for pressing an end of conductive compressible component 1970 against and maintain electrical contact with circuitry 1926 and/or circuit board 1960 (e.g., which may be the same as or similar to any one or more of boards 1160, 1260, 1364, 1460, 1560, 1660, 1760, and 1860) as positioned within space 1901as of housing 1901a. As shown, accessory 1900 may include a shielding sleeve 1966 that may surround at least a portion of the entirety of board 1960 and extend to conductive compressible component 1970 and/or conductive pad 1974, such that sleeve 1966 may be electrically coupled to body stylus circuitry 1927 (e.g., a ground rod (e.g., of a purely capacitively coupled device)) via conductive pad 1974 and/or conductive compressible component 1970. Moreover, as shown, housing 1901a may have a reduced structure. Moreover, as shown, accessory 1900 may have a larger diameter plug.

Moreover, the processes described with respect to FIGS. 1-19A (e.g., any control applications and/or algorithms), as well as any other aspects of the disclosure, may each be implemented by software, but may also be implemented in hardware, firmware, or any combination of software, hardware, and firmware. They each may also be embodied as computer-readable code recorded on a computer-readable medium. The computer-readable medium may be any data storage device that can store data or instructions which can thereafter be read by a computer system. Examples of the computer-readable medium may include, but are not limited to, read-only memory, random-access memory, flash memory, CD-ROMs, DVDs, magnetic tape, and optical data storage devices (e.g., memory 104 of FIG. 1). The computer-readable medium can also be distributed over network-coupled computer systems so that the computer readable code is stored and executed in a distributed fashion. For example, the computer-readable medium may be communicated from one electronic device to another electronic device using any suitable communications protocol. The computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

As mentioned, electronic device 100 may drive a display (e.g., display 112a) with graphical data to display a graphical user interface ("GUI"). The GUI may be configured to receive touch input via input component(s) 110a and/or 110b. Embodied as a touch screen (e.g., with display 112a as I/O component 111a), I/O component 111a may display the GUI. Alternatively, the GUI may be displayed on a display (e.g., display 112a) separate from touch input component 110. The GUI may include graphical elements displayed at particular locations within the interface. Graphical elements may include, but are not limited to, a variety of displayed virtual input devices, including virtual scroll wheels, a virtual keyboard, virtual knobs, virtual buttons, any virtual UI, and the like. A user may perform gestures (e.g., user fingers and/or with stylus 400) at one or more particular locations on input component(s) 110a and/or 110b, which may be associated with the graphical elements of the GUI. In other embodiments, the user may perform gestures at one or more locations that are independent of the locations of graphical elements of the GUI. Gestures performed on input component(s) 110a and/or 110b may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on input component(s) 110a and/or 110b in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other embodiments, in which gestures are performed directly on a touch screen, a user may interact directly with objects on the touch screen, with or without a cursor or pointer being displayed on the touch screen.

Feedback may be provided to the user via bus 114 in response to or based on the touch or near touches on a touch input component 110. Feedback may be transmitted optically, mechanically, electrically, via olfactory, acoustically, or the like or any combination thereof and in a variable or non-variable manner.

Circuitry may be disposed on a printed circuit board ("PCB") or a flexible printed circuit ("FPC") (e.g., circuitry 1126 on board 1160, circuitry 1226 on board 1260, circuitry 1326 on board 1360, circuitry 1426 on board 1460, circuitry 1526 on board 1560, circuitry 1626 on board 1660, circuitry 1726 on board 1760, circuitry 1826 on board 1860, circuitry 1926 on board 1960, etc.). In some embodiments, the circuitry may include discrete circuit elements coupled together (e.g., coupled together with solder) without a PCB or FPC. Although this disclosure describes and illustrates particular circuitry that includes particular circuit elements coupled in particular configurations, this disclosure contemplates any suitable circuitry and/or circuits that include any suitable circuit elements coupled in any suitable configurations.

Many alterations and modifications of the preferred embodiments will no doubt become apparent to a person of ordinary skill in the art after having read the foregoing description, it is to be understood that the particular embodiments shown and described by way of illustration are in no way intended to be considered limiting. Thus, references to the details of the described embodiments are not intended to limit their scope.

The invention claimed is:

1. An accessory for use with an electronic device that comprises an input component with an input surface, the accessory comprising:
   an enclosure; and
   accessory circuitry at least partially positioned within the enclosure, wherein:
      the accessory circuitry comprises:
         body circuitry;
         a tip interface component; and
         tip circuitry positioned between and electrically coupled to each one of the body circuitry and the tip interface component;
      the tip circuitry comprises:
         first circuitry that is operative to provide an asymmetric load between the body circuitry and the tip interface component when the accessory is stimulated by an external stimulation; and
         second circuitry that is operative to provide electrostatic discharge ("ESD") protection to the first circuitry; and
      the second circuitry comprises:
         ESD path circuitry electrically coupled in parallel to the first circuitry; and
         ESD resistance circuitry electrically coupled in series with the first circuitry.

2. The accessory of claim 1, wherein the second circuitry comprises the ESD path circuitry electrically coupled in parallel to the first circuitry, and the ESD resistance circuitry electrically coupled in series with the first circuitry.

3. The accessory of claim 2, wherein the ESD resistance circuitry is electrically coupled in series with the first circuitry and in parallel to the ESD path circuitry.

4. The accessory of claim 1, wherein:
   the second circuitry comprises ESD resistance circuitry electrically coupled in series with the first circuitry;
   the second circuitry further comprises ESD path circuitry electrically coupled in parallel to the first circuitry;
   the accessory further comprises signaling resistance circuitry;
   the signaling resistance circuitry is electrically coupled in series with the ESD resistance circuitry and in parallel to the first circuitry; and
   the signaling resistance circuitry comprises a plurality of resistors in series.

5. The accessory of claim 1, wherein the ESD path circuitry comprises at least one transient voltage suppression ("TVS") diode.

6. The accessory of claim 1, wherein the ESD path circuitry comprises at least two diodes electrically coupled to one another in series.

7. The accessory of claim 1, wherein the ESD resistance circuitry is operative to limit an amount of current able to pass through the first circuitry.

8. The accessory of claim 1, wherein the ESD resistance circuitry comprises at least one current limiting resistor.

9. The accessory of claim 1, wherein the ESD resistance circuitry comprises at least two resistors electrically coupled to one another in series.

10. The accessory of claim 1, further comprising a circuit board, wherein:
    the first circuitry is mounted on a first surface of the circuit board;
    at least a portion of the ESD resistance circuitry is mounted on the first surface of the circuit board; and
    the ESD path circuitry is mounted on a second surface of the circuit board that is opposite the first surface of the circuit board.

11. The accessory of claim 10, wherein:
    a first portion of the ESD resistance circuitry is mounted on the first surface of the circuit board; and
    a second portion of the ESD resistance circuitry is mounted on the second surface of the circuit board.

12. The accessory of claim 11, wherein:
    the first portion of the ESD resistance circuitry comprises a plurality of resistors in series; and
    the second portion of the ESD resistance circuitry comprises at least one resistor.

13. The accessory of claim 10, further comprising signaling resistance circuitry, wherein:
    the signaling resistance circuitry is electrically coupled in series with the ESD resistance circuitry and in parallel to the first circuitry; and
    the signaling resistance circuitry is mounted on the second surface of the circuit board.

14. The accessory of claim 1, further comprising signaling resistance circuitry, wherein:
    the signaling resistance circuitry is electrically coupled in series with the ESD resistance circuitry and in parallel to the first circuitry; and
    the signaling resistance circuitry comprises a plurality of resistors in series.

15. The accessory of claim 1, wherein the asymmetric load is operative to provide an accessory electric field that is detectable by the electronic device when the tip interface component of the accessory is positioned adjacent the input surface of the input component of the electronic device.

16. The accessory of claim 1, wherein the first circuitry comprises at least one of the following:
    a plurality of diodes; or
    at least one Schottky diode.

17. The accessory of claim 1, wherein:
    the enclosure comprises:
       a first enclosure;
       a second enclosure that is removably coupled to the first enclosure; and
       a cover provided over an opening of the first enclosure;

wherein:
> the tip circuitry is at least partially positioned within a tip housing space defined by first enclosure;
> 
> prior to the first enclosure being coupled to the second enclosure, the cover is operative to prevent an ESD event within the tip housing space; and
> 
> when the first enclosure is coupled to the second enclosure, a portion of the body circuitry passes through the cover and into the tip housing space.

18. The accessory of claim 17, further comprising a conductive pad that is at least partially positioned within the tip housing space, wherein, when the first enclosure is coupled to the second enclosure, the portion of the body circuitry passes through the cover presses into the conductive pad.

19. The accessory of claim 18, further comprising a spring, wherein, when the first enclosure is coupled to the second enclosure, the spring electrically couples the conductive pad to the tip circuitry.

20. The accessory of claim 17, wherein the cover is an ESD protective film.

\* \* \* \* \*